United States Patent [19]

Stahl

[11] Patent Number: 4,644,020

[45] Date of Patent: Feb. 17, 1987

[54] PRODUCTION OF HIGH MOLECULAR WEIGHT VINYL LACTAM POLYMERS AND COPOLYMERS

[75] Inventor: G. Allan Stahl, Bartlesville, Okla.

[73] Assignee: Phillips Petroleum Company, Bartlesville, Okla.

[21] Appl. No.: 461,707

[22] Filed: Jan. 28, 1983

[51] Int. Cl.[4] .............. C08F 4/04; C08F 4/08; C08F 26/10; C09K 7/00

[52] U.S. Cl. .................. 522/79; 210/728; 210/734; 210/735; 522/59; 522/60; 522/66; 522/84; 522/167; 522/175; 522/911; 523/130; 523/131; 524/779; 526/219; 526/219.1; 526/219.6; 526/227; 526/238; 526/264; 252/8.5 C; 252/8.55 R; 252/8.55 D

[58] Field of Search ........ 204/159.11, 159.22; 523/130, 131; 524/5, 779; 526/264, 219, 219.1, 219.6, 227, 238; 210/728, 734, 735; 522/59, 66, 79, 84, 167, 175, 911, 60

[56] References Cited

U.S. PATENT DOCUMENTS

| | | | |
|---|---|---|---|
| 3,006,900 | 10/1961 | Fikentscher | 526/264 |
| 3,148,729 | 9/1964 | Holbert et al. | 166/5 |
| 3,277,066 | 10/1966 | Grosser et al. | 260/88.3 |
| 3,336,270 | 8/1967 | Monagle | 526/264 |
| 3,405,106 | 10/1968 | Scanley | 260/80 |
| 3,412,020 | 11/1968 | Azorlosa | 210/54 |
| 3,500,925 | 3/1970 | Beiswanger | 166/275 |
| 3,537,520 | 11/1970 | Holm | 166/273 |
| 3,630,868 | 12/1971 | Marans | 204/159.22 |
| 3,803,104 | 4/1974 | Barabas | 526/264 |
| 3,843,578 | 10/1974 | Logemann et al. | 260/29.6 AN |
| 3,926,756 | 12/1975 | Restaino | 522/84 |
| 3,948,783 | 4/1976 | Szabo | 252/8.55 D |
| 3,994,852 | 11/1976 | Adams | 166/295 |

FOREIGN PATENT DOCUMENTS 2312516 12/1976 France .
8302449 7/1983 PCT Int'l Appl. .

Primary Examiner—Dennis L. Albrecht
Attorney, Agent, or Firm—A. L. Robbins

[57] ABSTRACT

Water-soluble polymers comprising an N-vinyl lactam are found to be useful in processes wherein the polymer is introduced into a subterranean wellbore.

Polymers useful in the recovery of natural resources are prepared by polymerizing an N-vinyl lactam by free radical initiation, with polymerization conducted in an aqueous solution polymerization medium preferably containing a mixture of dissolved electrolytes, or in a polymerization medium consisting essentially of a tertiary alkanol. Copolymers of such N-vinyl lactams with unsaturated amides, and terpolymers prepared by polymerizing an N-vinyl lactam and an unsaturated amide with a selected termonomer compound are also useful when prepared by these methods.

53 Claims, 11 Drawing Figures

PRODUCTION OF HIGH MOLECULAR WEIGHT VINYL LACTAM POLYMERS AND COPOLYMERS

This invention relates to new and useful polymers. Further, this invention relates to the preparation of such polymers and their use in the recovery and processing of natural resources, such as for example in such applications as enhanced oil recovery, well drilling, workover and completion; the treatment and thickening of water for use in various applications, and minerals beneficiation. Still further, this invention relates to the introduction of certain polymers of the prior art as well as the inventive polymers of the present invention into subterranean well bores where high temperatures and/or salinity and/or hardness of formation waters are encountered.

BACKGROUND

Many synthetic polymers have been developed and used in processes for the recovery of natural resources. Generally a desirable property is that such polymers impart to a liquid an increased viscosity when a relatively small quantity of the polymer is added, and preferably at a minimal cost. There is an increasing demand for such polymers which will withstand hostile environments including, e.g. high temperatures, high salinity and high content of multivalent metal cations, commonly known as "hardness ions", as well as the high acidity, temperature and shear conditions encountered in processes such as acid fracturing. Various polymers may be used in the processes for recovery or treatment of natural resources disclosed below as pertinent to this invention.

ENHANCED OIL RECOVERY

Oil accumulated within a subterranean oil-bearing formation is recovered or produced therefrom through wells, called production wells, drilled into the subterranean formation. A large amount of such oil is left in the subterranean formations if produced only by primary depletion, i.e., where only formation energy is used to recover the oil. Where the initial formation energy is inadequate or has become depleted, supplemental operations, often referred to as secondary, tertiary, enhanced or post-primary recovery operations, are employed. The term "enhanced" will be used herein to refer to all such operations. In the most successful and most widely used of these operations, a fluid is injected into the formation by pumping it through one or more injection wells drilled into the formation, oil is displaced within and is moved through the formation, and is produced from one or more production wells drilled into the formation. In a particular recovery operation of this sort, field water or field brine is usually employed as the injection fluid and the operation is referred to as a waterflood. The injection water is often referred to as flooding liquid or flooding water as distinguished from the in situ formation, or connate water. Fluids injected later can be referred to as driving fluids. Although water is the most common, injection and drive fluids can include gaseous fluids such as steam, carbon dioxide, and the like.

Although conventional waterflooding is effective in obtaining additional oil from oil-bearing subterranean formations, the technique does exhibit a number of shortcomings. Foremost among these shortcomings is the tendency of flooding water to "finger" through an oil-bearing formation and to thus bypass substantial portions thereof. By fingering is meant the development of unstable water stream fronts which advance toward the production wells more rapidly than the remainder of the flooding water. Furthermore, when fingering is encountered, the water does not normally displace as much oil in the portions of the formations which it contacts as it is potentially capable of displacing.

It has been established that waterfloods perform less satisfactorily with the more viscous oils than with relatively nonviscous oils. The fingering and bypassing tendencies of water are related to the ratio of the viscosity of the oil to the viscosity of the flooding water, and also related to fractures and/or high permeability zones in the formation. The viscosity of these oils varies from as low as one or two centipoise to 1,000 centipoise or higher. Water generally has a viscosity of about 1 centipoise at room temperature.

In order to restrict the mobility of the flooding water to no greater than the mobility of the oil, water thickening agents have been added to increase the viscosity of the water. Suitable agents for increasing the viscosity of the flooding water are water-soluble or water-dispersible, high molecular weight polymers. These polymers may adsorb on the formation surfaces, and accumulate in (or absorb) and reduce permeability through the rock pores. Consequently, the polymers cause the flooding water (which can contain polymer or other agents) injected therebehind to flow into previously uninvaded portions of the formation. However, these polymers are susceptible to adverse effects present in some subterranean formations, such as high temperature and dissolved electrolytes, which cause the polymers to precipitate and/or lose their viscosity-enhancing effectiveness, thus increasing flood water mobility, and generally become less effective as mobility control agents.

To maximize the recovery of oil in post-primary oil recovery operations, a substantially uniform permeability should exist throughout the strata. If the formation permeability is heterogeneous, the flooding fluids will seek areas of high water permeability, producing channeling and the passage of excess driving fluid to the producing well. As the more water-permeable strata are depleted of oil, the driving fluid thus has a tendency to follow such channels and further increase water production, reflected in an increased water/oil ratio at the producing well. More uniform flood fronts can be obtained in formations of nonuniform permeability by permeability correction of the more water-permeable strata of the formation. One method for reducing the water permeability of these more permeable strata is the injection of plugging materials into the formation strata to at least partially plug the more water-permeable zones and achieve reduced water permeability in said zones. Plugging materials can be formed in situ in the formation by the injection of one or more reactant substances which chemically react to form bodies of reduced water permeability, particularly polyvalent metal-crosslinked polymeric viscosifiers, alternatively monomers or prepolymers which are polymerizable under formation conditions.

DRILLING, WORKOVER AND COMPLETION FLUIDS

In the art of drilling wells to tap subterranean deposits of natural resources, such as gas, geothermal steam or oil, especially when drilling by the rotary method or the percussion method wherein cuttings must be removed from the bore hole, it is necesary to use a drilling fluid, as is well known to those skilled in the art. The subject is discussed more fully in U.S. Pat. No. 3,025,234. In addition to having the desirable rheological properties such as viscosity and gel strength, it is very important that such drilling fluids exhibit a low rate of filtration or water loss, that is, the drilling fluid must prevent excessive amounts of fluid, or "filtrate", from flowing from the bore hole into the surrounding formation. The loss of water or other fluid from the drilling hole is prevented by the formation of a filter cake which deposits from the drilling fluid and seals the wall of the bore hole.

To produce an effective drilling mud, the clays mixed with water should disperse to a certain extent, not exceeding an acceptable operating range. That is, the individual clay particles should hydrate and repel each other and will remain in suspension (forming a "mud" or viscous drilling fluid) and filter out to form a relatively less permeable coating on the borehole walls. Excessive flocculation, however, causes larger particles to form, with the result that none of the objects of a "drilling mud" are achieved. Numerous formulations, compositions and additives to optimize the performance of drilling fluids for various applications have been developed. For instance, U.S. Pat. No. 3,816,308 discloses compositions comprising mixtures of carboxylic acid polymers and soluble metal salts with the object of increasing the "yield" (defined as the number of barrels of 15 centipoise mud which can be prepared from one ton of clay) of relatively low-grade bentonite clays.

High-yielding bentonite clay, when treated with high molecular weight polyacrylamide and polyacrylate polymers or copolymers of vinyl acetate and maleic anhydride, can be made to produce about the same viscosity as twice the amount of untreated bentonite. See Park et al, Oil & Gas Journal, May 30, 1960, pp. 81-84.

Excessive fluid loss from the drilling fluid may contaminate the producing formation, permanently displacing oil and blocking production. If the formation penetrated is of the heaving shale type, such shale may absorb water from the drilling fluid and by a caving or swelling action, common to bentonite materials, close the bore hole around the drill stem, choke off circulation of drilling fluid, and seize the drill string. Similar results may occur simply from the abrupt increase in viscosity of the drilling fluid which is caused by excessive fluid loss. The adverse consequences of excessive fluid loss in the drilling of very deep wells are more severe due to the high temperatures and pressures encountered in such drilling operations. To increase the density of the drilling fluid so that it will exert sufficient hydrostatic pressure on the walls of the borehole, weighting agents such as heavy insoluble metal salts are added to the fluid. Drilling fluids must be of sufficient viscosity to maintain the weighting agent in suspension, but a relatively small decrease in fluid content may increase such viscosity to the point where the drill string binds. The tendency to lose liquid in a borehole is greatly increased by the high temperatures and pressures encountered.

Since most drilling fluids are "non-Newtonian" fluids, the apparent viscosity at given conditions of shear rate and shearing stress may change in a non-linear manner with certain parameters. This property makes it difficult to provide drilling fluids which will perform within acceptable ranges during the entire process of drilling a well.

In the mixing of drilling fluids in preparation for drilling operations, agitation at a certain degree of shear for some period of time is normally required to achieve the desired degree of thickening, but excessive agitation may cause the apparent viscosity to decrease. Since the degree of shear achieved in most drilling fluid circulating systems is low, it is important that a minimum of mixing time at a relatively low rate of shear produce the desired thickening, so that maximum thickening is obtained under operating conditions. Measurable variables which may characterize the apparent viscosity of a drilling fluid include the plastic viscosity, yield point and the rate and degree of gelation. The viscosity of a fluid normally decreases with an increase in temperature, but certain polymer additives or deflocculating agents may reduce, or even reverse, this tendency. However, the long-chain polymers which are most effective in achieving this effect are the most vulnerable to breakdown through oxidation, shear and thermal effects, i.e. the duration of exposure to high temperature drilling operations. Also, many such polymers tend to precipitate and/or lose viscosity as well as effectiveness as water loss additives when exposed to dissolved electrolytes, particularly when divalent metal cations such as $Ca^{++}$ and $Mg^{++}$ are present. In drilling fluids, the resulting vulnerability to breakdown is exacerbated by the density of the mud, which is directly related to the weighting agents required for a given formation pressure. The extremely high temperatures encountered in drilling geothermal wells also tend to cause early breakdown of mud additives.

Breakdown of water loss control polymers or deflocculants causes a large increase in the fluid loss accompanied by an increase in filter cake thickness. The thickness of filter cake will be determined by the solids content of the mud. High density drilling fluids with large amounts of weighting materials produce very thick filter cakes when fluid loss control is lost. These conditions often result in differential sticking of the drill string. It is desirable to develop additives which will enable drilling fluids to retain their proper viscosity and fluid content over a broader range of conditions.

Drilling fluids are used in the drilling of various types of wells. Workover and completion fluids, in contrast, are those fluids used in the completion and servicing of such wells. Completion fluids are those fluids used after drilling is complete and during the steps of completion, or recompletion, of the well. Completion can include cementing the casing, perforating the casing, setting the tubing and pump, etc.

Workover fluids are those fluids using during remedial work in the well. This can include removing tubing, replacing a pump, cleaning out sand or other deposits, logging, reperforating, etc. Workover also broadly includes steps used in preparing an existing well for secondary or tertiary oil recovery such as polymer additions, micellar flooding, steam injection, etc.

Both workover and completion fluids are used in part to control well pressure, to prevent the collapse of casing from overpressure, and to prevent or reduce corrosion of casing. A drilling fluid may be suitable for completion or workover applications in some cases, but not in all cases. When a special workover or completion fluid is used, it is usually a poor or unsuitable drilling fluid.

The compositions of workover and completion fluids can differ for the compositions of drilling muds, since workover and completion fluids have functions which differ from those of drilling fluids. A workover or completion fluid differs from a drilling fluid in several ways. A workover fluid does not have to be compatible with drilled solids. Usually, a workover fluid is used in cased holes, and the formation is exposed only at perforations. Whereas a drilling fluid must protect the formation from swelling or disintegration, a workover fluid must not damage the permeability of the formation. Ideally, a workover fluid would contain no solids. If solids must be used, they should be acid soluble. Similarly, the compositions, properties and functions of workover fluids can differ from those of completion fluids.

Although there has been considerable progress in the field of workover and completion fluids, there is significant room for further improvement. For example, wells are being completed and serviced in increasingly hostile environments involving, e.g., high temperatures and high levels of salinity and/or hardness in the formation water. Thus, new additives for workover and completion fluids which retain their properties at elevated temperatures and high concentrations of dissolved electrolytes are in demand.

TREATMENT OF MINERALS AND WATER

In processing mineral ores it is often necessary to separate finely divided solids from aqueous suspension; conversely, in treating water for use, e.g., for municipal water supplies or industrial applications, it is often necessary to remove finely divided solids which may be suspended therein. Improvements in the ease of separation of finely divided solids from aqueous suspension either by sedimentation or by filtration have been accomplished by incorporating small amounts of high molecular weight water-soluble polymers in such suspensions. Among such polymers high molecular weight polyacrylamide and hydrolysis products thereof have proven to be effective on a wide variety of ore suspensions. Improved polymers have been developed for this purpose; for example, Sullivan discloses in U.S. Pat. No. 3,146,193 (1964) certain high molecular weight water-soluble copolymers of certain vinyl substituted, nitrogen-containing, heterocyclic ring compounds with acrylamide which can be incorporated in aqueous suspensions of finely divided inorganic solids to facilitate the concentration and separation of such solids.

Further improved polymers are in demand for applications involving concentrated brine solutions, e.g., potash ore processing. The American potash industry annually treats more than 18 MM tons of ore from which more than 3 MM tons of potash concentrate is recovered. Most of this product is used as fertilizer; however, nearly all of the potassium required by other U.S. industries comes from this concentrate.

A typical potash ore consists of sylvite (20-25%), halite (60-75%), and clay (4-20%). The potassium containing mineral is sylvite (KCl). The major impurities are halite (NaCl) and clay. The mixed ore is processed at the mine site. The processing varies with the level of clay, the higher clay ores requiring a more extensive treatment. This extensive treatment is becoming more widely utilized as the mines grow more mature and use lower grade ores.

The adverse effect of clay is caused by the high affinity of potash collectors for clay, which diminishes their cost efectiveness. In the processing, which consists of subsequent crushing, grinding, hydrolytic clay removal, and flotation, the time, cost and steps required depend upon the clay content. When more than a few percent of clay is present, the clay must be "blinded" by polyacrylamide, guar gum, or potato starch before collector addition.

A preferred step would be clay removal by flocculation with a brine soluble polymer, since all processing is conducted in saturated brine to prevent mineral dissolution. This polymer, in addition to brine solubility, must retain its activity and thus cost effectiveness in the presence of the high ionic strength brine medium. The effectiveness of most polymers, such as the polyacrylamides, are reduced, and in many cases the polymers are actually precipitated in such brines. Thus, effective flocculating agents which will withstand such saturated brines are in demand.

POLYMER ADDITIVES

In some cases, various polymers have been found useful in more than one application, such as those described above. However, among the most severe applications is enhanced oil recovery, in which polymer additives must form stable and viscous aqueous solutions while exposed to high temperatures and dissolved electrolytes for as long as several years, often requiring retention of a solution viscosity of at least about 10 centipoises at room temperature, and must reduce the permeability of rock to the flooding water by adsorbing on the rock in the formation. Many commercial water-soluble polymers have been tested for applicability in enhanced oil recovery, but prior to the present invention no such polymer has fully satisfied the requirements referred to above.

Polyacrylamide, for example, provides the desired viscosity and reduces rock permeability in many instances, but it frequently loses viscosity in water containing dissolved electrolytes. Polyvinylpyrrolidone, although stable in the presence of dissolved electrolytes including multivalent cations at the temperatures high enough to cause hydrolysis of polyacrylamide at significant rates (i.e., >200° F.), has only been available in grades of low viscosity. Polyvinylpyrrolidone also demonstrates undesirable adsorption on rock, thus an undesirable resistance factor and residual resistance factor. Furthermore, polyvinylpyrrolidone is much more expensive than polyacrylamide and many other commercial polymers. Thus, it is apparent that as the demand for recovery and processing of natural resources increases, improved polymer additives for such processes as enhanced oil recovery will be in demand. See, e.g., Davison and Mentzer, "Polymer Flooding in North Sea Oil Reservoirs," paper SPE 9300, presented at Fall Conference of Society of Petroleum Engineers of AIME, Dallas, TX, Sept. 21-24, 1980 and published in the Society of Petroleum Engineers Journal, June 1982, pp. 353-62. Davison and Mentzer evaluated over 140 polymers (generally classified as polyacrylamides, polyvinylpyrrolidones, hydroxyethyl celluloses, cellulose sulphate esters, guar gums, xanthans and scleroglucans) for viscosity retention and porous media flow performance under high temperature (90° C., 194° F.), high salinity, and high pressure conditions. For polymer flooding in North Sea oil reservoirs, the criteria were that a polymer solution should be five times more viscous than sea water and lose less than 20 percent of its viscosity in 500 days at 90° C. Scleroglucan polymers gave the best performance in the tests, producing the required viscosity in polymer solutions of about 500 ppm and retaining most of this viscosity through 500 days' aging at 90° C. Polyacrylamides were "particularly unsuitable", as they precipitated within 60 days in 90° C. seawater, apparently due to the presence of calcium and magnesium ions. Polyvinylpyrrolidones were very stable but had to be used in high concentrations (20,000 ppm) to give adequate viscosity. There is no indication that copolymers of vinylpyrrolidones and acrylamides were tested. Thus, there is a substantial need for polymers which would be useful in the recovery of natural resources in hostile environments, such as in North Sea oil reservoirs, and in various operations for processing natural resources in hostile environments.

SUMMARY OF THE INVENTION

Among the objects of the invention are polymers suitable for use in the recovery and processing of natural resources, such as in enhanced oil recovery operations, in drilling, workover, and completion fluids, and in the treatment of minerals and water. Other objects of the invention are polymers suitable for use in subterranean well bores and reservoirs, such as oil-bearing reservoirs, and in the treatment of minerals and water when the polymers are exposed to severe conditions, including high temperatures and/or highly saline environments and/or water with a high concentration of hardness ions.

Other objects of the invention are processes for the recovery and processing of natural resources as described above. Further objects of the invention are processes for the recovery and processing of natural resources in which polymers are employed that are suitable for exposure to severe conditions as described above.

Other objects, advantages and features of the invention will be readily apparent to one skilled in the art from the following detailed description of the invention, the drawings, and the appended claims.

According to this invention, novel processes are provided comprising the introduction of polymers comprising an N-vinyl lactam and an unsaturated amide into a subterranean well bore, such that said polymers are exposed to hostile conditions such as temperatures of at least about 120° F. Said polymers are stable when exposed to water of significant salinity and/or hardness. The polymers can be at least partially dissolved in various fluids, including for example an aqueous fluid, or in a fluid containing at least one composition selected from the group consisting of bases, polymeric viscosifiers, surfactants and cosurfactants, and combinations of any two or more of said compositions. The polymers can be crosslinked with various crosslinking agents. The polymers are preferably water-soluble or water-dispersible.

Further according to this invention, novel methods are provided for the preparation of novel polymers of N-vinyl lactams, preferably N-vinyl-2-pyrrolidone, including homopolymers, copolymers and terpolymers. In one embodiment of the invention, such polymers are prepared using particular polymerization media and polymerization initiators or radiation sources, which produce polymers useful in the recovery and processing of natural resources, such as introducing such polymers into a subterranean well bore as above described. When the polymers are prepared in preferred polymerization media such as water containing mixed electrolytes with a free radical initiator, novel polymers are obtained which have relatively high viscosity and molecular weight, and maintain these properties even in harsh environments having high temperature and/or salinity and/or hardness. Also according to the invention, a polymerization medium consisting essentially of a tertiary alkanol and a free radical initiator can be employed.

Further according to this invention, novel methods are provided for the production of terpolymers, consisting essentially of the comonomers as described above polymerized with a minor amount of a termonomer of a hydrophobic or non-anionic character.

When these copolymers and terpolymers are prepared by combining the monomer units in certain preferred proportions in preferred polymerization media such as water containing mixed electrolytes, or a neat tertiary alkanol such as t-butyl alcohol, with a free radical initiator selected from certain organic azo compounds or organic peroxides, or using electromagnetic radiation such as gamma radiation, polymers are obtained which have high viscosity and molecular weight and which maintain their viscosity, thus their usefulness, even in harsh environments having high temperature, salinity and/or hardness, and when subjected to shear conditions. Certain of these polymers can be characterized by K values of greater than 140. (K values are related to relative viscosity, as discussed fully herein.) By using slightly different proportions of monomer units and different molecular weights in some cases, it has been discovered that the resulting copolymers and terpolymers are generally useful in processes for the recovery and processing of natural resources comprising enhanced oil recovery, use as additives for drilling, workover and completion fluids, selective plugging of zones of excess permeability in subterranean formations by in situ polymerization, the treatment of minerals in their recovery and processing, flocculation of suspended solids, and the thickening and treatment of water for various uses.

Further in accordance with this invention, it has been discovered that polymers of superior products can be prepared by a method of polymerizing a monomer mixture comprising N-vinyl pyrrolidone and acrylamide employing electromagnetic or nuclear radiation, preferably in an aqueous polymerization medium.

Furthermore, it has been discovered that in processes comprising the introduction of a polymer into a subterranean well bore so that said polymer is exposed to a temperature of at least about 120° F., especially in waters of high salinity and/or hardness, the copolymers and terpolymers of the prior art comprising monomers and termonomers as described herein can be used as well as the inventive analogous polymers prepared by the methods of this invention in the specified polymerization media. Further advantages are apparent when such polymers are exposed to temperatures of at least about 150° F., particularly for temperatures above about 200° F., including temperatures of 250° F., 275° F. and even 300° F.

Further in accordance with the present invention, polymers prepared in accordance with this invention are added to a liquid containing solids to aid in flocculating such solids, wherein the temperature of the liquid is at least about 150° F., and/or the liquid has a salinity of at least about 10 grams per kilogram of solution.

In accordance with one process of this invention, a polymerization inhibitor is introduced into an oil-bearing formation under conditions designed to allow permeation of the polymerization inhibitor into both the more permeable zones and the less permeable zones, followed by a flush which selectively removes the polymerization inhibitor from the more permeable zones. After this, a mixture of N-vinyl lactam, unsaturated amide and optionally, a minor portion of a termonomer, and a polymerization catalyst are introduced into said formation together or independently to form a fluid diversion plug in the absence of the polymerization inhibitor, thus selectively plugging the more permeable zones in the formation. The preferred monomers of this invention polymerize well in polymerization media similar to the connate water found in the oil-bearing formations, and the polymers thus formed in situ retain their viscosity well under the conditions encountered in "hostile" formation environments, e.g. high temperature, high salinity and/or high concentration of hardness ions.

DETAILED DESCRIPTION OF THE INVENTION

Polymers

Figure 1:
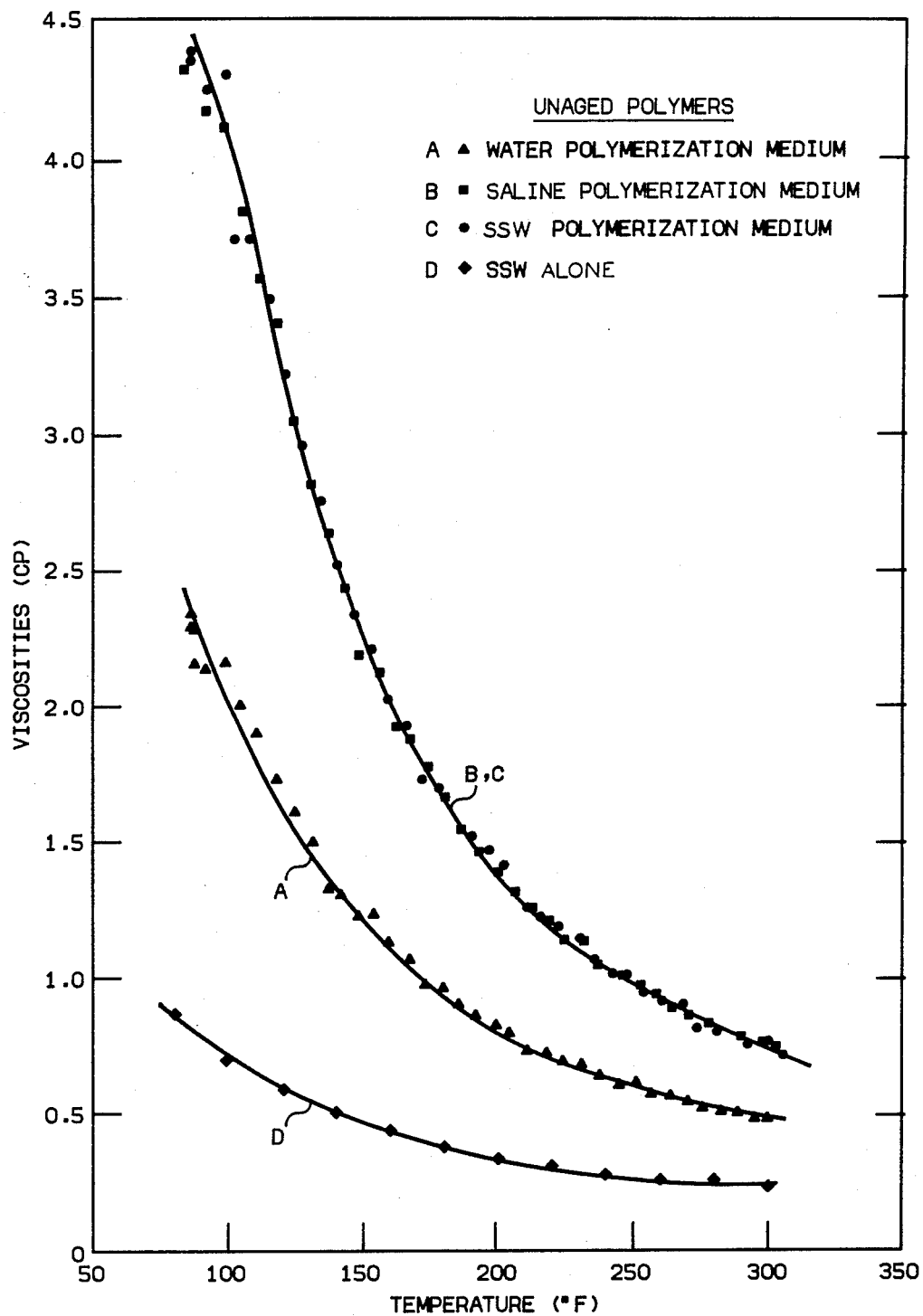
FIG. 1 shows the variation of viscosity with temperature of unaged polymers of this invention compared with polymers of the prior art and synthetic sea water.

As used herein the term "polymers" is used generically, unless otherwise indicated, to mean homopolymers, copolymers and terpolymers and thus includes polymers prepared using any number of monomers.

The homopolymers of N-vinyl lactams prepared in accordance with this invention have improved viscosity, and maintain this viscosity well under adverse conditions such as high temperature, high salinity and/or high concentration of "hardness" ions. Thus, despite their relatively high cost compared to some commercial polymeric viscosifiers, these polymers are suitable for certain processes for the recovery of natural resources under such adverse conditions.

The copolymers and terpolymers of this invention appear to be well suited for various applications including enhanced oil recovery (EOR), drilling fluid water loss additives, workover and completion fluid additives, selective plugging of "thief zones", minerals beneficiation, water thickening, water treatment, and the like. In a presently preferred embodiment, the copolymers and terpolymers, to be described subsequently, are well adapted because of their outstanding viscosity stability in hostile, saline, hard water environments, for polymerflooding purposes. A hostile environment for the purpose of this application is one in which the temperature, salinity and/or hardness cation content is high enough to cause precipitation, loss of viscosity and/or similar adverse effects within a nominal period of time in conventional polymers otherwise suitable for use in such applications. Such conventional polymers include, for example, polyacrylamides. The advantages of the polymers of this invention are apparent when they are employed in hostile environments of at least 120° F. Brackish and/or hard aqueous fluids having a salinity of at least about 10 grams per kilogram of solution and/or a fraction of divalent hardness ions to total cations of at least about 1 weight percent and particularly at least about 5 weight percent in combination with temperatures of at least about 120° F. are considered hostile environments. Since hardness cations such as $Ca^{+2}$ and $Mg^{+2}$ are particularly damaging to many such polymers, when the salinity and hardness cation content are relatively high the hostile zone is defined by a relatively lower temperature. A hostile environment, for example, is one wherein the reservoir temperature can be as low as 150° F. and the electrolyte concentration of dissolved salts in the available water, both seawater and formation water, is at least about 35,000 ppm (with about 1750 ppm combined calcium and magnesium ions), i.e., about 3.5 weight percent or higher, equivalent to a salinity of about 35 grams per kilogram of solution. At lower reservoir temperatures, from e.g. about 120° F. up to about 150° F., a relatively higher salinity and/or content of hardness cations would create such a hostile environment, say, for example a salinity of at least about 50-100 grams per kilogram with a fraction of divalent hardness cations to total cations of at least about 20 weight percent. At temperatures of at least about 120° F., a hostile environment for polymeric viscosifiers can also be created by a strongly basic environment, e.g., concentrations of at least about 5 weight percent of strong base, which accelerates the hydrolysis process in many polymers. Such conditions are encountered in processes comprising, e.g., caustic flooding of oil-bearing subterranean formations.

Although several biopolymers have been reported to be stable in sea water for extended periods at temperatures up to a range of from about 150° F. to nearly 200° F., above about 200° F. the only water-soluble polymer known to maintain its solution viscosity under these conditions is polyvinylpyrrolidone (PVP). However, PVP is relatively expensive and it requires high concentrations, e.g. about 2 weight percent or more, to obtain suitable viscosities for polymer flooding.

The copolymers and terpolymers of this invention are generally water-soluble or water-dispersible and cheaper to prepare than PVP. These polymers can be retained in solution in the aqueous polymerization medium in which they are prepared. When prepared by radiation polymerization in a viscous polymer mass (commonly known as a "gel log") the polymers are also water-soluble. However, when the polymer is separated from such an aqueous medium and dried, it is generally expected to be water-dispersible and/or swellable, but may not be completely water-soluble. On the other hand, the polymers separated from a polymerization medium consisting essentially of a tertiary alkanol in accordance with this invention and dried appear to be generally water-soluble, which can be an advantage when a granular, water-soluble polymer material is desired. They have been found to provide adequate solution viscosity with exceptional thermal stability and resistance to electrolyte effects, thus are superior to PVP for EOR in hot, saline environments, especially those containing "hardness" or multivalent metal cations such as $Ca^{+2}$, $Mg^{+2}$, etc. Their preparation and properties are described in Examples I, II, III, IV, V, VI, VII, VIII, XIV, XV, XVI, XVII, XVIII, XIX, XX, XXI, and XXII.

The polymers of this invention are derived from monomer units of N-vinyl lactams preferably having the formula

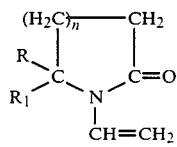

where R and $R_1$ are selected independently from the group consisting of hydrogen, methyl and ethyl and n is an integer of from 1 to 3. These monomers are generally water-soluble or water-dispersible. The monomer unit presently most preferred is N-vinyl-2-pyrrolidone. Preparation and properties of the homopolymers are described in Examples XI and XII.

The copolymers of this invention are produced by copolymerizing a comonomer of an unsaturated amide having the formula

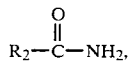

where $R_2$ is an unsaturated radical selected from the group ethenyl (vinyl), propenyl, isopropenyl, 1-butenyl, isobutenyl(2-methyl-1-propenyl), 1-pentenyl, 1-isopentenyl(3-methyl-t-butenyl), and 1-methyl-1-butenyl with a comonomer of at least one N-vinyl lactam as described above. These unsaturated amides are generally water-soluble or water-dispersible. The monomers presently preferred are N-vinyl-2-pyrrolidone (VP) and acrylamide (Am). For convenience, the terms VP and Am will be used to refer to the first and second monomers, respectively, in the discussions herein.

The minimum amount of N-vinyl lactam comonomer required is that amount necessary to provide the desired polymer properties, e.g. viscosity and stability, under the expected environmental conditions. For example, polymers containing a minor amount, up to about 10 weight percent, of the vinyl lactam could be effective in the recovery and processing of natural resources, such as for example in enhanced oil recovery in reservoirs having temperatures in the range of about 120 F. to about 150 F. and/or formation waters of significant salinity and/or hardness. Polymers of these proportions could also be useful under more adverse conditions if exposed for shorter periods of time.

The monomer weight ratios of the copolymers can vary rather widely. Generally, VP:Am ratios in the range from about 10:90 to about 90:10 are employed depending upon the intended application, but preferably VP:Am weight ratios in the range of about 25:75 to about 75:25 are employed, more preferably from about 40:60 to about 70:30. The optimum VP:Am weight may vary according to the application. For example, in EOR the range presently preferred is from about 65:35 to about 50:50, based on prolonged aging studies conducted with the copolymers, but for in situ polymerization applications a relatively broad range of from 25:75 to 75:25 is preferred. A copolymer presently particularly preferred for certain applications after heat aging at 250 F. contains about 60 weight percent VP and about 40 weight percent Am, corresponding to a 1:1 molar ratio. The VP:Am weight ratios of 10:90 to 90:10 correspond to molar ratios of about 6:94 to 85:15.

After heat aging, copolymers of these 60:40 proportions have been found to retain their viscosity well in hot, saline environments. On the other hand, when the copolymers are to be used without such pre-aging, higher, if less persistent, viscosities have been obtained with copolymers having VP:Am weight ratios in the range of from about 45:55 to about 55:45, or preferably about 50:50. Since the VP:Am weight ratios are expressed in terms of 100 parts by weight of the copolymer, the weight percentages of the monomer units in the copolymer can be read directly.

Further in accordance with this invention, novel and useful terpolymers can be prepared by copolymerizing a first monomer unit of an N-vinyl lactam and a second monomer unit of an unsaturated amide as described above with a minor portion of a third monomer selected from the group consisting of hydrophobic compounds, vinyl pyridines and hydroxyalkyl esters of ethylenically-unsaturated carboxylic acids and combinations of any two or more thereof. For convenience, the third monomer will hereinafter be referred to as a termonomer, as distinguished from the first and second monomer units described above, which are referred to as comonomers, or VP and Am for convenience. The hydrophobic compounds suitable for the termonomers are generally selected from the group consisting of monovinyl aromatic hydrocarbons having from 8 to about 12 carbon atoms such as styrene, vinyl esters of saturated carboxylic acids having from 3 to about 6 total carbon atoms such as vinyl acetate, alkyl esters of ethylenically-unsaturated monocarboxylic acids having from 3 to about 22 carbon atoms, such as ethyl acrylate, and ethylenically-unsaturated nitriles having from 3 to about 5 total carbon atoms, such as acrylonitrile. Other suitable compounds include vinyl pyridines such as 4-vinyl pyridine, and hydroxyalkyl esters of ethylenically-unsaturated monocarboxylic acids having from 3 to about 22 carbon atoms, such as hydroxyethyl acrylate. Termonomers which are presently preferred comprise methyl acrylate, butyl acrylate, methyl methacrylate, lauryl methacrylate, acrylonitrile and styrene for increasing the hydrophobic character of the terpolymers, vinyl pyridines, hydroxypropyl methacrylate and hydroxyethyl methacrylate and hydroxyethyl acrylate as water soluble monomers which increase the hydrophilic character of the terpolymers without introducing termonomers which are sensitive to metal cations (and because good results have been obtained with 4-vinylpyridine and 5-methyl-2-vinylpyridine); and vinyl acetate due to its low cost and ready availability.

As with the copolymers, the monomer weight ratios of the terpolymers can vary rather widely, depending upon the intended application, but preferably the termonomer will be present as no more than about 10 weight percent of the monomer units charged. The first and second monomer units can be present in approximately the range of weight ratios disclosed for the copolymers, constituting the major portion of the terpolymer, with the termonomer providing the remaining minor portion. For example, the terpolymer can consist of 45 weight percent each of the first and second monomers, with 10 weight percent of the termonomer, 49 weight percent each of the first and second monomers with 2 weight percent of the termonomer, and so on. These examples contain the first and second monomer units in weight ratios of 50:50, but as disclosed above, the three monomer units can be combined in any combination, provided the termonomer does not exceed 10 weight percent, but preferably is at least 1 weight percent, and the first and second monomer units are within the range of weight ratios as disclosed for the copolymers. Based on the examples, the termonomer is preferably present as from about 2 to about 8 weight percent, or more preferably, from about 3 to about 5 weight percent, based upon total monomers.

As the copolymerization reaction produces polymer in near-quantitative yield, the desired ratios of VP to Am can be obtained by controlling the ratios of VP monomer and Am monomer charged to the reactor and the rates at which the monomers are fed into the reactor.

Polymer Characterization

The polymers of this invention can be characterized as to relative molecular weight and viscosity by K values calculated from measured relative viscosities $\eta_{rel}$ at various concentrations. In this calculation, $K = 1000k$, where k is Fikentscher's constant, obtained from the equation $$\frac{\log \eta_{rel}}{C} = \frac{75 \, k^2}{1 + 1.5 \, kC} + k.$$

where $\eta_{rel}$ is the viscosity of the solution compared with its solvent and C is concentration in grams per 100 milliliters (or 1 deciliter) of solution. The development and significance of K values are discussed more fully in Example VIII.

In contrast to the copolymers of 50-99 mole percent N-vinyl-2-pyrrolidone and 1-50 mole percent acrylamide, with K values of 10 to 140, disclosed and claimed by U.S. Pat. No. 3,500,925, the copolymers of this invention have K values of more than 140 when measured at concentrations of 1 gram/deciliter or less. The highest K values generally correlate with the preferred methods of preparation and testing of the copolymers of this invention, as described in Example VIII. Copolymer solutions prepared and tested by the methods presently considered optimum can have K values in the range from of about 150 to at least about 250.

The polymers of this invention can be further characterized by measuring the cloud point temperature, as defined and more fully discussed herein and in Examples V, VI and XVII. The polymers are preferably tested for cloud point temperature after heat aging for a period of time which produces an equilibrium cloud point temperature representative of the polymer's performance in, e.g., enhanced oil recovery in reservoirs of equivalent temperatures. The equilibrium cloud points appear to correspond to an equilibrium degree of hydrolysis, as defined elsewhere herein, generally limited to about 70-80 percent, which may partially account for the superior properties of the preferred copolymers.

Polymerization

The polymers of this invention can be formed using solution, emulsion, inverse emulsion (water-in-oil) or slurry polymerization processes. In one embodiment of the invention, a process for producing the polymers comprises carrying out the polymerization in a homogeneous solution process in which the polymerization medium is water containing certain dissolved mixed electrolytes, or presently most preferably, water containing appropriate dissolved salts such as found in sea water, to provide a simulated or synthetic sea water (SSW). Natural sea water and formation brines can also be used in the polymerization media and can be filtered to remove solid material if desired or necessary. Brines containing a high percentage of dissolved solids can be diluted with fresh water to provide an appropriate concentrations of dissolved solids. Alternatively, salts can be added, if deemed necessary to obtain the desired salt level. In another embodiment, slurry polymerization is preferably conducted with a polymerization medium consisting essentially of an alcohol, preferably a neat tertiary alkanol which generally has from 4 to about 8 carbon atoms, most preferably t-butyl alcohol, since the polymeric product is insoluble in the alcohol and can thus be conveniently separated.

In accordance with one embodiment of the invention, the inventive processes can be used to prepare the inventive polymers by carrying out the polymerization out in a polymerization medium using monomer concentrations ranging broadly from the minimum required to produce a polymer solution of the desired viscosity, e.g., as low as 0.1 weight percent, up to very concentrated solutions which amount to admixtures of the monomers with a minor amount of the polymerization medium, e.g., as high as 80 weight percent monomers based on the monomers plus medium. The polymers prepared in the preferred media in monomer concentrations over this broad range will all exhibit stable viscosities, when exposed to hostile environments of high temperature and/or salinity and/or hardness, but will not be as viscous as those prepared at optimum monomer concentrations. However, the polymers are generally produced from solutions of total monomer concentrations ranging from about 5 to about 50 weight percent. Preferably, polymerization is carried out in a solution of total monomer concentration in the range from about 10 to about 40 weight percent, since the use of monomer concentrations below about 10 weight percent tends to be uneconomical, and optimum polymer viscosity is generally obtained at less than about 35 weight percent monomers. Also, when a high concentration of electrolytes is to be used in an aqueous medium, the higher concentrations of monomers may inhibit the solubility of the electrolytes. For free radical initiation in aqueous media containing electrolytes, monomer concentrations in the range of from about 15 to about 35 weight percent are most effective, with concentrations of about 20 to 30 weight percent particularly preferred. For alcoholic media, monomer concentrations in the range of from about 15 to about 35 weight percent are most effective, with concentrations of about 20 to 30 weight percent particularly preferred.

For a given polymer and set of polymerization conditions, the viscosity obtained will reach a maximum for a certain range of monomer concentrations in the polymerization medium, generally lying between about 20 to about 50 weight percent. Reaction rate increases, thus reaction time decreases, as the weight percent of monomers is increased. Thus, it is generally desirable to use a concentration of monomers which will produce a polymer of maximum viscosity in a reasonable reaction time. Other considerations are the actual viscosity required of the polymer in its applications, solubility of the polymer in its applications, solubility of the polymers in water, and transportation/handling expenses.

The SSW used for preparation of many of the polymers described herein (unless otherwise indicated), for example, was prepared with the ingredients tabulated below to contain the following quantities of dissolved salts.

| Compound | Quantity |
| --- | --- |
| $NaHCO_3$ | 3.69 g |
| $Na_2SO_4$ | 77.19 g |
| NaCl | 429.00 g |
| $CaCl_2$ | 29.58 g |
| $MgCl_2$ | 193.92 g |
| $H_2O$, distilled | 18.0 liters |

This "recipe" was calculated to produce the ionic concentrations tabulated below:

| Ion | Concentration, ppm |
| --- | --- |
| $Na^+$ | 10,550 |
| $Ca^{+2}$ | 437 |
| $Mg^{+2}$ | 1,256 |
| $HCO_3^-$ | 145 |
| $Cl^-$ | 18,540 |
| $SO_4^{-2}$ | 2,828 |
| Total | 33,756 |

This was equivalent to a total concentration of dissolved salts of about 3.4 weight percent, or an ionic strength of about 0.7. The divalent hardness cations ($Ca^{+2}$ and $Mg^{+2}$) amounted to about 16 weight percent of the total cations. Various combinations of such salts can be used to prepare solutions with ionic concentrations approximating those of sea water from various locations.

Electrolyte-containing SSW polymerization media employed in the invention can have salinity values ranging from about 10 to 100 g per kg, and preferably from about 30 to about 43 g/kg, of the solution. Salinity is defined as the total dissolved solids in sea water. In natural sea water, salinity and chlorinity are related by the expression: salinity = 1.835 × chlorinity, according to "The Oceans, Their Physics, Chemistry and General Biology", by H. V. Sverdrup, M. W. Johnson and R. H. Fleming, Prentice-Hall, Inc. 1942, p. 51. Thus, calculated chlorinities corresponding to salinities of 30 to 43 g/kg of solution range from about 16 to about 23 g/kg of solution. The ionic strengths of the solutions corresponding to these ranges vary from about 0.6 to about 0.9. It can readily be seen that a salinity of 100 g/kg is approximately equivalent to 10 percent dissolved solids, based upon the weight of the solution.

The Sverdrup reference, on p. 55, states that salinity in the oceans generally lies between about 33 to 37 g/kg sea water but may reach 40 g/kg sea water or more in certain locations such as the Red Sea. However, the reference states, on p. 165, that regardless of the absolute concentration of dissolved solids, the ratios between the more abundant substances remain virtually constant. Preferably, synthetic sea water composition should have approximately this ratio, although the overall concentration can vary.

A composition for simulated sea-salt for preparation of "substitute ocean water" (SOW) is disclosed is ASTM D-1141 (1982, part 31, p. 1074). The composition contains the following compounds which when dissolved in water at the quantities shown to make a liter of solution will provide a substitute ocean water for testing purposes. The materials and the quantities required to make a liter of solution are shown in the table.

TABLE 1

| Substitute Ocean Water - ASTM D 1141 | | |
| --- | --- | --- |
| Compound | g/L | Weight Percent |
| NaCl | 24.53 | 68.08 |
| $MgCl_2$ | 5.20 | 14.43 |
| $Na_2SO_4$ | 4.09 | 11.35 |
| $CaCl_2$ | 1.16 | 3.22 |
| KCl | 4.695 | 1.93 |
| $NaHCO_3$ | 0.201 | 0.56 |
| KBr | 0.101 | 0.28 |
| $H_3BO_3$ | 0.027 | 0.07 |
| $SrCl_2$ | 0.025 | 0.07 |
| NaF | 0.003 | 0.008 |
| Totals | 36.032 | 99.998 |
| $Ba(NO_3)_2$ | 0.0000994 | |
| $Mn(NO_3)_2$ | 0.0000340 | |
| $Cu(NO_3)_2$ | 0.0000308 | |
| $Zn(NO_3)_2$ | 0.0000096 | |
| $Pb(NO_3)_2$ | 0.0000066 | |
| $AgNO_3$ | 0.00000049 | |

The compounds above the line generally comprise those used in making substitute ocean water. Such a product is commercially available as "sea salt" from Lake Products Co., Inc., Ballwin, Mo. Substitute ocean water at a concentration of about 4.1 weight percent was used in Example XXII. The trace amounts of the compounds listed below the line can be optionally included to more closely approximate ocean water when desired.

The chlorinity of the 10 component system (Table 1) used in preparing the substitute ocean water is about 19.26 g/kg solution, counting the bromide and fluoride ions as chloride ions. This corresponds to a calculated salinity of about 35.3 g/kg solution. The total dissolved solids are 36.03 g/L of solution, which amount to about 3.5 weight percent of the solution.

At a constant weight ratio of components as indicated in Table 1, the weights of each component can be calculated at various salinities for the 10 component system. The calculated weights, total dissolved solids and estimated weight percent thereof based on 1 liter of solution and the calculated ionic strengths thereof are given in Table 2.

TABLE 2

| Calculated Component Ranges for Substitute Ocean Water | | | | |
| --- | --- | --- | --- | --- |
| | Salinities | | | |
| Component | 30 | 33 | 40 | 43 |
| NaCl, g | 20.85 | 22.93 | 27.80 | 29.88 |
| $MgCl_2$, g | 4.42 | 4.86 | 5.89 | 6.33 |
| $Na_2SO_4$, g | 3.47 | 3.82 | 4.63 | 4.98 |
| $CaCl_2$, g | 0.986 | 1.08 | 1.31 | 1.41 |
| KCl, g | 0.591 | 0.650 | 0.788 | 0.847 |
| $NaHCO_3$, g | 0.171 | 0.188 | 0.228 | 0.245 |
| KBr, g | 0.086 | 0.094 | 0.114 | 0.123 |
| $H_3BO_3$, g | 0.023 | 0.025 | 0.031 | 0.033 |
| $SrCl_2$, g | 0.021 | 0.023 | 0.028 | 0.030 |

TABLE 2-continued

| Calculated Component Ranges for Substitute Ocean Water | | | | |
|---|---|---|---|---|
| | Salinities | | | |
| Component | 30 | 33 | 40 | 43 |
| NaF, g | 0.0025 | 0.0028 | 0.0034 | 0.0037 |
| Total Dissolved Solids, g | 30.62 | 33.67 | 40.88 | 44.28 |
| Wt. % Solids | 3.0 | 3.3 | 4.0 | 4.3 |
| Calculated Ionic Strength | 0.60 | 0.67 | 0.81 | 0.87 |

The data presented in Table 2 show that the calculated ionic strengths for salinities varying from 30 g to 43 g per liter of solution range from about 0.6 to about 0.9.

At a constant weight ratio of the 5 component SSW system generally used in the invention, the weights of each component are calculated for salinities ranging from 30 g to 43 g per liter of solution. The calculated weights, total dissolved solids and estimated weight percent thereof based on 1 liter of solution and the calculated ionic strengths thereof are given in Table 3.

TABLE 3

| Calculated Component Ranges For Synthetic Sea Water (SSW) | | | | |
|---|---|---|---|---|
| | Salinities | | | |
| Component | 30 | 35.3 (SSW) | 38 | 43 |
| NaCl, g | 19.950 | 23.830 | 25.650 | 29.030 |
| MgCl$_2$, g | 4.288 | 5.046 | 5.432 | 6.147 |
| Na$_2$SO$_4$, g | 3.644 | 4.288 | 4.616 | 5.223 |
| CaCl$_2$, g | 1.396 | 1.643 | 1.769 | 2.001 |
| NaHCO$_3$, g | 0.174 | 0.205 | 0.221 | 0.250 |
| Total Dissolved Solids, g | 29.452 | 35.012 | 37.688 | 42.651 |
| Wt. % Solids | 2.9 | 3.4 | 3.7 | 4.1 |
| Calculated Ionic Strength | 0.59 | 0.70 | 0.76 | 0.86 |

The presently preferred polymerization medium used to produce the polymers of this invention is the 5 component system shown in Table 3 above having a calculated ionic strength of about 0.7 and about 3.4 weight percent dissolved solids. It is expected that polymerization media shown in the various tables, regardless of the number of components present in the media, which have calculated ionic strengths ranging from about 0.6 to about 0.9, will also be highly suitable in preparing the various outstanding polymers of this invention. Also, more concentrated or more dilute versions of these SSW compositions, having ionic strengths in the range from about 0.2 to 3.0, can be prepared and used as polymerization media for this invention.

On the other hand, the aqueous polymerization media of this invention can be based on oil field brines, at natural or dilute strength. Such brines can be filtered or otherwise purified to remove undesirable solid matter.

Oil field brines can contain up to about 25% by weight, based on water, of dissolved inorganic salts. In addition to NaCl, brines usually contain up to about 10% by weight, based on the total amount of salts present, of $Ca^{+2}$ and $Mg^{+2}$. Small amounts of other soluble Periodic Group I and Group II salts are also frequently present, e.g., NaHCO$_3$, KCl, BaCl$_2$ and the like. Typical brines contain from about 1 to 14 wt.%, based on water, of dissolved salts.

Although the reasons for the superiority of aqueous polymerization media containing electrolytes are not presently understood, polymers prepared in such media have been found to have higher viscosities and higher K values than similar polymers prepared in conventional media such as distilled water. Also, these polymers are more resistant to high temperature, salinity and hardness ions, retaining their viscosity longer under such conditions than the polymers prepared using media such as distilled water, even under the imposition of high shear, as seen by the screen tests of Example IX.

A presently preferred electrolyte mixture for the aqueous polymerization media of this invention contains at least one electrolyte selected from a first group consisting of alkali metal salts and, at least one electrolyte selected from a second group consisting of alkaline earth metal salts, as an approximation to a synthetic sea water. Although not presently understood, it appears that the combination of monovalent and divalent cations is at least one property of synthetic sea water which enhances the properties of copolymers prepared in such media. Thus, it is believed that a fraction of divalent hardness cations to total cations of at least about 1 weight percent will improve a polymerization medium containing NaCl or other alkali metal electrolytes. Since the synthetic sea water used successfully contained about 16 weight percent hardness cations (based upon total cations), the polymerization media of this invention should preferably contain such a fraction of at least about 10 weight percent hardness cations, but can contain up to about 50 weight percent or even more, as with simple mixtures of the alkali metal and alkaline earth salts. The presence of certain anions may also enhance the effect of the polymerization media described herein, perhaps through a buffering action. Various concentrations of the salts can be used, generally ranging from about 0.1 to about 10 weight percent or more, preferably at least 1 weight percent, based upon the total weight of the polymerization medium. For polymers to be used in certain applications, such as, e.g., minerals recovery or beneficiation, salt concentrations of up to saturation can be advantageously used.

In addition to the use of a specified concentration of a mixture of electrolytes containing both alkali and alkaline earth metal salts, the aqueous polymerization media containing such electrolytes can be characterized by the resulting Ionic Strength, given by the formula $$I.S. = \tfrac{1}{2}\Sigma C_1 Z_1^2 + C_2 Z_2^2 + \ldots C_n Z_n^2$$

where $C_1$, $C_2$, etc. each represent the molar concentration of a different ion in the polymerization media, $Z_1$, $Z_2$, etc. are the charges of the respective ions, both positive and negative, and n equals the number of different ions in the polymerization medium.

For further discussion of Ionic Strength, see, e.g., Fritz and Schenk, "Quantative Analytical Chemistry", Second Edition (Allyn & Bacon, Boston, 1969), pages 9–10.

Generally, aqueous polymerization media with electrolyte Ionic Strengths in the range of from about 0.4 to about 3.0 are effective in improving the properties of the polymers of this invention; preferably, amounts of mixed electrolytes sufficient to produce an Ionic Strength of in the range from about 0.5 to about 2.0 are used, as Ionic Strengths in this range have been found to produce significant improvements in the polymers prepared in such polymerization media. Aqueous polymerization media having Ionic Strengths of in the range from about 0.6 to about 0.8 are presently preferred for most applications, as polymers having viscosities higher than otherwise obtainable and excellent heat stability can be prepared therein. These ionic strengths "bracket" the Ionic Strength of natural sea water, which for, e.g., the North Sea, is about 0.7.

The pH of the aqueous polymerization media employed in this invention should be controlled during the polymerization process, as excessive acidity or alkalinity can adversely affect the polymerization process or result in excessive hydrolysis of the product copolymer. Generally a pH in the range of from 4 to about 10 is acceptable, with a range of from about 6 to about 8 preferred. An added benefit of the use of electrolytes in the polymerization media of this invention is that the combinations of electrolytes used generally will buffer the pH to a value within the preferred range, as with natural sea water.

If the polymer is to be made on or near an offshore oil recovery site natural sea water would predictably be the preferred polymerization medium, due to its suitable properties and ready availability at low cost. Sea water may require treatment to render it suitable for use as a polymerization medium and/or oil recovery flooding fluid, such as, for example, filtering to remove extraneous solids such as sand and microorganisms and treatment with a biocide to prevent the growth of microorganisms. Flooding fluids should preferably be similar to and/or compatible with the formation water, as is known to those skilled in the art.

Polymerization Initiators

The polymers of this invention can be prepared by processes using various free radical polymerization initiators known to those skilled in the art. Preferred initiators include chemical polymerization initiators, the introduction of electromagnetic or nuclear radiation to generate free radicals, and combinations of both techniques.

Chemical polymerization initiators employable in the polymerization processes are oil or water soluble compounds known in the art to generate free radicals for this purpose selected from azo compounds and organic peroxides such as 2,2'-azobisisobutyronitrile (commercially available as Vazo-64 ® from E. I. Du Pont), 2-t-butylazo-2-cyanopropane, 2,2'-azobis(2,4-dimethylvaleronitrile), 2-t-butylazo-2-cyanopropane, 2-t-butylazo-2-cyanobutane, 2-t-butylazo-1-cyanocyclohexane, benzoyl peroxide, di-t-butyl peroxide, t-butyl peroxy- acetate, t-butyl peroxypivalate, 2-t-butylazo-2-cyano-4-methoxy-4-methylpentane (commercially available as Luazo ® 55 from Lucidol Div., Pennwalt Corp.) and 2-t-butylazo-2-cyano-4-methylpentane (Luazo ® 70, available from same source), 4,4'-azobis(4-cyanovaleric acid), 4-t-butylazo-4-cyanovaleric acid and the like. The azo compounds are presently preferred for most applications, as some peroxides appear to have a tendency to adversely affect the polymer; however, some peroxides are effective at lower temperatures than those at which most azo compounds are useful. Presently preferred compounds include t-butyl peroxypivalate (t-BPP) (particularly for the polymerization media of t-alkanols), Luazo 55, Luazo 70, and especially azo-bisisobutyronitrile (AIBN), since polymers prepared in its presence generally yield more viscous solutions, e.g., higher molecular weight polymer, than those prepared in the presence of t-butyl peroxypivalate. Luazo 70 has been found to give excellent results because, as a liquid, it is more uniformly dispersible in aquo than solids such as AIBN. Luazo 55, also a liquid, should display a similar advantage. The 4-cyanovaleric acid compounds are preferred because they are water soluble. An inert atmosphere substantially free of free oxygen or other known inhibiting materials should be provided when chemical polymerization initiators are used.

Chemical polymerization initiators which are substantially soluble in the polymerization media of this invention can be added directly to the monomer solution, or dissolved or dispersed in a small amount of solvent which is miscible or soluble therein before being added to said monomer solution.

Chemical polymerization initiators which are insufficiently soluble in the polymerization media of this invention in the concentration required for initiation can be added in the commercially available state or dispersed as a fine powder, but are generally more effectively employed if dissolved in a liquid soluble or miscible in the medium. For example, a water-miscible solvent such as acetone or an alcohol can be used to solubilize azobisisobutyronitrile, the preferred chemical initiator, and to disperse it in the aqueous polymerization media.

The polymers of this invention can also be prepared in processes where initiation can be achieved at least partially by irradiation by electromagnetic or nuclear radiation, e.g., gamma radiation, as known to those skilled in the art. The resulting polymers when diluted with water or SSW to a common solids level, for example 2 weight percent or less, are generally found to exhibit solution viscosities comparable to or greater than similar polymers prepared by chemical initiation. Such irradiation can be used to initiate polymerization either alone or in conjunction with the chemical initiators already mentioned as well as other commonly used free radical initiators and sensitizers. In contrast to the inert atmosphere required when chemical initiators are used, free oxygen can be present when radiation alone is used to initiate polymerization, although superior results are obtained when oxygen is excluded. While gamma radiation from sources such as Cobalt 60, Cesium 137 and Iridium 192 is presently preferred, other sources of radiation can be used, including X-rays, beams of neutrons, electrons or other charged particles, or ultraviolet light from sunlight or artificial sources. An amount and intensity of such radiation should be used effective to provide the desired viscosity and an essentially complete polymerization.

The intensity of the radiation, thus the dosage rate, can be varied during the process. Dose and dose rate are interdependent variables, and should be selected in tandem, and in conjunction with other relevant variables as known to those skilled in the art.

Radiation methods can be used to initiate polymerization in various aqueous and organic media. The inventive polymers can be prepared by radiation polymerization in aqueous media containing mixed electrolytes, as previously disclosed, or in media consisting essentially of at least one alcohol, preferably a neat tertiary alkanol, as previously disclosed.

It has been discovered that polymers of exceptional viscosity and resistance to the adverse effects of hostile environments, e.g., high temperature, salinity, hardness ion content or alkalinity, can be prepared by a method comprising polymerizing a monomer mixture comprising N-vinyl pyrrolidone and acrylamide by free radical initiation at least partially carried out by the introduction of electromagnetic or nuclear radiation, preferably gamma radiation. Preferably an aqueous polymerization medium is used, with media comprising a synthetic sea water or mixed electrolytes as previously disclosed particularly preferred.

Radiation polymerization can be carried out over a broad range of polymerization temperatures (taken as the average temperature of the monomer solution), ranging from just above freezing to just below the boiling point of the monomer solution. However, as shown in Example XXIII, chilling the monomer solution to counteract the heating effect of the polymerization reaction can produce advantages such as higher molecular weight. Thus, in one embodiment, it is preferred to chill the monomer mixture to a temperature above freezing before, during, and/or after irradiation.

Normally, about 0.05 to about 2.0 weight percent of chemical initiator based on total monomer weight is used for chemical initiation alone, with a reaction temperature in the range of about 20° to about 80° C., preferably about 50° C. The reaction is generally substantially complete, e.g. providing substantially quantitative monomer conversion, after about 1 to about 10 hours. Smaller quantities of initiator require longer polymerization time, but produce higher molecular weights. A reaction time of about 2 hours is normally employed in bench scale processes. The resulting polymers are not necessarily isolated. Instead, the solutions are further diluted as formed to obtain the desired concentration of polymer. However, the polymers generally can be isolated, dried and redissolved or dispersed at or near the location where they are to be used, thus minimizing transportation costs. Generally, the polymers formed in an alcoholic medium are more readily isolated, if desired, than those formed in aqueous media.

Monomer Proportions

The first and second monomer proportions for copolymers of this invention can vary widely, as previously disclosed. Generally, VP:Am weight ratios of about 10:90 to about 90:10, as applied to the mixture of monomers polymerized, are used, but copolymers having VP:Am weight ratios as low as 5:95 and as high as 99:1 can be prepared and employed for specialized applications. Generally, the minimum amount of the VP monomer required to produce copolymers of the desired characeristics will be used.

For enhanced oil recovery applications, the preferred copolymers of this invention comprise copolymers of N-vinyl-2-pyrrolidone (VP) and acrylamide (Am) in which the weight ratios of VP:Am preferably range from about 30:70 to about 70:30. The higher proportions of VP are preferred for reservoirs having more "hostile" conditions, e.g., higher temperature, salinity and hardness of the formation water. For example, copolymers for use at over 260 F. should preferably contain at least about 60 weight percent VP, while copolymers for use at about 250 F. can have about 50 weight percent VP or more. For lower temperatures, copolymers with lower proportions of VP can be tolerated; e.g., for temperatures of about 220 to about 250 F., about 40 weight percent VP or more should suffice, while for temperatures as low as 200 F., the copolymers can contain at least about 30 weight percent VP. Copolymers having VP:Am monomer weight ratios in the range of from about 65:35 to about 55:45, or about 60:40, are particularly preferred for use in high temperature EOR as these copolymers will produce the highest viscosity relative to sea water after a short equilibration time in the high temperature reservoir. For applications requiring shorter stability times, greater viscosity can be obtained from copolymers of higher acrylamide content, although these are less stable than the 60:40 compositions. While 60:40 (VP:Am) copolymers are presently preferred for long-term high temperature applications, 50:50 weight percent copolymers have displayed exceptional thermal stability in aging studies conducted in water, and particularly in SSW, at temperatures ranging from about 200 to about 300 F. See Examples I and II. For example, such 50:50 copolymers, employed as 2 weight percent solutions in SSW, have given clear solutions after aging at 250 F. for more than 487 days while the solution viscosities remain about the same or somewhat higher than when first tested. Although the majority of testing has involved the 50:50 copolymers, which are presently preferred for use at temperatures of about 240–260 F., tests of aged 60:40 (VP:Am) copolymers show that they are generally superior at temperatures above about 250 F. Additional tests of the 50:50 copolymers conducted at 300 F. in SSW have shown that the solutions may turn cloudy without loss of most viscosity after a few days aging, but that the cloudiness disappears upon slight cooling. The cloudiness typically first appears at a temperature between about 260 and about 280 F. Based on these observations, it appears that a preferred upper temperature limit for long-term thermal stability for the preferred inventive 50:50 copolymers is in the range of about 280–300 F. Cloud points for the 60:40 copolymers are in the range of 290–320 F., suggesting 320 F. as the upper preferred use temperature for these compositions. For certain applications, e.g., drilling fluids, some of the preferred aged or unaged polymers can be subjected to temperatures as high as at least about 330 F. for periods of a few days, or temperatures as high as at least about 400 F. for periods of a few hours.

While preaged copolymers of approximately 60:40 VP/Am weight ratios are presently preferred for use in high temperature enhanced oil recovery, the copolymers of this invention can be "designed" and prepared in proportions which result in properties which are optimal for various other applications. Copolymers useful in drilling wells, including use as additives for drilling, workover and completion fluids, can have any desired weight ratio, but generally such weight ratios will be from about 30 to about 60 weight percent VP with the balance Am. The exact proportions can be chosen to produce properties comprising high viscosity and resistance to high temperatures, salinity and hardness ions which are optimal for the environment in which the drilling, workover or completion fluid is to be used. As mentioned earlier, the requirements for drilling, workover and completion fluids differ significantly; e.g., drilling fluids are normally thickened with clay, while workover fluids are preferably clay-free.

In general, when conditions are less severe, e.g., the fluids are to be exposed to high temperatures, salinity and/or hardness ion concentrations for shorter periods of time, a lower proportion of VP can be used in the copolymer, thus reducing costs and increasing the viscosity attainable per unit of copolymer.

Conversely, for very hostile environments and extended exposures, as in, e.g., the polymer flooding of a North Sea reservoir, a higher proportion of VP will generally be required for effectiveness, regardless of the relative cost.

For applications requiring mainly a flocculant, as, e.g., water treatment and/or thickening, clarification of beverages, or minerals beneficiation, lower proportions of VP can be used, e.g. in the range of from about 20 to 50 weight percent, with the remainder Am. In example XXIII, a copolymer having 30% VP and 70% Am was successfully used to flocculate and remove clay from a turbid river water sample.

The terpolymers of this invention can also be tailored for certain applications by adjusting the proportions and types of monomers charged. For simplicity, the term "termonomer" is used herein to mean a monomer or monomers other than the principal monomers of N-vinyl lactam and unsaturated amide, although it is recognized that technically N-vinyl lactam and unsaturated amide are also termonomers. A minor portion of a termonomer, for example a hydrophobic compound, is included to alter characteristics of the polymer such as its tendency to adsorb on or absorb in a rock formation. (Adsorption refers to the attachment of polymer molecules to the rock surface by physical or chemical means, while absorption refers to such larger scale phenomena as imbibing of the polymer solution within the pore structure of the formation rock.) Other polymer characteristics which can be altered by incorporating such a termonomer in the polymer include solubility in water, brine and oils, as well as crosslinking ability. The terpolymers of this invention have been found to be as stable as the copolymers under conditions of high temperature and/or salinity and/or hardness, as shown in Examples XV through XXI, and thus provide stable polymers with various useful properties.

The termonomer can be added in a quantity in the range of from about 0.1 to not more than about 10 weight percent of the total monomers charged. The major portion of the terpolymer consists essentially of the first monomer and second monomer as disclosed for the copolymers, with their relative proportions or weight ratios variable over the same range as in the copolymers to adapt the polymers for various applications.

Generally, the terpolymers can contain in the range of from about 10 to about 90 weight percent of an N-vinyl lactam such as N-vinyl-2-pyrrolidone as a first monomer, with a second monomer of an unsaturated amide such as acrylamide in the range of from about 90 to about 10 weight percent and the termonomer as disclosed above present as an amount in the range of from about 0.1 to about 10 weight percent, preferably from about 1.0 to about 10 weight percent. Preferably, the terpolymers contain about 25 to about 75 weight percent N-vinyl lactam, about 75 to about 25 weight percent unsaturated amide, and about 2 to 8 weight percent termonomer. A termonomer content of about 3 to about 5 weight percent is presently most preferred. For enhanced oil recovery applications at reservoir temperatures of above about 250 F., it is presently preferred that the proportions of said first monomer and said second monomer be approximately or nearly equal, i.e., that the weight ratio of the first and second monomers be in the range of about 45:55 to about 65:35.

In addition to varying the monomer proportions, the molecular weight of all the inventive polymers can be varied according to the amount of initiator used or by initiation by gamma irradiation, for example. Thus, a relatively high molecular weight may be suitable for EOR, or for flocculating suspended solids, while for drilling fluids, a lower molecular weight can be used to limit the degree of flocculation of suspended clay.

The various processes of the invention for the recovery or processing of natural resources can be improved by the use of the novel polymers prepared by the methods of this invention, as disclosed earlier, although the polymers of the prior art prepared from the same monomers can be employed as well. The advantages of employing the polymers of this invention become more apparent when the polymer is exposed to a temperature of at least about 150 F. or higher. Generally, in carrying out the various processes for recovery of natural resources according to this invention, the polymer is generally at least partially dissolved in an aqueous fluid, and can be introduced into subterranean formations with a fluid comprising at least one composition selected from the group consisting of bases, polymeric viscosifiers, crosslinking agents, surfactants and cosurfactants, and combinations of any two or more of said compositions. In the various processes, said polymer can be crosslinked with various crosslinking agents. The aqueous fluid to which the polymer is exposed can have a significant salinity and/or hardness, e.g. a salinity of at least about 10 grams per kilogram of solution with a fraction of divalent hardness cations to total cations of at least about 1 weight percent, or particularly, a fraction of divalent hardness ions of at least about 5 weight percent. The polymer can be exposed to various aqueous fluids in the preparation of the polymer and polymer solutions for use in the process, in the introduction into the well bore and/or formation, or in contact with subterranean formation water. The polymers which can be used in the various processes for the recovery of natural resources include copolymers produced from monomer mixtures of N-vinyl lactams and unsaturated amides and terpolymers prepared by incorporating a minor amount of at least one termonomer, generally amounting to about 10 weight percent or less based on total weight of monomers, into the monomer mixture. The proportions of the monomers in the monomer mixture can vary over a broad range, as disclosed for the polymers produced by the methods of this invention. The termonomers can be selected as indicated elsewhere herein for the inventive terpolymers. The polymers used in these proceses and compositions of the invention will hydrolyze, and when heated in solution to a temperature such as at least about 150 F. for a suitable period of time, will reach an equilibrium degree of hydrolysis and an equilibrium cloud point temperature. Generally, an equilibrium degree of hydrolysis and equilibrium cloud point temperature will be obtained when the polymers are heated to a temperature of at least about 250 F. for at least about 7 days. Hydrolysis of the polymers to the desired degree can also be obtained by contacting them with a base or acid, optionally while heating, as explained more fully below.

The polymer can be at least partially dissolved in a liquid which is circulated in a well bore used in certain processes of the invention, such as for example when said polymer is used as a drilling fluid, a workover fluid, or a completion fluid.

It has been discovered that the various polymers prepared in accordance with this invention, as well as some of the corresponding polymers of the prior art, can be useful in various processes such as for instance for recovery or processing of natural resources, comprising enhanced oil recovery, the drilling, workover and completion of wells for the recovery of natural resources such as oil, gas and geothermal wells, the thickening and/or treatment of water for use, and minerals beneficiation. For example, in accordance with one embodiment of the invention a process for the enhanced recovery of oil from at least one high temperature production well comprises injecting an aqueous fluid thickened with a VP/Am polymer into at least one injection well to improve the recovery of oil from the production well. In such novel applications, the VP/Am polymers can be used in conjunction with various other materials, such as bases, surfactants, cosurfactants, polymeric viscosifiers, crosslinking agents and the like, used singly or in combination.

For example, the bases can be water-soluble bases selected from the group consisting of alkali and alkaline earth metal hydroxides, ammonium hydroxide, alkali metal carbonates and chemical buffer salts which dissolve with hydrolysis to yield alkaline fluids, such as sodium phosphate, sodium borates and sodium silicates, or combinations of at least two of said bases.

Surfactants can be selected from anionic, cationic or nonionic surfactants, suitable anionic surfactants include petroleum sulfonates, alkali metal carboxylates such as sodium oleate, carboxyalkylated or sulfated polyethoxylated alkyl phenols, carboxylated or sulfonated polyethoxylated alkyl phenols, carboxylated, sulfated or sulfonated polyethoxylated alcohols or carboxylic acids, and carboxylated, sulfated or sulfonated polyethoxylated thiols. Suitable cationic surfactants include long chain fatty amines and quaternary ammonium salts of fatty amines. Suitable nonionic surfactants include polyalkoxylated compounds prepared from substrates of long chain alcohols, alkyl phenols, carboxylic acids, amines and thiols. These surfactants can be used in combinations or mixtures.

Suitable cosurfactants can be polar organic compounds selected from the group consisting of saturated and unsaturated alcohols having from 3 to about 10 carbon atoms, phenols, amines, esters, mercaptans, aldehydes, ketones, amides, sulfoxides, organic nitro compounds, organic nitriles, sulfones, urea, and polyethoxylated alcohols. These cosurfactants can be used in combinations or mixtures.

Polymeric viscosifiers can be, for example, biopolysaccharides, cellulose ethers, acrylamide-derived polymers, or mixtures thereof. Crosslinking agents can be selected from various suitable crosslinking agents. Examples include various aldehydes and trivalent metal cations such as $Al^{+3}$, $Cr^{+3}$, and $Fe^{+3}$. For example, aluminum citrate can be used admixed with the polymer or in slugs alternating with polymer slugs. Soluble compounds of $Cr^{+3}$ or $Fe^{+3}$ can be used, or oxidizable compounds of divalent iron such as $FeCl_2$ can be used in conjunction with a gaseous oxidant such as air or oxygen. Phenols or phenolic materials such as lignites can be used. Also, redox systems such as sodium dichromate and sodium bisulfide can be used.

Any suitable amount of the polymers, including the polymers of the invention as well as analogous polymers of the prior art, can be used in the embodiments of the invention concerning the recovery and processing of natural resources. Generally, the inventive polymers prepared by the novel methods of this invention can be used in smaller quantities due to their superior properties, and are thus preferred.

For example, in the introduction of the polymers (of the invention or prior art) into a subterranean well bore and a subterranean formation in processes for enhanced oil recovery, a small but effective amount of polymer should be used to produce the desired viscosity or other properties in the injection fluid. Based upon the properties of the formation and the intended nature and duration of the process, the type and amount of the polymer should be selected to achieve the desired effects over the appropriate time period. As a general guide, the amount of polymer used will be in the range of from about 500 ppm to about 10,000 ppm, preferably 1,000 ppm to about 3,000 ppm, based on the weight of the injection fluid. Generally the goal will be to select an economical amount and type of polymer to produce the desired effect for the required time. Those skilled in the art can determine the amount of polymer to be used by suitable experiments carried out in light of this disclosure.

In some cases the use of polymers prepared in accordance with this invention in conjunction with such other materials can present particular advantages. For example, because of like charge interchain repulsion (including the polymer-surfactant complex) when such polymers are in an electrolyte solution with a surfactant, these systems should demonstrate increased saline resistance, and thus increased viscosity stability. The polymers of this invention can be used to improve the process of drilling a borehole in a subterranean formation, by circulating in the borehole a drilling fluid comprising the polymer, so that the high temperature water loss of the drilling fluid is reduced and improved viscosity and/or gel strength are obtained. Polymers of this invention can be used in drilling fluids comprising fresh or salt water, clays, weighting agents and other drilling fluid ingredients. These polymers are particularly suitable for drilling fluid additives in formations having high temperatures, salinity content and content of hardness ions, since they tend to retain their viscosity well even when aged at elevated temperatures in saline and/or hard water. In addition to use as a drilling fluid additive, the polymers of this invention can be effectively used as additives in various workover and completion fluids, e.g., for reducing the loss of a fluid pumped into a subterranean borehole, by maintaining a suitable viscosity, and improving the fluid's ability to suspend weighting agents.

When introduced into a well bore in processes for the drilling, completion or workover of wells, the polymers can be used in small amounts effective to achieve the effects desired, such as reduction of high temperature water loss, suspension of weighting agents and the like. As a general guide, the amount of polymer used will be in the range from about 0.10 to about 5, preferably 0.5 to about 2 pounds per barrel of fluid. Those skilled in the art can determine the amount of polymer to be used by suitable experiments in light of this disclosure. The polymers are useful in such applications at temperatures up to at least about 400 F. In one embodiment, the polymers can be added to a workover/completion fluid to provide a fluid which is substantially clay free, with a pH in the range from about 7 to about 10.

The in situ polymerization embodiment of this invention is applicable to any situation wherein it is desired to selectively plug the more permeable zones in a subterranean formation by in situ polymerization of a polymer. The invention is primarily directed to the selective plugging of the more permeable zones, known as theif zones, to improve the sweep efficiency of postprimary oil recovery processes.

The preferred plug-forming materials of this invention are water-soluble, polymerizable monomers comprising an N-vinyl lactam as previously disclosed. The polymers of N-vinyl-2-pyrrolidone are presently preferred. For most applications it is presently preferred that the polymer be a copolymer produced in situ by copolymerizing the N-vinyl lactam with an unsaturated amide as previously disclosed, preferably acrylamide. Copolymers preferably contain an amount ranging from about 25 to about 75 weight percent of the N-vinyl lactam, the remainder being the unsaturate amide. For certain applications the copolymer can comprise an additional monomer, or termonomer, producing a terpolymer containing major portions of the N-vinyl lactam and the unsaturated amide in the proportions previously disclosed, with the termonomer selected from the group consisting of hydrophobic and nonanionic compounds as disclosed previously.

This embodiment of the invention preferably involves injecting into the formation a polymerization inhibitor or poison for the particular monomer(s) to be polymerized. For instance, materials to inhibit the polymerization of acrylamide, such as potassium ferricyanide, hydroquinone and the like can be injected in the formation. Polymerization inhibitors for the N-vinyl lactam can be injected into the formation in addition to or in lieu of the inhibitor for the unsaturated amide, such as for example, those selected from the group consisting of benzoquinone, nitrosobenzene and alkyl-substituted derivatives and the like. An appropriate catalyst or free radical initiator selected from the materials disclosed elsewhere herein is injected into the formation with the monomer(s) to cause polymerization in situ, as described in Example XIII. Methods for the introduction and selective removal of polymerization inhibitors for permeability correction in subterranean formations are disclosed by Barton in U.S. Pat. No. 4,190,109, issued Feb. 26, 1980, and assigned to Phillips Petroleum Company, Bartlesville, Okla.

When monomers are injected into a formation for employment in this embodiment of the invention, the amount of monomers used is not critical so long as at least an effective amount is present, and the concentration of the resulting monomer solution does not produce a viscosity so great as to cause difficulties in emplacing the monomers in the portion of the formation where they are to polymerize. The effective amount can be very small, as where the permeability of a zone is to be decreased slightly, or larger where fractures, voids, etc. are to be plugged. A concentration and amount of monomer solution should be used which will permit an effective amount of the monomers to polymerize in situ in the desired zones and have the desired effect on the permeability of those zones.

Optionally, a suitable difunctional monomer such as for example divinylbenzene or bis-methylene-acrylamide can be employed as a crosslinking agent in the process of in-situ polymerization.

The advantage obtained by using the inventive polymers through in situ polymerization in a subterranean formation is that polymers of enhanced viscosity and stability to the effects of high temperatures, e.g. at least about 150 F., salinity and/or concentration of hardness ions are obtained when the monomers are polymerized in the presence of electrolytes, preferably a mixture of electrolytes selected from the groups of alkali metal salts and alkaline earth metal salts. Such an electrolyte solution can be introduced as the polymerization medium in the process of flushing out the polymerization inhibitor, or in certain formations the formation water can be used at least partially as the polymerization medium, with or without filtering or other treatment. The formation water and/or fluid flush material preferably have a salinity of at least about 10 grams per kilogram solution and/or a fraction of divalent hardness cations of at least about 1 weight percent, based upon the total cations. By forming a viscous and stable polymer in the more permeable zones of the formation, the permeability of the formation is made more uniform with a smaller quantity of monomers, and the permeability correction can be expected to be longer lasting.

FLOCCULATION

Other applications for the polymers of this invention include methods for concentrating finely divided organic or inorganic solids from an aqueous suspension thereof by admixing with the suspension an effective amount of the copolymer to cause accelerated sedimentation of the suspended solids and maintaining the treated suspension under quiescent conditions to separate a clarified supernatant liquid layer and a concentrated solid suspension layer.

In carrying out the flocculation embodiment of the invention, the inventive polymer is distributed in a suspension of finely divided inorganic solids in any fashion by which rapid, thorough mixing may be accomplished without excessive agitation. In a preferred method of operation, the copolymer is dissolved in water and introduced into the suspension in the form of a dilute aqueous solution. Following the introduction of the polymer solution, the treated suspension is transferred with a minimum of agitation and shearing action into a quiescent zone such as a sedimentation vessel to allow the development and settling of agglomerates of the finely divided solids. In practice, the polymer solution may be sprayed or otherwise introduced into a flame or other conduit through which the suspension is moving. In such operations the conduit may be equipped with baffle plates or other means of mild agitation at or immediately following the point of introduction of the polymer solution to assure thorough mixing. Preferably the polymer solution is added portionwise or at a plurality of sites to accomplish thorough distribution of flocculant without local overtreatment.

Following the mixing of the solution of polymer with the suspension of finely divided solids, as set forth above, the treated suspension may be submitted to various conventional procedures for the concentration or separation of solids from the suspension. For example, the treated suspension may be fed into a settling tank or thickener to effect the separation of a concentrated slurry of solids as an underflow product and a clarified aqueous effluent as an overflow product.

The amount of polymer to be employed will vary depending upon the type of inorganic solids, the degree of subdivision thereof and the rate of settling required. With highly amenable solids, such as certain chemical precipitates, excellent improvement in settling rate and clarity of supernatant liquid can be obtained when employing only 0.001 pound of polymer per ton of suspended solids. For most finely ground materials, good results can be obtained when employing about 0.01 to about 0.1 pound of polymer per ton of suspended solids, although loadings ranging up to 1 or 2 pounds of polymer per ton of solids may sometimes be required, particularly when the solids are to be filtered following treatment. In any case, an amount sufficient to increase the rate of sedimentation of the solids is employed. In some cases the inventive polymers are conveniently employed in conjunction with other flocculants such as polyacrylamides or natural polymers.

Cloud Point Measurements

When an aqueous solution of a water-soluble polymer such as an acrylamide-derived polymer is heated, it turns cloudy at higher temperature. This cloudiness disappears upon cooling and reappears as a result of additional heating. The temperature at which such cloudiness first appears is a property related to the solubility of the polymer, and is known as the cloud point. Cloud point corresponds to the lower critical solution temperature described by Billmeyer in his Textbook of Polymer Science, Second Edition (Wiley-Interscience, New York, 1971) at pages 39–43. The lower critical solution temperature is the higher temperature at which a solvent, such as water, in a given single-phase polymer-solvent system, such as PVP-Am in a synthetic sea water, is no longer a good solvent. At this temperature, the single phase system undergoes phase separation, as shown by FIGS. 2-8 in Billmeyer. Such phase separation is often marked by clouding, hazing or precipitation of the polymer. Such phase separation, and thus the lower critical solution temperature or cloud point, can be observed visually or measured by various apparatus, including turbidimetry. Since chemical modification of the polymer or solvent does not necessarily occur at or near the lower critical solution temperature, redissolution of the cloud, suspension or precipitate is noted when the temperature decreases below the lower critical solution temperature.

Apparatus has been developed in connection with the research on this invention to measure cloud points at high temperatures (up to about 325 F.) Unless otherwise noted, this apparatus and the method described were used to determine the cloud points herein. To determine the cloud point of a given polymer with this apparatus, a solution of the polymer comprising 0.25 or 0.5 gram (as indicated) per deciliter of polymer in SSW is produced and a 35 ml aliquot of this solution is placed in a 45 ml ampule and torch-sealed under vacuum. The ampule is then placed in a protective chamber immersed in a silicone oil bath containing Dow Corning 200 Fluid. A Brinkman Model PC-801 probe colorimeter is used to supply a source of light and a detector. The light from the colorimeter is passed through a 30 inch Brinkman fiber optic light guide number (No. 2023602-F) and then directed through the solution. The transmitted light is passed by another identical fiber optic light guide to the detector. The sample is heated from a temperature where the polymer solution is clear to a temperature where cloudiness exists, and is then allowed to cool. For example, to measure cloud points in the range of about 250°–275 F., the silicone oil bath containing the ampule is heated from 200 F. to 280 F. and cooled back to 200 F. in approximately one (1) hour with the heating cycle taking about 30 minutes. To detect the onset of cloudiness, the absorbance of the polymer solution is measured and recorded (on a strip chart recorder) as a function of temperature for the heating-cooling cycle. (Absorbance, not directly measurable, is determined by comparing the amount of light transmitted through the clear solution with that transmitted at and after the "cloud point" temperature is achieved.) The average of the temperatures at which the first trace of cloudiness appears and the last trace of cloudiness disappears employing the above described apparatus and method is the numerical average cloud point temperature, hereinafter "cloud point," as that term is used in the specification and claims unless otherwise indicated. This measurement appears to be quite reproducible to within ±3% with the apparatus presently in use.

Figure 5:
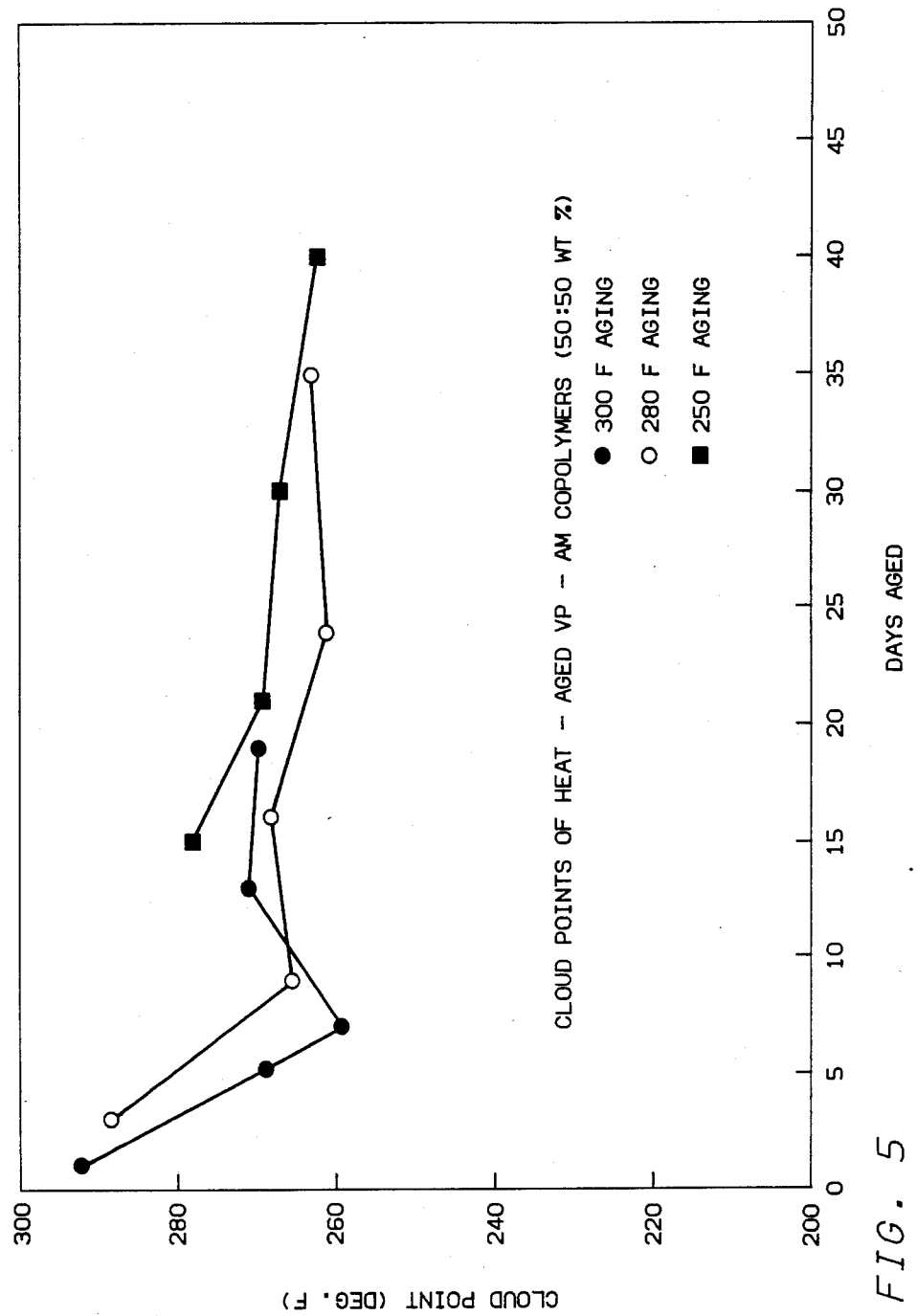
FIG. 5 illustrates equilibrium cloud point temperatures for copolymers of the invention aged at different temperatures.

It has been noted that the cloud points of the copolymer solutions of this invention can be correlated with desirable properties comprising the resistance of the copolymers to high temperatures. Generally speaking, the higher the cloud point of a freshly-prepared polymer, the higher the temperature (which can be as much as about 50 F.° or more above the cloud point) which the copolymer can be expected to withstand without suffering a significant loss in its capacity to impart viscosity to the test solution. See Example V. Furthermore, tests to determine cloud point after aging can be used to indicate the prospects of the copolymers withstanding further aging under such conditions, or under less severe conditions. As shown in FIG. 5 and discussed in Example VI, although the cloud points measured for copolymer samples aged at different temperatures initially vary, as aging exceeds about 20 days, the cloud points approach a common equilibrium value. This equilibrium value is believed to be an excellent indicator of the copolymer's resistance to degradation at high temperatures.

The VP:Am copolymers and terpolymers of this invention hydrolyze. As is known, hydrolysis of an amide alters the amide functionality to an acid (or its salts). In the case of acrylamide, acrylic acid or its salts are formed. In the case of polyacrylamide or its copolymers, including VP-Am, the polymer is altered to contain monomer units of carboxylic acids or their salts, thus introducing ionic character to the polymer. The degree of hydrolysis has been found to increase to a maximum equilibrium value of about 70 to 80 percent based on the acrylamide content. It has been noted that the cloud point temperature also changes over the same time frame and equilibrates. The inference is that the cloud point temperature reflects the basic polymer nature, and that the stability of the equilibrium cloud point temperature (corresponding to the stability of the degree of hydrolysis of the copolymer) probably indicates a constant polymer makeup.

The utility of cloud point measurements as predictors of the performance and/or stability of polymer compositions in high temperature environments is disclosed in U.S. Pat. No. 4,016,932, which states that in surfactant systems for oil recovery comprising at least one anionic and at least one nonionic surfactant, superior results are obtained when the nonionic surfactant is chosen to have a cloud point slightly above the formation temperature. Similarly, measurement of the cloud points of the copolymers suitable for use in the processes of this invention, before and/or after aging at elevated temperatures, facilitates the selection of polymers which will provide superior performance and stability for the various applications disclosed herein. For the best prediction of polymer performance, it is preferred that the cloud points be determined in aqueous solutions similar to the proposed environment for employement, e.g. in salinity and hardness, and at standardized concentrations of the polymer. For use in enhanced oil recovery in hot saline formations, for example, polymers having cloud points in brine of at least as high as the formation temperature after short-term aging at elevated temperature are preferred. Since long-term viscosity stability at high temperatures is required in enhanced oil recovery, and since polymers having relatively high cloud points after aging correlate well with polymers having such stability, polymers with relatively high cloud points are preferred for use in enhanced oil recovery processes. Conversely, polymers used in drilling fluids and the like are subjected to high formation and/or well bore temperatures, salinity and hardness ions for shorter periods of time. Thus, polymers with cloud points relatively lower with regard to formation and/or well bore temperature than those required in polymers selected for, e.g., enhanced oil recovery, can be utilized in drilling fluids, etc. For example, a polymer with a cloud point somewhat lower than the maximum formation and/or well bore temperature may perform adequately and retain the desired properties such as viscosity for a period of use limited to weeks, days or even hours. This is particularly important when drilling or servicing deep and/or hot wells, such as grothermal wells.

Based on the relatively stable properties of the polymers suitable for use in the processes of the invention after short-term heat aging, for applications where maximum stability in hot, saline environments is desired, the polymers can be pre-aged or hydrolyzed before use. That is, the polymers are hydrolyzed in solution by heat aging at a suitable temperature until an equilibrium value of hydrolysis is attained. The aging temperature must be less than the decomposition temperature of the polymer. The polymers can be aged in any available aqueous medium, but media similar to the environments in which the polymers are to be employed are presently believed to produce optimum results. Since the aging time and temperature are interdependent, to fully stabilize polymer properties such as viscosity, the polymers must be aged for long enough at the temperature selected to produce an equilibrium degree of hydrolysis. The polymers can also be at least partially hydrolyzed by treatment in solution with a base, an acid, a polyacid such as polyacrylic acid, a polyelectrolyte such as polyvinylpyrrolidone or an electrolyte such as an alkali or alkaline earth metal salt.

Figure 6:
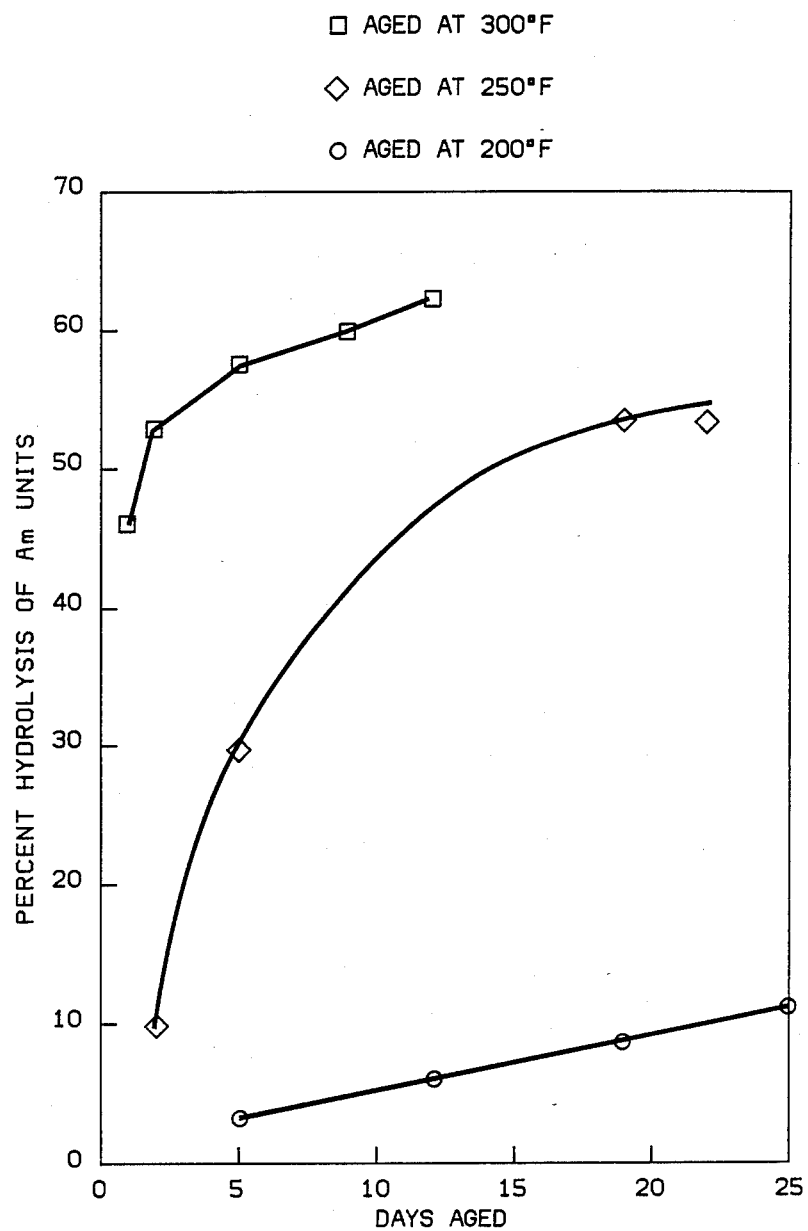
FIGS. 6 and 7 illustrate the degree of hydrolysis of the acrylamide units attained in copolymers of the invention aged at different temperatures.

The degree of hydrolysis can be tested directly by the Dow Color Test, as described in Example VII herein, or can be estimated by the equilibrium cloud point temperature, as described in Example VI. The minimum temperature suitable for this pre-aging is a temperature high enough to produce a hydrolysis rate which allows pre-aging to be completed in a reasonable time. As seen in FIG. 6, temperatures of at least 150 F., preferably in the range of about 250 F. to about 300 F. should generally produce suitable hydrolysis rates for the inventive polymers. Temperatures higher than 300 F. can be used, provided suitable equipment is available and the decomposition temperature of the polymer is not exceeded. In the production and pre-aging of a given polymer, the relationship between the times and temperatures appropriate for pre-aging can be readily determined. When a temperature of at least about 250 F. is used, the polymers are preferably aged for at least about 7 days.

The invention is further illustrated by the following examples, which should not be regarded as more limiting than the appended claims. Unless otherwise noted, all percentages and/or parts are by weight.

EXAMPLE I

Copolymer Preparation and Testing

The polymer preparations were carried out in 10 ounce crown top glass beverage bottles. Each bottle was charged under an inert atmosphere with 20.0 g total of the monomer(s), 200.0 g of the reaction medium (t-butyl alcohol, distilled water, water containing salts or SSW, as specified) and 0.02 g of initiator, or the specified amount in terms of weight percent, based on the total monomer weight and desired solution viscosity. Each bottle was purged for about 10 to 20 minutes with an argon stream to remove oxygen and capped. The SSW was prepared as described earlier.

The bottles were placed in a bath maintained at 50° C. and rotated for at least 4 hours to achieve substantially complete polymerization of the monomers. The bottles were removed and the resulting solutions in aqueous media were diluted with the specified test medium to obtain the desired viscosities for the tests. Polymers prepared in t-butyl alcohol were separated from the alcohol medium by elutriation, then diluted with the test media for viscosity tests.

Aging of the samples was conducted in torch-sealed glass ampules containing about 30 to 35 mL of polymer solution, e.g., 2 weight percent or as specified in the Tables, in an oven maintained at the specified temperature. At various time intervals, ampules were removed, observed for any evidence of precipitation and cooled to room temperature. Each seal was broken and the viscosity of the solution as a function of shear rate was measured at 77 F. (ambient room temperature) with a Brookfield LVT model viscometer equipped with an UL adapter for viscosity measurements at different shear rates. Each viscosity listed is an average of three measurements at each shear rate.

Screen factors, when reported, were determined by measuring the time required for passage of an aliquot of aqueous polymer solution by gravity flow through five 100-mesh stainless steel screens, and dividing this time by the time required for passage of the same amount of solvent through these screens under identical conditions. Screen factors are related to viscosity of the polymer solution, thus the higher the factor the higher the viscosity. The test method is detailed by Foshee, W. C.; Jenning, R. R. and West, J. J. in Paper SPE 6202 entitled "Preparation and Testing of Partially Hydrolyzed Polyacrylamide Solutions" presented at the 51st Annual Fall Meeting of the Society of Petroleum Engineers in New Orleans, Oct. 3–6, 1976.

In Table IV, footnote f, the cloud point was visually estimated with an aged sample tested at an elevated temperature by placing the ampule containing the polymer in another bath maintained at a lower temperature, so that the polymer solution was cooled sufficiently to allow redissolving of the precipitated polymer. The bath temperature was then slowly raised and the temperature at which cloudiness visually reappears was recorded as the cloud point. For example, the cloud point of a polymer solution aged at 250 F. that had become cloudy was determined to be 215 F. (see footnote f, Table IV) by cooling the hot mixture to about 180 F., thus allowing the precipitated polymer to redissolve. The temperature was slowly raised until 215 F. was reached, at which point the cloudiness visually reappeared. This temperature was recorded as the cloud point.

As discussed earlier, it has been found that cloud point can be correlated with the maximum temperatures at which such polymers can be expected to retain their viscosity when aged. Thus, newly-formulated polymers can be quickly evaluated as to their suitability for laboratory or field tests for retention of viscosity under aging at elevated temperatures.

The viscosities of the aged polymers are listed in Table I.

TABLE I

Aging Results For Homopolymers and Copolymers of
N—Vinyl-2-Pyrrolidone and Acrylamide Prepared in SSW
with 0.5 Weight Percent AIBN[1] and Different
Monomer Ratios and Aged in SSW

| Sample | Weight Percent VP | Am | Concentration in SSW | Days aged | Brookfield[k] Viscosity, centipoise, after aging at 200 F. | 250 F. |
|---|---|---|---|---|---|---|
| 1 (homo-polymer) | 100 | 0 | 2.0 | 0 | 16.1 | 16.1 |
| | | | | 21 | 14.2 | 13.8 |
| | | | | 48 | 14.0 | 13.6 |
| | | | | 125 | —[a] | —[b] |
| 2 (co-polymer) | 87.5 | 12.5 | 2.0 | 0 | 55.4 | 55.4 |
| | | | | 21 | 60.1 | 61.9 |
| | | | | 48 | 60.5 | 60.9 |
| | | | | 124 | —[a] | —[b] |
| 3 (co-polymer) | 75 | 25 | 2.0 | 0 | 46.8 | 46.8 |
| | | | | 17 | 42.9 | 42.8 |
| | | | | 44 | 43.0 | 41.9 |
| | | | | 120 | —[a] | —[b] |
| 4 (co-polymer) | 62.5 | 37.5 | 2.0 | 0 | 108.4 | 108.4 |
| | | | | 27 | 124.9 | 105.0 |
| | | | | 48 | 129.0 | 117.0 |
| | | | | 105 | 127.0 | 112.0 |
| | | | | 120 | —[a] | —[a] |
| 5 (co-polymer) | 50 | 50 | 2.0 | 0 | 331 | 331 |
| | | | | 26 | 457 | 478 |
| | | | | 47 | 476 | 386 |
| | | | | 119 | —[a] | —[a] |
| 6 (co-polymer) | 37.5 | 62.5 | 2.0 | 0 | 860 | 860 |
| | | | | 24 | 1934 | 1376 |
| | | | | 45 | 1686 | 1038[c] |
| | | | | 101 | 1624 | 910[d] |
| | | | | 117 | —[a] | —[e] |
| 7 (co-polymer) | 25 | 75 | 2.0 | 0 | 1330 | 1330 |
| | | | | 20 | >2000 | 1220[f] |
| | | | | 43 | >2000 | 813[f] |
| | | | | 99 | 1988 | 142[f] |
| | | | | 113 | —[a] | —[g] |
| 8 (co-polymer) | 12.5 | 88.5 | 2.0 | 0 | >2000 | >2000 |
| | | | | 20 | >2000 | >1857[f] |
| | | | | 42 | >2000 | 660[f] |
| | | | | 100 | >2000 | 650[f] |
| | | | | 112 | —[a] | —[g] |
| 9 (control) | 0 | 100 | 0.4 | 0 | 19.1 | 19.1 |
| | | | | 4 | 3.0[h] | 2.1[h] |
| | | | | 18 | — | 1.4[h] |
| | | | | 56 | 24.4[h] | 1.3[h] |
| | | | | 87 | 1.3[h] | 1.6[h] |

Notes:
[a]Clear, aging continuing
[b]Hazy, very small amount of precipitate, test continuing
[c]Cloudy at 250 F., clear at 78 F.
[d]Very hazy, white precipitate. At 78 F., clear with a little floating material.
[e]Very hazy with white precipitate on ampule sides, test continuing
[f]Very cloudy with much white precipitate on ampule side. At 78 F., clear with clear gel.
[g]Very cloudy with much white precipitate on ampule side, test continuing.
[h]Clear with powdery white precipitate at aging temperatures and at 78 F.
[i]azobisisobutyronitrile, based on weight of monomers
[k]Determined at shear rate of 7.3 sec$^{-1}$ or lower at 25° C. (e.g. 7.3, 3.7 and 1.8 sec$^{-1}$) in terms of centipoise (cP).

The aging results presented in Table I show that the invention VP and VP/Am polymers are more thermally stable under the test conditions at 200 F. than the polyacrylamide control. The solution viscosities of the copolymers generally increase with increasing Am content. The lower solution viscosities of sample 3, 72/25 VP/Am, compared with those of sample 2, 87.5/12.5 VP/Am, are believed to be anamolous, since later work shows viscosity results intermediate to those of samples 2 and 4 of Table I. The various copolymers, however, show consistently good thermal stability in this test.

The higher the level of Am in the copolymer, the greater the probability of precipitation at a test temperature of 250 F. For example, when the Am level is higher than about 75 weight percent, precipitation occurs at some time less than about 20 days. When the Am level is lower than about 65 weight percent, the results show much less to no precipitation occurring, even after up to about 125 days at 250 F. Based on both the viscosity and the stability results, the data in Table I indicate that suitable copolymers for EOR have VP/Am levels ranging from about 60/40 to about 40/60 at the temperatures tested. Such copolymers provide reasonably viscous solutions at relatively low polymer concentrations which are very resistant to thermal degradation. The higher proportions of VP are generally preferred for use in reservoirs having more "hostile" conditions, e.g., higher temperature, salinity and hardness of the formation water.

TABLE II

Viscosity of 2 Weight Percent Solutions of 50:50 VP-Am
Copolymers Prepared with Different Initiators
in Distilled Water and Diluted in SSW

| Run No | Initiator Description | Weight Percent[a] | Brookfield Viscosity,[b] cP |
|---|---|---|---|
| 1 | AIBN[c] | 1.0 | 157 |
| 2 | " | 0.5 | 226 |
| 3 | " | 0.25 | 233 |
| 4 | " | 0.13 | 280 |
| 5 | t-BPP[d] | 1.0 | 11.2 |
| 6 | " | 0.5 | 52.3 |
| 7 | " | 0.25 | 42.8 |
| 8 | " | 0.13 | 69.7 |

[a]Based on weight of monomers
[b]Same as described in footnote k of Table I.
[c]azobisisobutyronitrile
[d]t-butylperoxypivalate

TABLE III

Viscosity of 2 Weight Percent Solutions of 50:50 VP-Am
Copolymers Prepared with Different Initiators
in SSW and Diluted in SSW

| Run No | Initiator Description | Weight Percent[a] | Brookfield Viscosity,[b] cP |
|---|---|---|---|
| 1 | AIBN[c] | 1.0 | 530 |
| 2 | " | 0.5 | 657 |
| 3 | " | 0.25 | >2000 |
| 4 | " | 0.13 | >2000 |
| 5 | t-BPP[d] | 1.0 | 17.4 |
| 6 | " | 0.5 | 15.4 |
| 7 | " | 0.25 | 19.8 |
| 8 | " | 0.13 | 24.4 |

[a]Based on weight of monomers.
[b]Same as described in footnote k of Table I.
[c]azobisisobutyronitrile
[d]t-butylperoxypivalate The results in Tables II and III show rather dramatically that the viscosities of the polymers prepared in SSW with AIBN are substantially higher in comparison to the viscosities of corresponding polymers, prepared in water using AIBN initiator. It is also clear from the data that AIBN is preferred over the t-BPP as the initiator, based on the much higher polymer solution viscosities obtained. The data in Tables II and III also show that the viscosities of polymers prepared with an AIBN initiator or inversely proportional to the amount of initiator employed, as would be expected by those skilled in the art. This trend is nsot consistent in the polymers prepared with t-BPP, suggesting that some interaction may take place between the polymer produced and the t-BPP in the solution.

TABLE IV

Aging Results for Several 50:50 PV-Am Copolymers Prepared in SSW or t-Butyl Alcohol and Aged in SSW at 200 F.

| Sample No. | Reaction Medium | Initiator Description | Weight Percent[g] | Copolymer Concentration Wt. % | Days Aged | Brookfield Viscosity[a] cP |
|---|---|---|---|---|---|---|
| 1[b] | SSW | AIBN | 1.0 | 2.0 | 0 | 530 |
|  |  |  |  |  | 28 | 670 |
|  |  |  |  |  | 54 | 664 |
|  |  |  |  |  | 111 | 719 |
|  |  |  |  |  | 320 | —[e] |
| 2[c] | SSW | AIBN | 0.13 | 0.5 | 0 | 19.5 |
|  |  |  |  |  | 28 | 28.0 |
|  |  |  |  |  | 61 | 28.6 |
|  |  |  |  |  | 98 | —[e] |
| 3[d] | SSW | t-BPP | 0.25 | 2.0 | 0 | 19.8 |
|  |  |  |  |  | 35 | 25.5 |
|  |  |  |  |  | 94 | 26.8 |
|  |  |  |  |  | 190 | —[e] |
| 4 | t-butyl alcohol (TBA) | t-BPP | 1.0 | 2.0 | 0 | 18.6 |
|  |  |  |  |  | 32 | 27.0 |
|  |  |  |  |  | 63 | 27.0 |
|  |  |  |  |  | 173 | 27.8[f] |

Notes:
[a]Same as described in footnote[k] of Table 1.
[b]Same polymer as in run 1, Table III.
[c]Same polymer as in run 4, Table III.
[d]Same polymer as in run 7, Table III.
[e]Clear solution in parallel test at 250 F., test continuing.
[f]Tested at 250 F. The polymer solution became cloudy after 13 days at 250 F. The cloudiness disappeared on cooling to room temperature and apparently did not affect solution viscosity. The cloud point was determined to be 215 F.
[g]Based on weight of monomers The data given in Table IV show typical results obtained with 50:50 PV-Am copolymers prepared in SSW or t-butyl alcohol and aged at 200 F. or 250 F. Sample 1 has been aged for over 487 days at 250 F. with clear solutions obtained, indicating the exceptional stability of the polymer in a saline hard water environment under the test conditions employed.

Since t-BPP is believed to interact with the polymer produced, it would not be appropriate to draw any conclusions from the results of samples 3 and 4.

EXAMPLE II

50:50 VP:Am Copolymers Prepared by Gamma-Irradiation

A series of 50:50 weight percent VP:Am copolymers was prepared by gamma-irradiation. A 20 weight percent solution of monomers in distilled water (control runs 1, 3 and 5) or synthetic sea water (SSW) (inventive runs 2, 4 and 6) were irradiated at room temperature, e.g. 25° C. Each sample, containing water and monomers, weighed about 15 g. The dosage rate was 600 kilorads per hour. The nature of the polymerization media, irradiation times and results obtained are given in Table V. The SSW was prepared as disclosed in earlier.

TABLE V

Gamma Irradiation of VP-Am Solutions at 25° C.

| Sample No. | Polymerization Conditions Medium | Time Minutes | Dosage KRads | Description of Polymerized Mixture |
|---|---|---|---|---|
| 1 | $H_2O$ | 60 | 600 | Clear, soft gel-like |
| 2 | SSW | " | " | Yellow, soft gel-like |
| 3 | $H_2O$ | 90 | 900 | Clear, stiff gel |
| 4 | SSW | " | " | Yellow, stiff gel |
| 5 | $H_2O$ | 30 | 300 | Clear, very thick solution |
| 6 | SSW | " | " | Yellow, easily flow solution |

Samples 5 and 6 apparently did not receive enough radiation to give polymers of sufficient molecular weight to provide desirable solution viscosities when diluted. No further testing of these samples was done. However, 14 g portions of samples 1 to 4 were individually admixed with 266 g portions of water or SSW, corresponding to the polymerization medium employed, to produce solutions containing 0.5 weight percent polymer, with each mixture placed in a closed container and tumbled for 4 days. It was noted that samples 1 and 2 completely dissolved to give solutions 1A and 2A, each containing about 1 weight percent solids. Samples 3 and 4 contained crosslinked gel suspended in the solution and were deemed to have received an overdose of radiation. No further testing of these was done.

The viscosities of solutions 1A and 2A were determined with a Brookfield viscometer provided with a U.L. adaptor at 6 RPM and 24° C. Solution 1A had a viscosity of about 46.5 cp and solution 2A had a viscosity of about 38.8 cp, which under the conditions employed are considered comparable.

The above results demonstrate that the copolymers of this invention can be prepared in SSW by gamma-irradiation.

EXAMPLE III

Inherent Viscosities of 50:50 VP-Am in Various Media

Viscosities of the polymer solutions disclosed in the examples herein have been expressed variously as Brookfield viscosity, relative viscosity, inherent viscosity, intrinsic viscosity or specific viscosity. Definitions and discussions of these terms can be found in "Viscometry," Encyclopedia of Polymer Science and Technology, Vol. 14, pp. 717–22 (John Wiley & Sons, New York, 1971), and in J. R. Fried, "Molecular Weight and its relation to properties," Plastics Engineering, August, 1982, pp. 27–30.

A series of 50:50 (by weight) VP-Am copolymers was prepared as before by solution polymerization at 50° C. using about 0.1 g (0.50 weight percent based on total components) AIBN as initiator, 10 g each of VP and Am and 200 g of polymerization medium. The polymerization media employed ranged from distilled water to water containing one or more dissolved salts as indicated below. The Ionic Strength (I.S.) of each solution containing a dissolved salt or salts was about 0.7, the I.S. of SSW.

Each polymerization run was conducted overnight, e.g. about 15 hours. The inherent viscosity of each copolymer solution containing 9.1 weight percent copolymer was determined by means of an Ubbelohde viscometer at 25° C. in distilled water and in water containing one or more dissolved salts.

The results are given in Table VI.

TABLE VI

Inherent Viscosity of 50:50 VP-Am in Various Media
All Salt-Containing Media at 0.7 Ionic Strength

| Run No. | Polym. Medium | Inherent Viscosity Medium Inherent Viscosity, dL/g[a], 25 C. | | | | | |
|---|---|---|---|---|---|---|---|
| | | Water | SSW | NaCl/MgCl$_2$ | NaCl | CaCl$_2$ | MgCl$_2$ |
| 1 | Water | 5.4 | 5.7 | — | 5.2 | 5.6 | 5.6 |
| 2 | SSW | 7.0 | 7.3 | 6.9 | 7.1 | 7.1 | 7.2 |
| 3 | NaCl aq | 6.5 | 6.7 | 6.5 | 6.8 | 6.6 | 6.6 |
| 4 | CaCl$_2$ aq | 6.3 | 6.5 | 6.3 | 6.5 | 6.4 | 6.5 |
| 5 | MgCl$_2$ aq | 6.4 | 6.5 | 6.4 | 6.5 | 6.4 | 6.4 |
| 6 | NaCl/MgCl$_2$ aq[b] | 6.7 | 6.8 | 6.2 | 6.5 | 6.3 | 6.1 |

[a]All samples for inherent viscosity measurements were at 0.05 weight percent total solids. Each value in the table is the average of three determinations. Reproducibility was within about 0.2 deciliters per gram.
[b]1.96:1 weight ratio NaCl:MgCl$_2$. Prepared by mixing equal volumes of 0.7 I.S. NaCl and 0.7 I.S. MgCl$_2$.
aq = aqueous The inherent viscosity results for the 50:50 VP:Am copolymer prepared in SSW of 0.7 I.S. are consistently higher than those prepared in the other polymerization media employed. Generally, the copolymers prepared in such media exhibited about the same viscosity results regardless of the inherent viscosity media chosen for their determinations. While the inventive polymers prepared in SSW or mixed electrolyte media have higher viscosities, polymers prepared in the other media can be used in certain process embodiments of this invention.

EXAMPLE IV

Effects of Heat Aging on Viscosities

Several 50/50 VP/Am copolymers were prepared at 50° C. in the manner previously described using 0.25 weight percent AIBN as the initiator in an aqueous polymerization medium as follows: Polymer A was prepared in distilled water. Polymer B was prepared in 0.7 I.S. NaCl solution. Polymer C was prepared in 0.7 I.S. SSW. A portion of each polymer was diluted to the 0.25 weight percent polymer level in the same medium employed in its preparation.

Each diluted polymer solution was divided into 2 portions to give 6 test samples in all. In series 1, the three dissimilar unaged polymer solutions were individually tested to determine how solution viscosity changed over the temperature range of about 80 to 300 F. In series 2, the three dissimilar polymer solutions were aged for 7 days at 300 F. in an essentially oxygen-free atmosphere.

Aliquots of each polymer solution were passed through a capillary viscometer, a 40 foot length of 0.069 inch inner diameter stainless steel tubing. The solution viscosities, in terms of centipoise (cP), were calculated from the viscometer results by applying the Poiseuille equation as known in the art.

Figure 2:
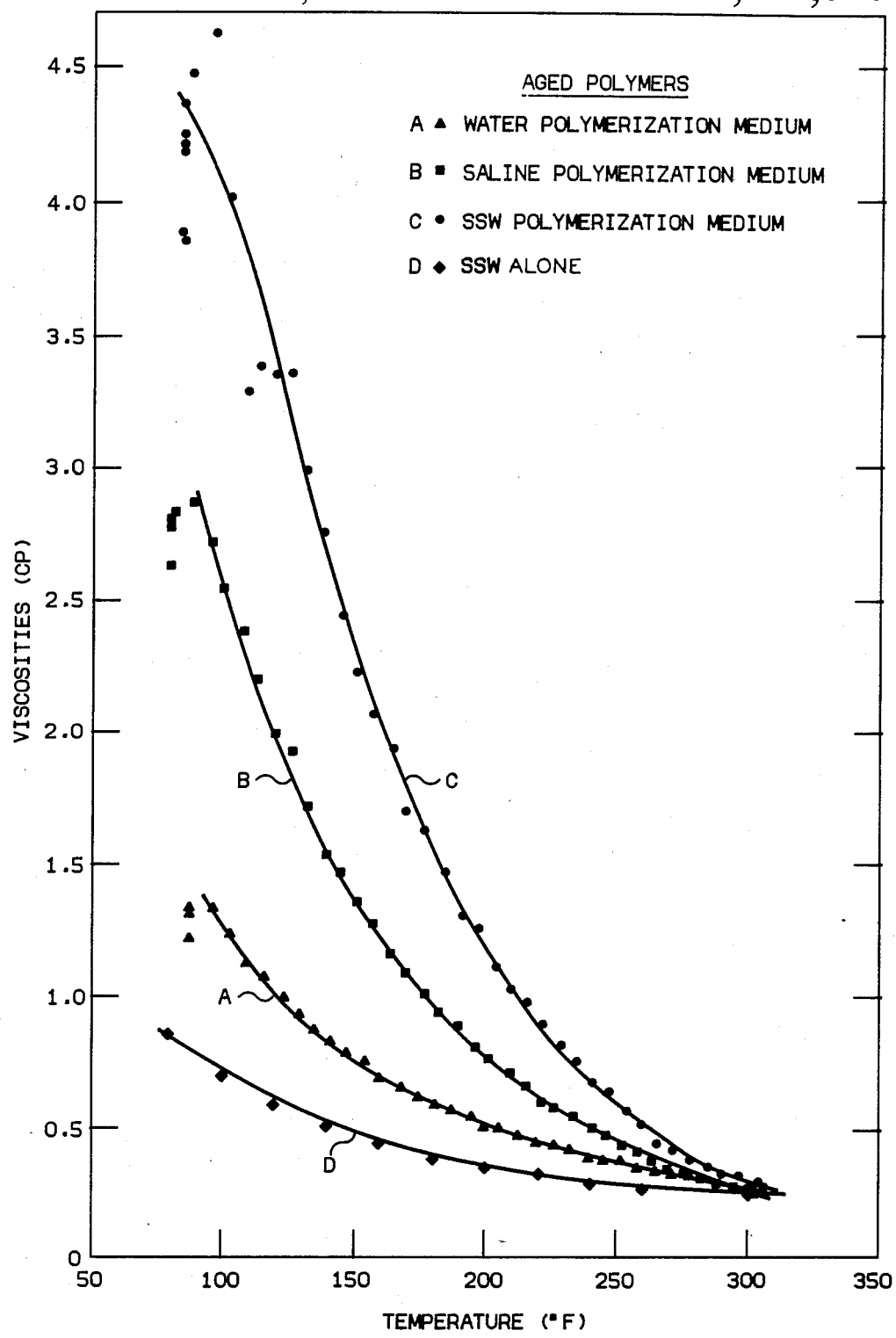
FIG. 2 shows the variation of viscosity with temperature of heat-aged polymers of FIG. 1.

The viscosity results obtained for unaged polymers are tabulated in Table VII and shown in FIG. 1; results for the aged polymers are tabulated in Table VIII and shown in FIG. 2. The results obtained with the unaged polymers, shown in FIG. 1 as curves A, B, and C show that they have significantly greater solution viscosities than does SSW containing no polymers, shown in FIG. 1 as curve D, over the 80 to 300 F. temperature span tested. (Curve D was drawn from the properties of SSW listed in Table IX.) The polymers prepared in either saline, I.S. of 0.7, (curve B) or SSW, I.S. of 0.7, (curve C) have significantly greater viscosities than does the polymer prepared in distilled water (curve A) over the entire temperature range tested.

The results obtained with the polymer aged for 7 days at 300 F. are shown in FIG. 2. They indicate again that all of the polymers (curves A, B, C) have greater solution viscosities than does SSW (curve D) over the temperature range tested.

The results also show that polymers prepared (curve C) in SSW are substantially more resistant to the effects of heat than polymers prepared in saline (curve B) or in distilled water (curve A), based on their significantly greater solution viscosities over all temperatures in this test. However, even the polymers prepared in saline or distilled water are potentially useful in certain process embodiments of this invention.

As shown in FIG. 2, the viscosities of all the polymers prepared approach that of SSW above 300 F. However, it should be noted that even at these temperatures the polymers are present as homogeneous solutions. In contrast, other polymers such as polyacrylamide precipitate as solids at about 200 F. or below. Furthermore, the viscosity of the inventive VP-Am copolymers relative to that of SSW at 200 F. can be increased by using higher concentrations of the copolymers, and/or copolymers of higher molecular weight.

TABLE VII

| Unaged Polymers | | | | | |
|---|---|---|---|---|---|
| Polymerized in Distilled Water | | Polymerized in NaCl | | Polymerized in SNSW | |
| Temp (F.) | Visc (cP) | Temp (F.) | Visc (cP) | Temp (F.) | Visc (cP) |
| 85 | 2.35 | 81 | 4.32 | 83 | 4.39 |
| 98 | 2.17 | 90 | 4.17 | 89 | 4.25 |
| 110 | 1.91 | 103 | 3.81 | 100 | 3.71 |
| 117 | 1.74 | 110 | 3.57 | 113 | 3.49 |
| 124 | 1.61 | 123 | 3.05 | 119 | 3.22 |
| 136 | 1.33 | 129 | 2.82 | 133 | 2.76 |
| 147 | 1.23 | 142 | 2.44 | 139 | 2.52 |
| 159 | 1.14 | 148 | 2.19 | 152 | 2.22 |
| 166 | 1.07 | 161 | 1.93 | 158 | 2.03 |
| 179 | 0.97 | 167 | 1.88 | 171 | 1.74 |
| 185 | 0.91 | 180 | 1.67 | 177 | 1.70 |
| 198 | 0.83 | 193 | 1.47 | 189 | 1.52 |
| 204 | 0.80 | 199 | 1.40 | 202 | 1.41 |
| 217 | 0.73 | 212 | 1.26 | 209 | 1.46 |
| 224 | 0.70 | 219 | 1.21 | 222 | 1.19 |
| 237 | 0.65 | 232 | 1.13 | 229 | 1.15 |
| 244 | 0.61 | 245 | 1.01 | 242 | 1.02 |
| 256 | 0.58 | 251 | 0.97 | 253 | 0.95 |
| 269 | 0.55 | 264 | 0.89 | 260 | 0.92 |
| 275 | 0.53 | 277 | 0.84 | 273 | 0.82 |
| 288 | 0.51 | 289 | 0.79 | 292 | 0.76 |
| 300 | 0.49 | 302 | 0.75 | 305 | 0.72 |

TABLE VIII

| Polymerized in Distilled Water | | Aged Polymers Polymerized in NaCl | | Polymerized in SSW | |
| --- | --- | --- | --- | --- | --- |
| Temp | Visc (cP) | Temp | Visc (cP) | Temp | Visc (cP) |
| 88 | 1.34 | 80 | 2.81 | 84 | 4.36 |
| 96 | 1.33 | 95 | 2.72 | 96 | 4.62 |
| 109 | 1.12 | 107 | 2.38 | 108 | 3.28 |
| 123 | 0.99 | 119 | 1.99 | 119 | 3.35 |
| 135 | 0.87 | 132 | 1.71 | 131 | 2.99 |
| 147 | 0.78 | 145 | 1.46 | 145 | 2.44 |
| 160 | 0.68 | 157 | 1.27 | 157 | 2.07 |
| 174 | 0.62 | 170 | 1.08 | 170 | 1.70 |
| 182 | 0.56 | 183 | 0.93 | 184 | 1.45 |
| 200 | 0.50 | 196 | 0.80 | 197 | 1.26 |
| 212 | 0.47 | 209 | 0.70 | 209 | 1.02 |
| 226 | 0.43 | 221 | 0.59 | 221 | 0.89 |
| 239 | 0.38 | 233 | 0.53 | 234 | 0.75 |
| 251 | 0.37 | 246 | 0.47 | 247 | 0.64 |
| 264 | 0.33 | 258 | 0.40 | 259 | 0.51 |
| 277 | 0.31 | 270 | 0.34 | 271 | 0.41 |
| 289 | 0.28 | 282 | 0.30 | 284 | 0.34 |
| 300 | 0.26 | 301 | 0.25 | 303 | 0.29 |

TABLE IX

| SSW Viscosities | |
| --- | --- |
| Temperature F. | Viscosity (cP) |
| 80 | 0.85 |
| 100 | 0.69 |
| 120 | 0.58 |
| 140 | 0.50 |
| 160 | 0.435 |
| 180 | 0.375 |
| 200 | 0.34 |
| 220 | 0.31 |
| 240 | 0.28 |
| 260 | 0.26 |
| 280 | 0.245 |
| 300 | 0.23 |

EXAMPLE V

Cloud Points and Viscosity

A series of VP/Am copolymers having VP/Am weight ratios of 90/10, 80/20, 70/30, 60/40, 55/45, 50/50 and 45/55 as before was prepared as before in 0.7 I.S. saline with 0.25 weight percent AIBN (based on the total monomer) as the initator. A portion of each polymer solution was diluted to 0.25 weight percent copolymer in 0.7 I.S. SSW in series A and to 0.50 weight percent copolymer in 0.7 I.S. SSW in series B. The series A solutions were subsequently aged for 1 week at 300 F. in the absence of oxygen and the polymer viscosity of each solution determined at 300 F. using a capillary viscometer as previously described. The series B solutions were divided into two portions. Portion 1 was aged for 7 weeks in SSW at 250 F. in the absence of oxygen. Portion 2 was aged in SSW at 300 F. for 7 weeks in the absence of oxygen. The cloud point of each solution in series B was determined in the manner previously described.

Figure 3:
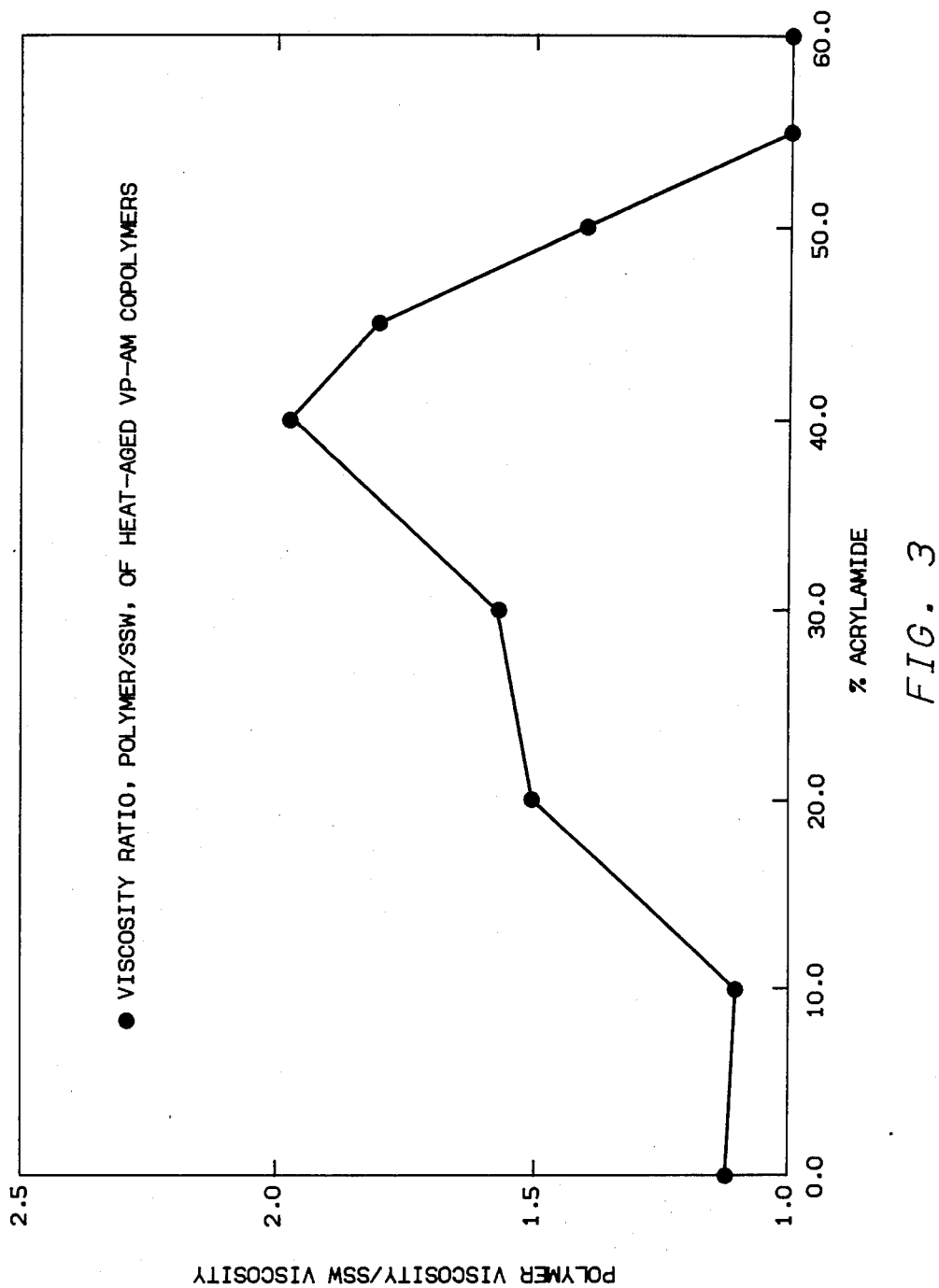
FIG. 3 illustrates the viscosity ratio of aged copolymers of the invention as a function of comonomer proportions.

The series A viscosity results are shown in FIG. 3, plotted as polymer viscosity/SSW viscosity ratio vs. copolymer composition. The series B cloud point results are plotted in FIG. 4. The viscosity results indicate that the most viscous polymer solutions were obtained at VP/Am weight ranges varying from about 80/20 to about 50/50. The optimum range, with these polymers as the basis, appears to be about 65/35 to about 55/45, with 60/40 giving the best results. Although copolymers prepared in synthetic sea water should be more viscous, the optimum range of monomer proportions should be similar to that obtained here.

Figure 4:
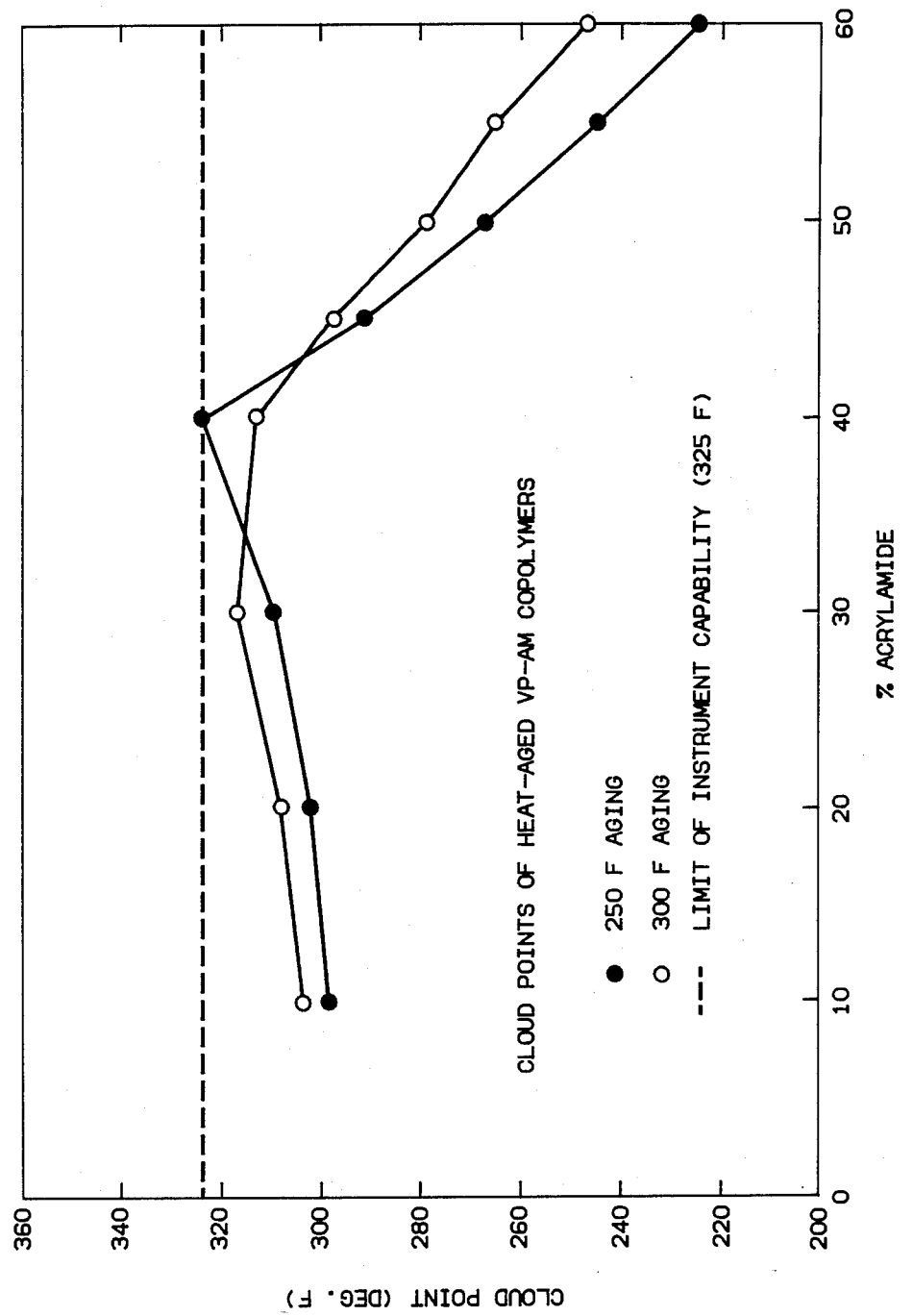
FIG. 4 illustrates cloud point temperatures for copolymers of the invention aged at different temperatures.

The cloud point results plotted in FIG. 4 indicate that the most degradation-resistant copolymers are formed with a VP/Am weight range varying from about 90/10 to about 55/45. That is, the cloud point varied from about 295 F. for 55/45 PVP/Am copolymer to about 300 F. for the 90/10 VP/Am copolymer. However, the peak cloud point temperature, for the 60/40 copolymer, was above 325 F., the limit of the apparatus used for that run, for the sample aged at 250 F. These results, in light of the highest solution viscosity results obtained with heat-aged 60/40 copolymer (FIG. 3), suggest that this copolymer is about optimum in composition for EOR applications in reservoirs with temperatures at least about 250 F. On the other hand, the results obtained at 300 F. suggest that copolymers having about equivalent performance can be expected when the VP/Am weight ratios vary from about 70/30 to about 60/40. As noted above, although copolymers prepared in synthetic sea water should display superior viscosity and stability, the optimum ranges of monomer proportions should correspond to those determined here.

Generally, better results were obtained with the copolymers aged at 300 F. (except for the 60/40 copolymer) than at 250 F. The degree of hydrolysis appears to stabilize at about 80% Am hydrolyzed. At 80% Am hydrolyzed the VP-Am (aged) sample is completely soluble in SSW at the temperatures below the cloud point. This equilibrium value, or consistency of degree of hydrolysis with time, permits a safe prediction that the polymer properties, specifically solubility and viscosity, will not change appreciably with time.

The viscosities and cloud points obtained for copolymers prepared in saline solution indicate that such copolymers would be useful in certain process embodiments of this invention, even if not as viscous or stable as copolymers prepared in synthetic sea water.

EXAMPLE VI

Equilibrium Cloud Points

A 50/50 (weight ratio) VP/Am copolymer was prepared as before in 0.7 I.S. SSW using 0.125 weight percent AIBN (based on the total monomer) as the initiator. The polymer solution was diluted with SSW to obtain a solution containing 0.5 weight percent copolymer. Individual portions of the diluted copolymer solution were aged for the specified time at the specified temperatures (250 F., 280 F. and 300 F.) in the absence of oxygen, and the cloud point of each copolymer solution determined as previously described. The results obtained are plotted in FIG. 5.

The curves indicate that the cloud point temperatures decline, e.g., perhaps 25-30 F. degrees, in the first 10 days aging, regardless of the aging temperature. The copolymer solution exposed to the highest temperature, 300 F., showed the steepest decline. After about 10-15 days, however, the cloud point temperatures of samples aged at the higher temperatures remained about the same for the duration of the test, e.g, 25 days. The cloud point temperatures thus appear to stabilize at an equilibrium value of about 260-170 F., whether tested at 250, 280 or 300 F., indicating that the copolymer should be resistant to degradation in hot, saline environments at temperatures at least as high as the equilibrium cloud point temperature.

EXAMPLE VII

Hydrolysis of the Copolymers

Figure 7:
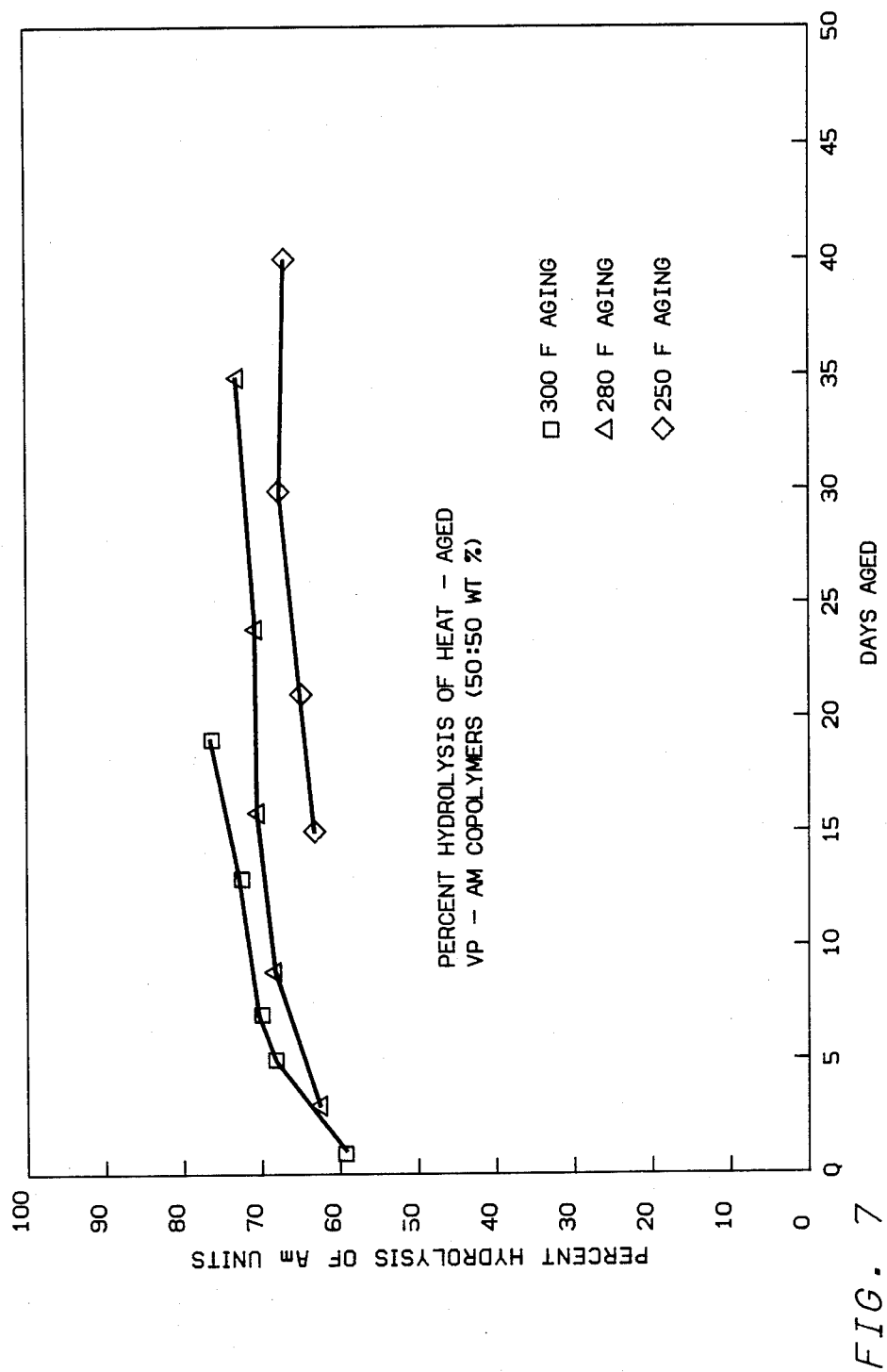

As mentioned earlier herein, the equilibrium cloud points and resultant properties of the aged copolymers are believed related to the degree of hydrolysis of the copolymers. Selected samples of the copolymers were tested for degree of hydrolysis by the Dow color test, describrd more fully Foshee, et al, in Paper SPE6202 (New Orleans, 1976), previously cited. To determine the percent hydrolysis, the concentration of amide produced by the hydrolysis is determined by an iodometric method, converting the amide groups to N-bromoamide, followed by a reaction with potassium iodide to form iodine which is then complexed with starch. The amount of this iodine-starch complex is then spectrophotometrically measured. The degree of hydrolysis can also be determined by the titration of ammonium ions produced as a result of the hydrolysis with sodium hydroxide, but the Dow color test has been found to be more convenient and sufficiently accurate. In FIG. 6, the effect of aging in SSW on the degree of hydrolysis of a 0.5 weight percent solution of a 50:50 PVP-Am copolymer prepared in SSW is plotted for three different aging temperatures. It is apparent that the hydrolysis process is relatively slow when the polymer is aged at 200 F. but exceeds the 50 percent point after about 15 days at 250 F. When the copolymer is aged at 300 F., 40 percent hydrolysis is attained almost immediately, and 60 percent is exceeded within ten days. However, as seen in FIG. 7 and as described earlier herein, these copolymers tend to attain an equilibrium degree of hydrolysis eventually, no matter what the aging temperature. As seen in FIG. 7, samples of a 0.5 weight percent 50:50 copolymer of VP-Am prepared in SSW and aged in SSW at the temperatures of 250, 280 and 300 F. all attain a percent hydrolysis in the range from about 65 to 75 percent after about 15 days aging.

EXAMPLE VIII

K Values as Indicators of Relative Viscosity and Molecular Weight

Fikentscher K values were developed to relate the relative viscosity of any polymer solution to concentration, and are functions of molecular weight of the polymers. This K equals 1000 k, where k is given by "Fikentscher's formula", $$\frac{\log \eta_{rel}}{C} = \frac{75 k^2}{1 + 1.5 kC} + k,$$

where C is concentration in grams per deciliter solution. The development and uses of these K values are described by K. H. Meyer in "Natural and Synthetic High Polymers", pp. 24–26 (Interscience, New York, 1942) and Schildknecht in "Vinyl and Related Polymers", p. 676 (John Wiley & Sons, New York, 1952).

The relative viscosity (viscosity ratio), $\eta_{rel}$, is the ratio, $t/t_o$, which can be determined from the average efflux times measured for the solution, $t$, and for the solvent, $t_o$.

With sufficiently long efflux times, e.g., about 100 seconds or longer, the specific viscosity, $\eta_{sp}$, can be determined from the relationship $$\eta_{sp} = (t - t_o)/t_o.$$

(generally, for the solutions employed, the value $\eta_{sp}$ is determined by subtracting 1 from $\eta_{rel}$.)

The ratio, $\eta_{sp}/C$, is called the reduced viscosity (viscosity number).

The intrinsic viscosity can be determined by plotting reduced viscosity vs concentration and extrapolating to measure the intercept for zero concentration.

For greater detail, see ASTM D 2857 and/or Polymer Technology—Part 3, pages 27–33, Plastics Engineering, August 1982.

K values have been used for years to describe the viscosity grades of commercially marketed cellulosic polymers as well as polyvinylpyrrolidones and other polymers. The use of K values has become well established and is retained as a means of expressing relative molecular weight; for example, K values for solutions of homopolymers of vinyl alkyl ethers are reported in Kirk-Othmer, *Encyclopedia of Chemical Technology*, Second Edition, Volume 21, pp. 419–420. As previously discussed herein, U.S. Pat. No. 3,500,925 discloses and claims homopolymers and copolymers of N-vinyl lactams, including N-vinyl-2-pyrrolidone, having K values of 10 to 140. Fikentscher, et al disclose in U.S. Pat. No. 3,006,900, issued Oct. 21, 1961, copolymers of methacrylamide and N-vinylpyrrolidone, and "mixed copolymers" including at least one other monomer such as acrylamide, characterized by K values of at least about 35.5.

Examples of inventive and control copolymers of 50:50 VP:Am composition were prepared by methods disclosed herein, tested for relative viscosity ($\eta_{rel}$), and characterized by K values calculated in accordance with the above formula.

Relative Viscosity Measurement

Relative viscosities ($\eta_{rel}$) of the VP-Am copolymers were determined by comparing the flow time of polymer solution at a given polymer concentration with the flow time of the neat solvent. The following relationship of flow times describes Relative Viscosity.

$$\eta_{rel} = \frac{t}{t_o}$$

$t$ = flow time polymer solution $t_o$ = flow time of neat solvent

In all examples herein, relative viscosity was measured in an Ubbelohde #1 capillary viscometer at 25.0° C. Flow times were taken by stop watch, and the times recorded in most cases to the nearest 1/100th second or in all cases to the closest 1/10th second. The precision of this time measurement was assured by repeating each flow through the viscometer three times, and an average flow time, from range of values of no more than 2/10th second, reported.

Based upon the precision of these and other measurements, the precision of the calculated K values is estimated to be ± less than about one K value unit.

Surprisingly, the K values calculated for even copolymers prepared in a distilled water polymerization medium were higher than those reported in U.S. Pat. No. 3,500,925, and the K values for copolymers prepared by the inventive methods disclosed herein were substantially higher. Over the ranges tested, the K values were found generally to vary inversely with polymer concentration in the test solution, e.g., the lower the concentration, the higher the K value. Some variation was also found depending upon the nature of the solution in which the polymers were tested for relative viscosity before calculating the K values. For polymers prepared in the same polymerization media, measurement of relative viscosity in synthetic sea water (SSW) generally produced higher K values than for those tested in $H_2O$, with polymers tested in a solution of mixed salts producing K values lower than the synthetic sea water but slightly higher than solutions of NaCl.

Figure 8:
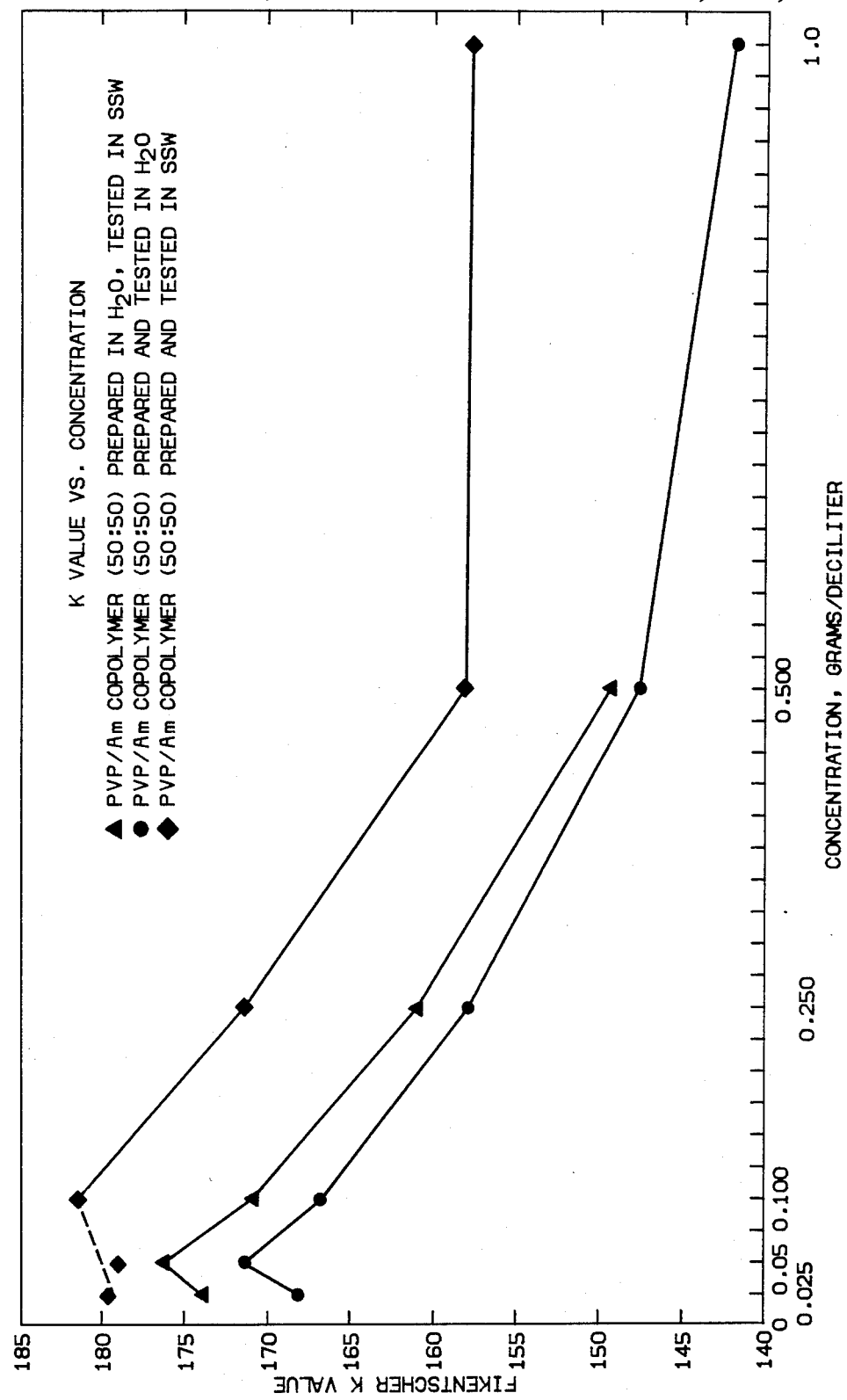
FIG. 8 shows K values for copolymers of the invention at various concentrations compared with copolymers of the prior art.

FIG. 8 describes the variation of the K value with the polymer concentration in test solution for copolymers prepared in water. Since it was indicated in some sources in the literature that measurements for K values were made with a concentration equal to 1.0 g per deciliter of solution, one of these samples was tested in water at this concentration and a K value of 141.8 was obtained for it. In these aqueous systems, the concentrations in grams/deciliter and weight percent are approximately equal. Identical samples were tested in various electrolyte solutions at concentration of 0.5 g/dL and below. As can be seen in FIG. 8, the K values obtained were generally higher than those calculated for samples tested in water at the same concentrations. The maximum values were seen for samples tested in synthetic sea water, with K values ranging from 149 to 176; samples tested in water produced K values 3 to 5 units lower. For clarity, only the values for samples tested in SSW and $H_2O$ have been plotted, with all data listed in Table X. Those samples tested in saline solution produced K values ranging from 150 to 179, with samples tested in solutions of magnesium chloride and calcium chloride producing K values slightly below these figures.

Samples of VP:Am (50:50) copolymer were also prepared in SSW and tested in SSW for comparison with the copolymers prepared in water. The results of relative viscosity measurements and calculated K values are tabulated in Table XI. The K values for concentrations in the range form 0.025 to 1.0 g/deciliter are plotted in FIG. 8 for comparison with the copolymers prepared in water and tested in water. The K value of 157.7 obtained for C=1.0 g/dL is substantially higher than the K of 141.8 obtained with the $H_2O/H_2O$ copolymer, and this advantage persists over most of the concentration range, even compared to the samples made in water and tested in solutions of various electrolytes. (The notation $H_2O/H_2O$ means the copolymer was prepared in water and its viscosity was determined in water.) The K values of about 178 for C=0.05 and 0.025 are inconsistent with this trend, and may represent the limit of errors in weighing or other measurements.

Figure 9:
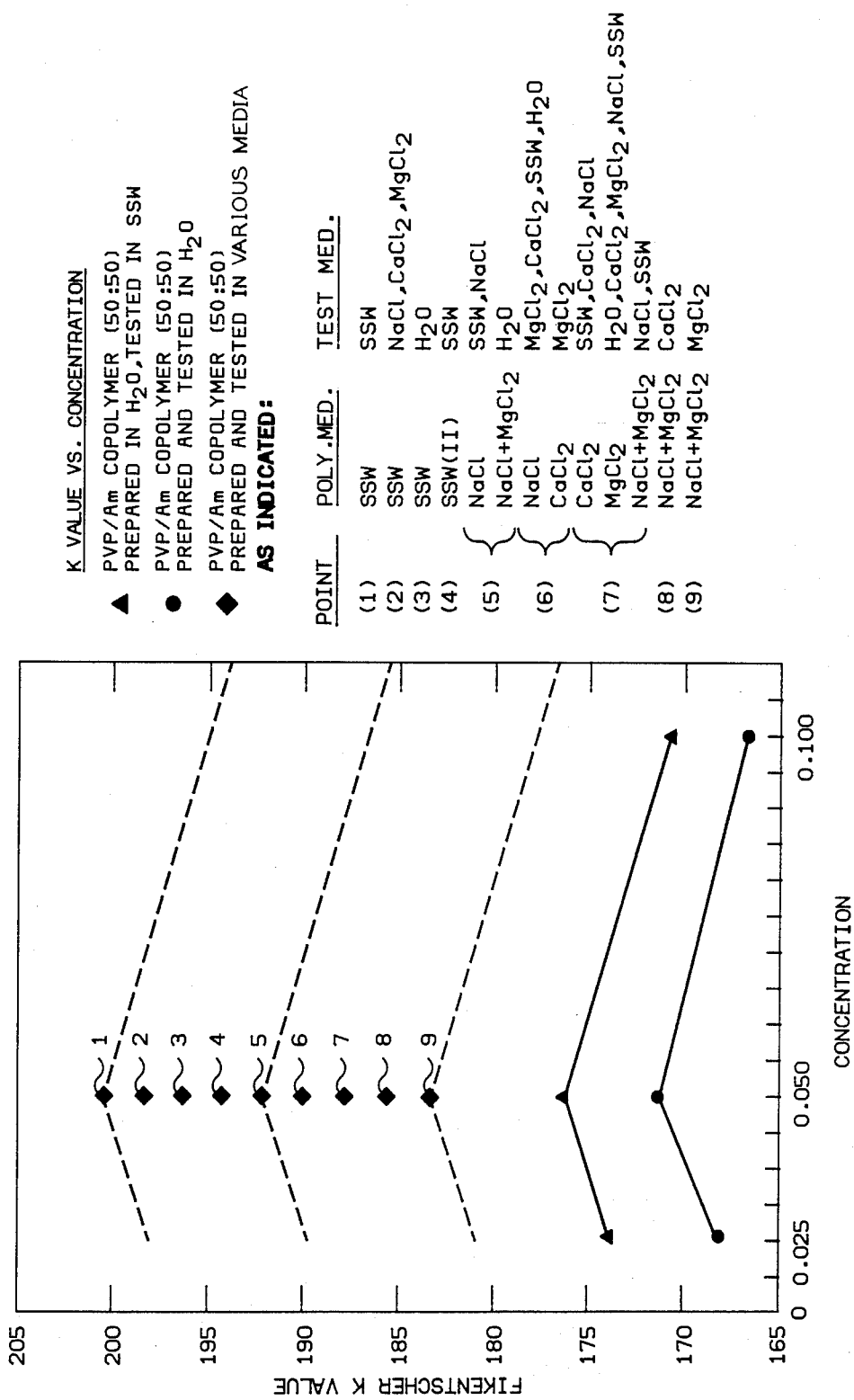
FIG. 9 shows K values for copolymers of the invention as well as copolymers of the prior art at various concentrations and for various polymerization and test media.

FIG. 9 shows plots of K values versus concentration from FIG. 8 for a limited range of concentrations equal to 0.025 to 0.1 grams/deciliter. Several of the samples prepared in water displayed an apparent maximum K value at a concentration of 0.05 g/dL. Samples of copolymers of the same 50:50 composition were then prepared in various aqueous polymerization media containing electrolytes, tested for relative viscosity at concentrations of 0.05 g/dL, and the K values calculated. As seen in FIG. 9 and Table XII, the K values for these copolymers were substantially higher than for the samples made in water. A smaller amount of variation was observed depending on the solution medium in which the polymers were tested. Maximum values were obtained for the sample prepared and tested in synthetic sea water, giving a K value of 200.4. A second polymer sample of the same composition (SSW II) prepared and tested in synthetic sea water gave a K value of 194.3 The average of these K values, 197.4, is comparable to the values obtained for other samples prepared in synthetic sea water and tested in various electrolyte solutions, and is substantially higher than the values obtained for the polymers prepared and tested in other electrolyte solutions. Tested in water, this material produced a K value of about 196. Samples prepared in saline solution produced a K value of about 192, regardless of the test medium. Samples prepared in a polymerization medium containing a mixture of NaCl and $MgCL_2$ produced K values ranging from 183 to 192, with the maximum being obtained for the samples tested in a solution of $H_2O$. While not all the differences in K values for samples prepared and tested in various media can be explained, and some differences may be due to statistical variations and/or operator error, the copolymers prepared in electrolytes, particularly synthetic sea water, NaCl or a mixture of salts, produced significantly higher K values than those copolymer samples prepared in $H_2O$. These polymers were of significantly higher K value than many commercial polymers, including polyvinylpyrrolidone and the polymers claimed in U.S. Pat. No. 3,500,925. Thus, while the inventive copolymers prepared in synthetic sea water or mixed electrolyte solutions are superior as reflected by their relative viscosities and K values, the copolymers prepared in $H_2O$ or other electrolyte solutions are sufficiently viscous to be useful in certain process embodiments of the invention.

TABLE X

Calculated K values for VP-Am copolymer (50:50 wt. percent) prepared in distilled water with 0.5 wt. percent AIBN and tested in various media

| Conc. (g/dL) | Medium | $\eta_{rel}$ | K Value |
|---|---|---|---|
| 1.0 | $H_2O$ | 24.3 | 141.8 |
| 0.5 | $H_2O$ | 6.44 | 147.6 |
| 0.25 | $H_2O$ | 3.02 | 157.8 |
| 0.10 | $H_2O$ | 1.66 | 166.7 |
| 0.05 | $H_2O$ | 1.31 | 171.4 |
| 0.025 | $H_2O$ | 1.14 | 168.2 |
| 0.5 | SSW | 6.70 | 149.3 |
| 0.25 | SSW | 3.15 | 161.0 |
| 0.10 | SSW | 1.70 | 170.8 |
| 0.05 | SSW | 1.33 | 176.3 |
| 0.025 | SSW | 1.15 | 173.9 |
| 0.5 | $MgCl_2$ | 7.04 | 151.4 |
| 0.25 | $MgCl_2$ | 3.20 | 162.1 |
| 0.10 | $MgCl_2$ | 1.64 | 164.6 |
| 0.05 | $MgCl_2$ | 1.32 | 173.9 |
| 0.025 | $MgCl_2$ | 1.15 | 173.9 |
| 0.5 | $CaCl_2$ | 6.86 | 150.3 |
| 0.25 | $CaCl_2$ | 3.18 | 161.7 |
| 0.10 | $CaCl_2$ | 1.63 | 163.6 |
| 0.05 | $CaCl_2$ | 1.32 | 173.9 |
| 0.025 | $CaCl_2$ | 1.14 | 168.2 |
| 0.5 | NaCl | 6.94 | 150.8 |
| 0.25 | NaCl | 3.21 | 162.4 |
| 0.10 | NaCl | 1.73 | 173.8 |
| 0.05 | NaCl | 1.30 | 168.8 |
| 0.025 | NaCl | 1.16 | 179.5 |

TABLE XI

Calculated K values for VP:Am copolymer (50:50 wt. percent) prepared in SSW with 0.5 wt. percent AIBN and tested in SSW.

| Conc. (g/dl) | $\eta_{rel}$ | K Value |
|---|---|---|
| 1.0 | 46.36 | 157.7 |
| 0.5 | 8.24 | 158.0 |
| 0.25 | 3.63 | 171.2 |
| 0.10 | 1.81 | 181.1 |

TABLE XI-continued

Calculated K values for VP:Am copolymer
(50:50 wt. percent) prepared in SSW with
0.5 wt. percent AIBN and tested in SSW.

| Conc. (g/dl) | $\eta_{rel}$ | K Value |
|---|---|---|
| 0.05 | 1.34 | 178.7 |
| 0.025 | 1.16 | 178.2 |

TABLE XII

Calculated K values for VP-Am copolymers (50:50 composition)
prepared in various media with 0.5 wt. percent AIBN
and tested in various media. (All concentrations 0.05 g/dl)

| Polymerization Medium | Test Medium | $\eta_{rel}$ | K Value |
|---|---|---|---|
| SSW | SSW | 1.44 | 200.4 |
| SSWII | SSWII | 1.41 | 194.3 |
| SSW | NaCl | 1.43 | 198.4 |
| SSW | CaCl$_2$ | 1.43 | 198.4 |
| SSW | MgCl$_2$ | 1.43 | 198.4 |
| SSW | H$_2$O | 1.42 | 196.4 |
| NaCl | SSW | 1.40 | 192.2 |
| NaCl | NaCl | 1.40 | 192.2 |
| NaCl | CaCl$_2$ | 1.39 | 190.0 |
| NaCl | MgCl$_2$ | 1.39 | 190.0 |
| NaCl | H$_2$O | 1.39 | 190.0 |
| NaCl/MgCl$_2$ | SSW | 1.38[a] | 187.9 |
| NaCl/MgCl$_2$ | NaCl | 1.38 | 187.9 |
| NaCl/MgCl$_2$ | H$_2$O | 1.40 | 192.2 |
| NaCl/MgCl$_2$ | CaCl$_2$ | 1.37 | 185.6 |
| NaCl/MgCl$_2$ | MgCl$_2$ | 1.36 | 183.4 |
| CaCl$_2$ | MgCl$_2$ | 1.39 | 190.0 |
| CaCl$_2$ | SSW | 1.38 | 187.9 |
| CaCl$_2$ | CaCl$_2$ | 1.38 | 187.9 |
| CaCl$_2$ | NaCl | 1.38 | 187.9 |
| CaCl$_2$ | H$_2$O | 1.37 | 185.9 |
| MgCl$_2$ | SSW | 1.38 | 187.9 |
| MgCl$_2$ | NaCl | 1.38 | 187.9 |
| MgCl$_2$ | MgCl$_2$ | 1.38 | 187.9 |
| MgCl$_2$ | CaCl$_2$ | 1.38 | 187.9 |
| MgCl$_2$ | H$_2$O | 1.38 | 187.9 |

[a]Average of two runs using separate polymer batches

EXAMPLE IX

Screen Factor Tests

A series of 50/50 VP/Am copolymers was prepared in 0.7 I.S. SSW at 50 C. as previously described using AIBN as the initiator. Each copolymer solution was produced with a different amount of initiator, the range extending from 0.13 to 1.0 weight percent AIBN based on monomer weight. Each polymer solution was further diluted with SSW to provide solutions having from about 0.2 to 1 weight percent polymer. The screen factors for the various solutions were determined at 78 F. and at 180 F. by measuring the time required for passage of an aliquot of the polymer solution by gravity flow through five 100-mesh stainless steel screens at the designated temperature and dividing this time by the time required for passage of the same amount of SSW through these screens under identical conditions. This method is described by Foshee, et al, as previously cited.

Figure 10:
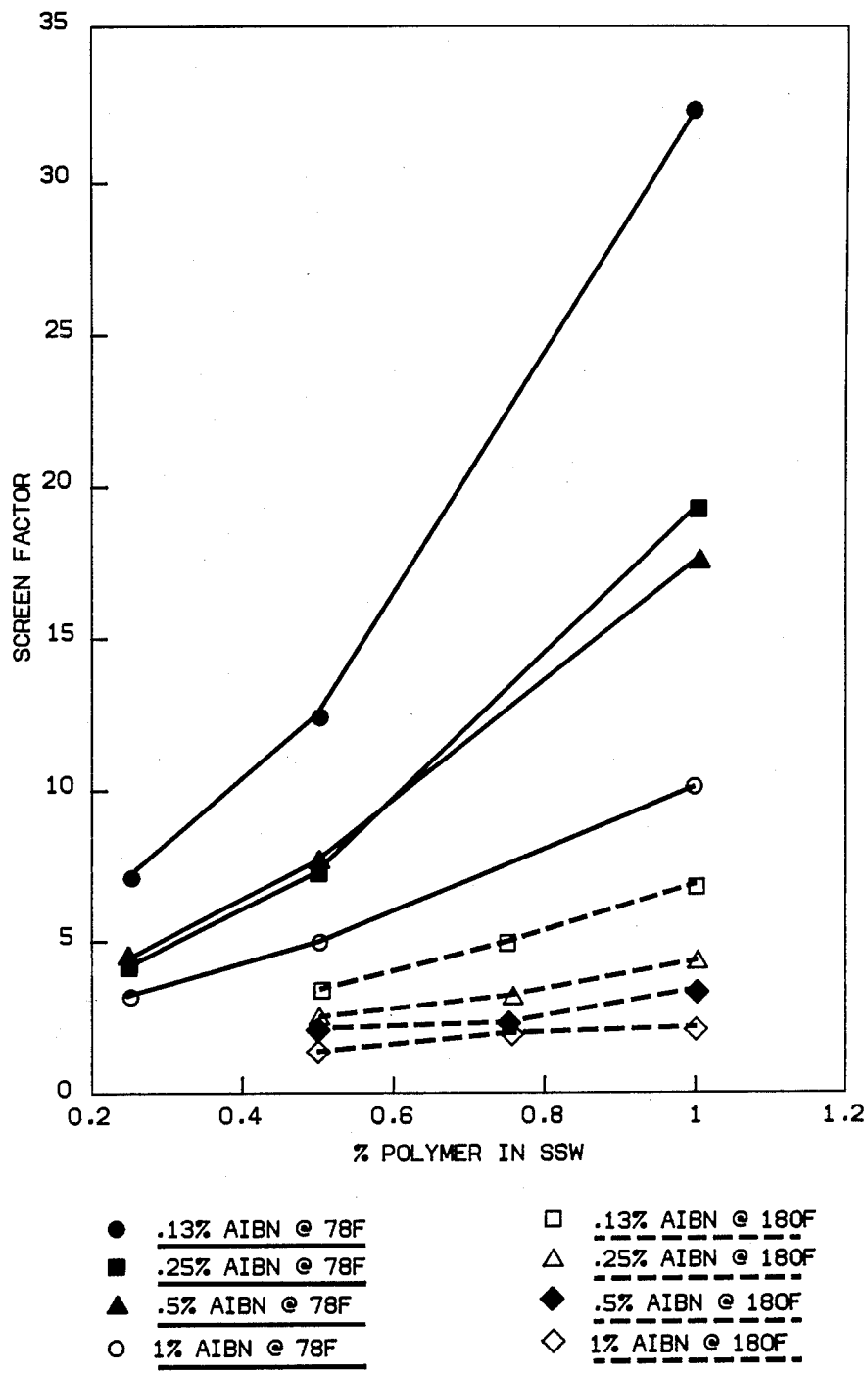
FIG. 10 illustrates Screen Factors for copolymers of the invention tested at various concentrations in SSW.

The results obtained are plotted in FIG. 10. The screen factors are directly related to the molecular weight of the polymer, e.g. how much AIBN was used in its preparation, and accordingly to its solution viscosity. The higher the molecular weight (higher the solution viscosity) the higher the screen factor over the range studied. Polymer molecular weight is inversely related to initiator concentration, as is known in the art. Consequently, the highest screen factor is obtained with the polymer prepared with the least amount of initiator.

Screen factors at 180 F. are smaller than their counterparts at 78 F., as expected. For example, a solution containing 1 weight percent copolymer (copolymer prepared with 0.13 weight percent AIBN) has a screen factor of about 32 at 78 F. and about 7 at 180 F.

Screen factors are easier and faster to obtain than resistance factors and they can be used to estimate the relative magnitudes of the resistance factors at the same temperatures. A resistance factor describes a decrease in mobility of a polymer solution in comparison with the flow of the aqueous medium in which it is prepared. With chemically similar polymers, as the screen factor increases the resistance factor also increases. For example, screen factors measured for 0.5 weight percent solutions of the 50/50 VP/Am copolymers (prepared with 0.13, 0.25 and 1.0 weight percent AIBN in SSW) in SSW at 180 F. are 3.3, 2.4, and 1.3, while preliminary average resistance factors for identical solutions measured in Berea cores are 12.1, 9.8 and 5.0, respectively. These values result in an average ratio of resistance factor to screen factor of about 3.9. From this ratio and the screen factor for another copolymer in this group, one can estimate its resistance factor under the same conditions.

Detailed information relating to screen factors, resistance factors and the like are given by Jennings, R. R.; Rogers, J. H. and West, T. J. "Factors Influencing Mobility by Polymer Solutions", J. Pet. Tech. (March 1971), 391–401.

EXAMPLE X

Drilling Mud Additives

A series of five VP/Am 50/50 weight percent copolymers was prepared. Two of the samples were prepared in t-butyl alcohol using 1 weight percent t-BPP, based on the monomers, as the initiator. The remaining three samples were each prepared in saturated NaCl water, using AIBN as the initiator at weight percent levels, based on the monomers, of 1.0, 0.5 and 0.25, respectively. The samples prepared in NaCl water are comparison polymers.

The samples were tested in various drilling muds, as specified, for low and high water loss properties, plastic viscosity, yield point value and gel strength.

The initial evaluation of the polymers was done in muds by adding 3.5 weight percent attapulgite clay to either 5 weight percent NaCl solution (base mud A) or saturated NaCl water (base mud B). Polymers submitted as solids were first ground and sifted into mud aliquots while they were stirred with a Hamilton Beach Multimixer to minimize lumping. Provision was made for polymers submitted as solutions by withholding the corresponding volume of water from the base mud when it was prepared. Water was added as necessary depending on the concentrations of the particular polymer samples. After the polymers were added to 280 mL aliquots of mud, the mud samples were stirred for 20 minutes with the Multimixer.

Before any tests were made, the mud samples were cooled to room temperature (about 25 C.) while standing a minimum of 2 hours. Next, the samples were stirred 2 minutes with the Multimixer and tested with a Fann Model 35 VG meter to determine plastic viscosity, yield point value and gel strength. These tests, and a water loss test at room temperature, were made in accordance with API RP 13B. The mud pH values were also recorded. All tests were repeated after the muds were aged for 16 hours at 80 C. in the absence of oxygen. Apparent viscosity was determined at 600 RPM with the VG meter assuming Newtonian flow.

For the high temperature tests, base mud A was treated with 12 lbs/bbl bentonite clay and a 2 lbs/bbl Desco® thinner, Phillips Petroleum Co., a blend of sulfomethylated quebracho and sodium dichromate, along with sufficient NaOH to obtain the desired pH before addition of the polymers. Polymer addition and initial testing were done at room temperature as in the low temperature tests. After the initial tests, the mud samples were aged in brass bombs in the absence of oxygen for 16 hours at 360 F. After aging, the muds were cooled to room temperature, stirred for 2 minutes with the Multimixer, and tests on plastic viscosity, yield point value, pH, and water loss were repeated. The final test on these muds was a high temperature water loss test performed at 325 F. and 500 psi differential pressure.

In the Tables the polymers are identified as follows:

Polymer 1, made in t-butyl alcohol with 1 weight percent t-BPP based on the monomers.

Polymer 2, like 1, except submitted as a solid for testing.

Polymer 3, made in saturated NaCl water, 1 weight percent AIBN based on the monomers.

Polymer 4, like 3 except used 0.5 weight percent AIBN.

Polymer 5, like 3 except used 0.25 weight percent AIBN.

The results are reported in Tables XIII, XIV, and XV. The results presented in Tables XIII and XIV indicate that at low polymer concentrations, e.g. about 1 lb/bbl mud, made with 3.5 weight percent attapulgite clay in 5 weight percent NaCl water or in saturated NaCl water, relatively poor water loss performance in both unaged and in aged test samples was noted. However, when the amount of polymer was increased to about 3 or 4 lbs polymer/bbl mud, water loss values for the unaged and aged samples were low, e.g. about 5–7 mL/30 minutes at room temperature.

Table XV summarizes the performance of the copolymers in hard brine muds. The hard brine was a synthetic brine prepared by dissolving 1235 g NaCl, 308 g $CaCl_2$ and 78.5 g $MgCl_2.6H_2O$ in 5000 mL of tap water. The calculated calcium ion concentration in this brine is 1.68 weight percent.

The results in Part A of Table XV indicate that in mud prepared by mixing 2 lbs/bbl of asbestos fiber and 16 lbs/bbl of P95 illite clay from Roger Lake, Calif. in the hard brine, the water loss values of an inventive copolymer prepared in t-butyl alcohol were equivalent or better than those obtained with a commercially available mud additive (Driscal®II) when the polymers are used at 2 lbs/bbl under conditions employed. With lesser amounts of polymer, the commercial polymer is superior under such test conditions. (Driscal®II is a 50/50 weight percent mixture of carboxymethylhydroxyethyl cellulose and polyethylene glycol having a molecular weight of about 8,000, available from Drilling Specialties Co., Bartlesville, OK 74004).

The data in part B of Table XV show that inventive polymer 2 is more effective (lower water loss results) than comparison polymer 4 in the mud absent the Flosal® fiber (asbestos fiber) but in the presence of added bentonite clay. However, in this test the commercial polymer gave somewhat better results, e.g. lower water loss, than inventive polymer 2.

The high temperature water loss values for a mud composed of 12 lbs/bbl bentonite clay, 2 lbs/bbl Desco® thinner and sufficient NaOH to give a pH of about 10–12 admixed with base mud A (3.5 weight percent-tapulgite clay in 5 weight percent NaCl water), in the presence or absence of 1 lb/bbl of gypsum, are presented in Table XVI. The water loss data show that inventive polymer 2 initially gives somewhat higher results at room temperature than those obtained with the commercial polymer Drispac® Superlo, a carboxymethyl cellulose of Drilling Specialties Co. However, after aging the polymers for 16 hours at 360 F. and retesting them at room temperature, the data show the inventive polymer to be clearly superior to Superlo in the absence or presence of added gypsum. The water loss data also show the inventive polymer to perform better in the absence of gypsum, both initially and after aging, than the commercial polymer, Cypan® sodium polyacrylate of American Cyanamide. However, aged Cypan performs somewhat better than the aged invention copolymer in mud containing gypsum.

The water loss data additionally show the comparison polymers to be equivalent or better in performance than inventive polymer 2 in initial testing and especially after aging the polymers, both in the absence or presence of gypsum. Very low high temperature water loss results are also obtained with the comparison polymer. Based on superior results presented before with the inventive polymers prepared in SSW, whether aged or unaged, relative to those made in NaCl or other aqueous solution containing one or two electrolytes, it is believed that said inventive polymers will outperform the comparison polymers in drilling mud applications as well.

TABLE XIII

| Polymer Conc., lb/bbl | Screening Tests in Base Mud A | | | | | | | | | |
|---|---|---|---|---|---|---|---|---|---|---|
| | Initial Properties | | | | | Aged 16 Hours at 80 C. | | | | |
| | AV* | PV/YP** | Gels** | pH | WL** | AV | PV/YP | Gels | pH | WL* |
| Base Mud*** | 5.5 | 2/7 | 7/9 | 8.2 | 173. | 6 | 3/6 | 5/6 | 8.2 | 174. |
| Polymer 1 | | | | | | | | | | |
| 1 | 11 | 6/10 | 4/8 | 8.0 | 26. | 16 | 7/18 | 8/14 | 8.3 | 100. |
| 3 | 12 | 10/4 | 2/3 | 8.0 | 7.5 | 13 | 10/6 | 0/0 | 8.3 | 9.1 |
| Polymer 3 | | | | | | | | | | |
| 1 | 10.5 | 8/5 | 3/5 | 8.1 | 42. | 10 | 7/6 | 4/5 | 8.2 | 159. |
| Polymer 5 | | | | | | | | | | |

TABLE XIII-continued

| | Screening Tests in Base Mud A | | | | | | | | | |
|---|---|---|---|---|---|---|---|---|---|---|
| Polymer | Initial Properties | | | | | Aged 16 Hours at 80 C. | | | | |
| Conc., lb/bbl | AV* | PV/YP** | Gels** | pH | WL** | AV | PV/YP | Gels | pH | WL* |
| 1 | 16. | 9/14 | 7/7 | 8.2 | 50. | 17.5 | 8/19 | 7/7 | 8.1 | 138. |

*Apparent viscosity, cP (assuming Newtonian flow and a shear rate of 1022 reciprocal seconds).
**PV - Plastic viscosity, cp
YP - Yield point, lb/100 sq. ft.
Gels - Gel strength, 10 sec/10 min., 1 lb/100 sq. ft.
WL - API water loss, mL/30 minutes
***Base Mud A - 3.5 percent attapulgite clay in 5 percent NaCl solution.

TABLE XIV

| | Screening Tests in Base Mud B | | | | | | | | | |
|---|---|---|---|---|---|---|---|---|---|---|
| Polymer | Initial Properties | | | | | Aged 16 Hours at 80 C. | | | | |
| Conc., lb/bbl | AV* | PV/YP | Gels | pH | WL*** | AV | PV/YP | Gels | pH | WL*** |
| Base Mud** | 8 | 4/8 | 6/9 | 7.7 | 138 | 9.5 | 4/9 | 5/5 | 7.7 | 129 |
| Polymer 1 | | | | | | | | | | |
| 1 | 12.5 | 8/9 | 6/8 | 7.6 | 75. | — | — | — | — | — |
| 3 | 16.5 | 14/5 | 1/1 | 7.8 | 5.4 | — | — | — | — | — |
| Polymer 2 | | | | | | | | | | |
| 1 | 21.5 | 10/23 | 11/15 | 7.8 | 105. | — | — | — | — | — |
| 3 | 23 | 17/12 | 2/3 | 7.5 | 6.8 | 27 | 20/14 | 1/2 | 7.9 | 5.5 |
| Polymer 3 | | | | | | | | | | |
| 1.00 | 14 | 10/8 | 5/5 | 7.6 | 56. | 14.5 | 10/9 | 6/6 | 7.6 | 146. |
| 1.25 | 15 | 12/6 | 2/4 | 7.3 | 21. | 12.5 | 8/7 | 3/4 | 7.8 | 85. |
| 3.75 | 43.5 | 30/27 | 3/4 | 7.3 | 5.6 | 35. | 31/8 | 2/2 | 7.8 | 6.3 |
| Polymer 4 | | | | | | | | | | |
| 1.25 | 15 | 11/8 | 3/4 | 7.4 | 16. | 13.5 | 9/9 | 4/6 | 7.9 | 64. |
| 3.75 | 44.5 | 31/27 | 3/3 | 7.4 | 5.7 | 35.5 | 28/15 | 2/2 | 7.7 | 5.5 |
| Polymer 5 | | | | | | | | | | |
| 1 | 13.5 | 9/9 | 4/6 | 7.6 | 47. | 13 | 8/10 | 6/7 | 7.6 | 150. |
| 1.25 | 14. | 12/4 | 1/3 | 7.4 | 18.5 | 12.5 | 9/7 | 3/4 | 7.6 | 111. |
| 3.75 | 46. | 32/28 | 2/3 | 7.4 | 5.5 | 37.5 | 28/19 | 2/2 | 7.7 | 5.0 |

*AV - Apparent viscosity, cP (assuming Newtonian flow and a shear rate of 1022 reciprocal seconds.)
**Base Mud B - 3.5 percent attapulgite clay in saturated NaCl water
***Water loss, mL/30 minutes

TABLE XV

| | | Screening Tests in Hard Brine* Muds | | | | | |
|---|---|---|---|---|---|---|---|
| | | Initial Properties | | | Aged 16 Hours at 80 C. | | |
| Materials Conc., lb/bbl | | PV/YP | Gels | WL | PV/YP | Gels | WL |
| AM/VP | Driscal ® II | (pH 6.4–7.0) | | | (pH 6.1–6.4) | | |
| Part A - Muds Prepared with 2 lb/bbl Flosal ® fiber and 16 lb/bbl P95 illite clay from Rogers Lake, California. | | | | | | | |
| — | — | 6/15 | 18/14 | 180. | — | — | — |
| — | 1 | 8/10 | 14/10 | 14.5 | 6/9 | 5/5 | 18.0 |
| — | 2 | 12/22 | 29/20 | 7.9 | 11/19 | 3/5 | 8.0 |
| Polymer 2 | | | | | | | |
| 1 | — | 7/16 | 19/15 | 23.0 | 8/18 | 11/12 | 95. |
| 2 | — | 10/7 | 14/10 | 7.0 | 7/10 | 5/7 | 6.0 |
| Part B - Muds Prepared without Flosal fiber but treated with 16 lb/bbl P95 clay and other clays as specified | | | | | | | |
| | | (16 lb/bbl bentonite clay added) | | | | | |
| — | — | 3/1 | 1/2 | 95. | — | — | — |
| — | 1 | 4/6 | 1/10 | 25. | — | — | — |
| Polymer 2 | | | | | | | |
| 1 | | 3/1 | 1/1 | 57. | — | — | — |
| | | 10 lb/bbl bentonite clay added | | | | | |
| Polymer 4 | | | | | | | |
| 1 | — | 4/1 | 1/1 | 82** | — | — | — |
| | | No additional clay added | | | | | |
| Polymer 4 | | | | | | | |
| — | 1 | 6/2 | 1/1 | 14.8 | — | — | — |
| .5 | .5 | 4/1 | 1/1 | 21.0 | — | — | — |
| 1 | — | 5/0 | 0/1 | 98.** | — | — | — |
| 1 | — | 4/1 | 1/1 | 137.** | — | — | — |
| The above test was repeated with the opposite order of addition | | | | | | | |
| 1 | — | 4/1 | 1/1 | 82** | — | — | — |

*Hard Brine-Synthetic brine prepared by adding 1235 g NaCl, 308 g CaCl$_2$, and 78.5 g MgCl$_2$·6H$_2$O to 5000 ml tap water. The calcium ion concentration is calculated to be 1.675 percent by weight
**These WL values were calculated after a one minute test.

TABLE XVI

High Temperature Tests - Effect of Gypsum

| Materials Conc., lb/bbl. | | Initial Properties | | | | Aged 16 Hours at 360 F. | | | | |
|---|---|---|---|---|---|---|---|---|---|---|
| Polymer | Gypsum | PV/YP | Gels | pH | WL | PV/YP | Gels | pH | WL | HTWL |
| Base Mud* | | | | | | | | | | |
| — | — | 3/4 | 5/11 | 10.0 | 86. | 3/6 | 10/31 | 7.9 | 137. | — |
| — | 1 | 3/3 | 4/10 | 9.7 | 100 | 3/4 | 5/14 | 7.8 | 130. | — |
| *Part A - Commercial Drilling Mud Additives* | | | | | | | | | | |
| Drispac ® Superlo | | | | | | | | | | |
| 3 | — | 31/20 | 2/6 | 9.3 | 6.0 | 5/5 | 5/13 | 7.0 | 90. | — |
| 3 | 1 | 27/15 | 2/5 | 9.2 | 5.0 | 3/5 | 5/10 | 7.6 | 110. | — |
| Cypan ® - sodium polyacrylate | | | | | | | | | | |
| 3 | — | 6/2 | 2/5 | 11.6 | 14.0 | 4/2 | 0/1 | 8.7 | 54. | |
| 3 | 1 | 5/3 | 2/6 | 11.6 | 17.2 | 2/4 | 1/1 | 8.7 | 37. | 74. |
| *Part B - Experimental AM/VP Copolymers* | | | | | | | | | | |
| Polymer 2 | | | | | | | | | | |
| 3 | — | 18/22 | 7/11 | 9.5 | 9.2 | 17/42 | 12/12 | 7/5 | 17.0 | — |
| 3 | 1 | 17/22 | 7/12 | 9.8 | 10.0 | 14/46 | 14/16 | 7.3 | 64.0 | — |
| Polymer 3 | | | | | | | | | | |
| 2 | — | 14/10 | 3/6 | 11.7 | 8.9 | 16/14 | 2/3 | 9.1 | 8.4 | 54. |
| 2 | 1 | 15/7 | 2/6 | 11/6 | 10.4 | 17/14 | 2/3 | 9.1 | 8.6 | 36. |
| 3.75 | — | 26/34 | 4/10 | 11.5 | 5.5 | 31/44 | 6/7 | 8.5 | 6.0 | 23. |
| 3.75 | | 26/29 | 3/9 | 11.2 | 5.7 | 29/40 | 6/8 | 8.2 | 6.0 | 27. |
| Polymer 4 | | | | | | | | | | |
| 3.75 | — | 29/33 | 4/8 | 11.4 | 5.7 | 30/44 | 5/6 | 8.5 | 5.8 | 28. |
| 3.75 | 1 | 27/31 | 4/9 | 11.3 | 5.8 | 28/41 | 7/8 | 8.2 | 5.5 | 29. |
| Polymer 5 | | | | | | | | | | |
| 2 | — | 16/10 | 2/6 | 11.7 | 8.4 | 16/12 | 2/3 | 9.0 | 9.6 | 50. |
| 2 | 1 | 14/10 | 3/6 | 11.6 | 9.7 | 13/12 | 2/3 | 9.0 | 9.3 | 48. |
| 3.75 | — | 27/37 | 4/8 | 11.5 | 5.9 | 30/48 | 6/7 | 8.4 | 6.0 | 24. |
| 3.75 | 1 | 28/36 | 4/7 | 11.4 | 6.3 | 25/40 | 6/6 | 8.3 | 6.1 | 26. |

*The mud for these tests was prepared by adding 12 lb/bbl bentonite clay, 2 lb/bbl Desco ® thinner, and NaOH to Base Mud A. Base Mud A is 3.5% attapulgite clay in 5 percent NaCl water.
**HTWL — High temperature, high pressure water loss, API, mL/30 min. at 325° F. and 500 psi

EXAMPLE XI

Preparation and Properties of PVP Homopolymer

This example describes the preparation and the aqueous solution viscosity behavior of poly(N-vinyl-2-pyrrolidone). This homopolymer sample of N-vinyl-2-pyrrolidone was prepared in accordance with the inventive polymerization procedure described previously herein, i.e., polyermization of N-vinyl-2-pyrrolidone (VP) in synthetic seawater (0.7 ionic strength) initiated by azobisisobutyronitrile (AIBN).

A charge of 20.0 g N-vinyl-2-pyrrolidone was placed in a 10-ounce crown top polymerization bottle with 0.10 g azobisisobutyronitrile (AIBN) initiator and a 200 g portion of synthetic seawater. The initiator level was 0.5 wt. % AIBN, based on the weight of monomers charged. A stock solution of the synthetic sea water was prepared by dissolving the approximate amounts of the specified electrolytes in sufficient deionized water to prepare 18 liters of solution:

| Electrolyte | Approximate Wt. Electrolyte (g) | Approximate Electrolyte Concentration (g/liter) |
|---|---|---|
| $NaHCO_3$ | 3.7 | 0.2 |
| $Na_2SO_4$ | 77.2 | 4.3 |
| NaCl | 429 | 23.8 |
| $CaCl_2.2H_2O$ | 29.6 | 1.6 |
| $MgCl_2.6H_2O$ | 193.9 | 10.8 |

The ionic strength of the synthetic seawater was about 0.7. The reaction mixture was degassed for 20 minutes before the polymerization vessel was placed in a 50° C. constant temperature water bath. The polymerization reaction vessel was secured in a rack and rotated continuously for 25 hours at 50° C. At the end of the reaction period, the reaction mass was homogeneous and mobile, and very viscous.

A suitable experimental sample for viscosity measurements was prepared by combining a 100 g portion of the polymerization reaction mass with 400 g of synthetic seawater. This dilution gave a mixture which was about 1.8 wt. percent polymer. Before combining the polymer sample with the synthetic seawater, the latter was purged with $N_2$ in a dry box for 2 hours. The oxygen content of the synthetic seawater after the $N_2$ purge was abour 5 ppb (parts per billion). After mixing the polymer sample and synthetic sea water, the solution was further purged with $N_2$ for 3 hours in a dry box before any solution viscosities were determined. A similar solution of a commercially available poly(N-vinyl-2-pyrrolidone) (GAF K-100) was also prepared for viscosity measurements for comparison.

The respective solutions of experimental and commercial poly(N-vinyl-2-pyrrolidone) polymers were aged at 200 F. and 250 F. to determine the effect of thermal aging on solution viscosities. After a specified aging period, individual sample solutions were cooled to ambient temperature before measuring Brookfield viscosity at the designated rpm. Results are summarized in Table XVII. The initial viscosity of the experimental solution was 16.1 cp at 6 rpm, whereas the initial viscosity of the commercial polymer solution was about 13.1 cp at 5 rpm.

TABLE XVII

Viscosities of PVP* Solutions After Thermal Aging

| Type of Run | Aging Period (Days) @ 200 F. | Viscosity (cP) | % Initial Viscosity Lost (200 F.) | Aging Period (Days) @ 250 F. | Viscosity (cP) | % Initial Viscosity Lost (250 F.) |
| --- | --- | --- | --- | --- | --- | --- |
| Control | 0 | 13.1 | 0.0 | 0 | 13.1 | 0.0 |
| (Commercial K-100 PVP) | 6 | 10.4 | 20.6 | 6 | 9.2 | 29.8 |
|  | 19 | 9.2 | 29.8 | 19 | 11.8 | 9.9 |
|  | 41 | 7.9 | 39.7 | 40 | 10.5 | 19.8 |
|  | 118 | 9.2 | 29.8 | 118 | 9.2 | 29.8 |
| Invention | 0 | 16.1 | 0.0 | 0 | 16.1 | 0.0 |
| (Experimental PVP) | 21 | 14.2 | 11.8 | 21 | 13.8 | 14.3 |
|  | 48 | 14.0 | 13.0 | 48 | 13.6 | 15.5 |
|  | 95 | 13.5 | 16.1 | 95 | 13.2 | 18.0 |
|  | 139 | 13.8 | 14.3 | 129 | 13.5 | 16.1 |
|  | 245 | 13.7 | 14.9 | 245 | 13.6 | 15.5 |

*PVP represents poly(N—vinyl-2-pyrrolidone).

Figure 11:
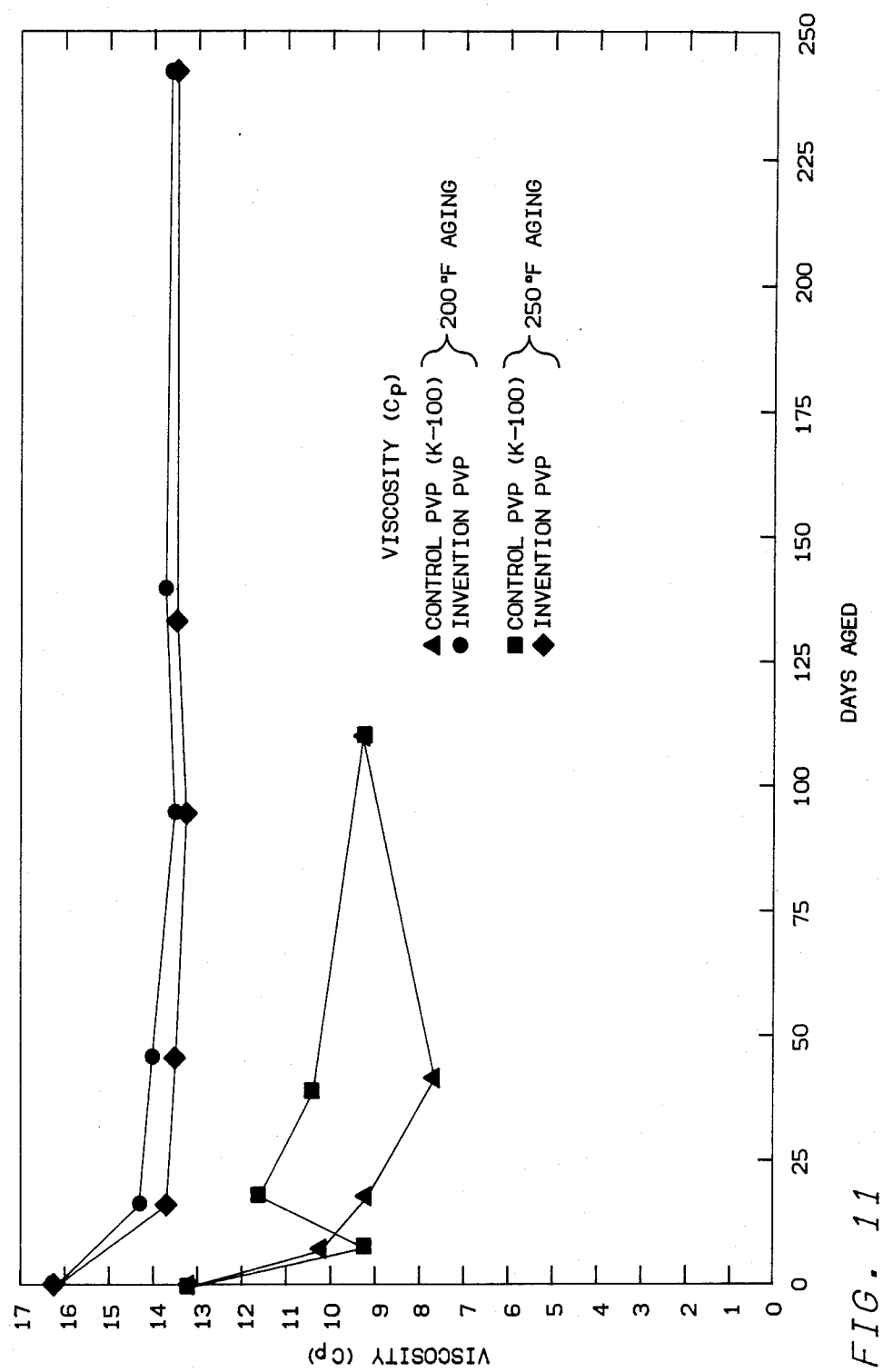
FIG. 11 illustrates the viscosity of homopolymers of this invention which are subjected to heat aging.

Referring to the results in Table XVII, it is evident that the initial viscosity of the experimental polymer solution was not only higher than that of the control run (16.1 centipoise vs. 13.1 centipoise) but on thermal aging at either 200 F. or 250 F., the experimental polymer solution exhibited a lower percentage loss of the initially observed solution viscosity than did the commercially available polymer solution. See FIG. 11, in which the viscosities of these samples are plotted versus aging time. It is noteworthy that the control system solution viscosity aged at either 200 F. or at 250 F. had diminished by about 30 percent of the initial viscosity in a time period of 118 days, whereas the solution viscosity of the experimental system even on aging for 245 days at either 200 F. or 250 F. had diminished by only about 15 percent of the initial viscosity.

EXAMPLE XII

PVP Viscosities

N-Vinyl-2-pyrrolidone was polymerized in synthetic seawater at three initiator levels of AIBN in a procedure essentially the same as described in Example XI. A control run was carried out involving the polymerization of N-vinyl-2-pyrrolidone in distilled water. Samples of the poly(N-vinyl-2-pyrrolidone) polymers as 2 wt. percent solutions in synthetic sea water were used in Brookfield viscosity determinations and the results are summarized in Table XVIII.

TABLE XVIII

Solution Viscosities of PVP Samples

| Run No. | AIBN Initiator Level (wt %) | Type of Run | Viscosity (cP) | Polymerization Medium |
| --- | --- | --- | --- | --- |
| 1 | 1.0 | Control | 9.0 | Distilled H₂O |
| 2 | 1.0 | Invention | 18.5 | SSW* |
| 3 | 0.5 | Invention | 23.4 | SSW* |
| 4 | 0.25 | Invention | 25.8 | SSW* |

*The preparation of the synthetic sea water is given in Example XI.

Referring to the results in Table XVIII (see runs 1 and 2), it is evident that the solution viscosity of the poly(N-vinyl-2-pyrrolidone) prepared in synthetic seawater with 1.0 percent AIBN initiator was approximately twice that observed for the PVP similarly prepared in distilled water. Runs 3 and 4 illustrate that greater solution viscosities for the inventive poly(N-vinyl-2-pyrrolidone) samples resulted on the use of lower levels of AIBN initiator, presumably because of the higher molecular weights obtained in runs 3 and 4 relative to the molecular weight obtained in run 1. (This effect has been noted previously in other examples and in the detailed description.)

EXAMPLE XIII

In Situ Polymerization for Permeability Correction

This example describes the in situ copolymerization of N-vinyl-2-pyrrolidone and acrylamide to effect a permeability correction in a high salinity, high temperature oil-bearing subterranean formation. Suitable ratios of monomers, for example, N-vinyl-2-pyrrolidone and acrylamide, vary over the broad range as disclosed earlier herein. In the following calculated example, the weight ratio of N-vinyl-2-pyrrolidone (VP) to acrylamide (Am) is 60:40, which corresponds to about 1 mole of VP to 1 mole of Am.

Calculated Example

Two pore volumes (based upon the intended area of treatment) of a one weight percent aqueous solution of sodium-1-naphthylamine-4-sulfonate polymerization inhibitor is introduced through an injection well into an exhaustively waterflooded, oil-bearing subterranean formation with a reservoir temperature in the range of about 250 F. and a connate water salinity on the order of 200,000 ppm total dissolved solids containing up to 60,000 ppm or higher of divalent cations such as $Ca^{++}$ and $Mg^{++}$. Said formation has been subjected to secondary waterflooding prior to injection of the polymerization inhibitor to such an extent that the injected water is channeling through the high permeability zones and the water to oil ratio at the producing wells is very high, e.g. greater than about 100:1.

After all of the polymerization inhibitor slug has been introduced, a 0.5 pore volume slug of predominantly aqueous sodium chloride containing about 15000 ppm total dissolved solids is used to flush the previously injected polymerization inhibitor from the more permeable zones without completely removing same from the less permeable zones.

An in situ copolymerization treatment slug comprising about 90 weight percent saline water based on total weight of the slug, admixed with an equimolar mixture of N-vinyl-2-pyrrolidone (VP) and acrylamide (Am) (60 parts by weight VP and 40 parts by weight Am), and 0.5 weight percent AIBN (azobisisobutyronitrile or other suitable initiator; based on total weight of monomers) is injected following the flushing of the polymerization inhibitor from the high permeability zones. The saline water used in preparing the in situ copolymerization treatment slug can be any available water compatible with the formation, but is preferably characterized by an ionic strength of about 0.7 and contains a mixture of electrolytes such as, e.g., $NaHCO_3$, $NaCl$, $CaCl_2$, Na$_2$SO$_4$, and MgCl$_2$. The in situ copolymerization is allowed to progress undisturbed for a period of approximately 24 hours.

At the end of 24 hours, a tertiary oil recovery surfactant flood is carried out, e.g., in a manner as described in U.S. 4,343,711. Oil recovery is increased as evidenced by a lower water to oil ratio at the producing wells.

EXAMPLE XIV

Preparation of Terpolymers

As previously disclosed, this invention encompasses terpolymer compositions. Specific terpolymers prepared and tested can be described by the formula VP/Am/X, wherein VP represents N-vinyl-2-pyrrolidone derived units as an N-vinyl lactam, Am represents acrylamide derived units as an unsaturated amide, and termonomer X represents units derived from various monomers such as methyl methacrylate (MMA), methyl acrylate (MA), butyl acrylate (BA), hydroxyethyl acrylate (HEA), lauryl methacrylate (LMA), acrylonitrile (AN), vinyl acetate (VA), styrene (STY), 4-vinyl pyridine (4-VPy), 5-methyl-2-vinylpyridine (MVPy), and mixtures thereof. The chemically-initiated preparations of representative terpolymers in various polymerization media are described hereinbelow.

(A)

Deionized Water Polymerization Medium (Control)

A charge of 27.9 g N-vinyl-2-pyrrolidone (VP), 27.9 g acrylamide (Am) and 4.2 g methyl methacrylate (MMA) was placed in a one quart crown top beverage bottle together with 600 g deionized water and 0.08 g azabisisobutyronitrile initiator (AIBN, 0.13 wt. percent based on total weight of charged monomers). Reaction mixtures were routinely degassed for 20 to 30 minutes before sealing. The charged bottle was rotated for about 16 hours in a constant temperature bath at 50° C. On removing the bottle from the bath and cooling to room temperature, the instant product mixture appeared to be a viscous fluid somewhat cloudy and whitish in color. This procedure yielded a 46.5:46.5:7.0 weight percent VP/Am/MMA terpolymer.

Table XIX (below) discloses a variety of VP/Am/MMA terpolymers prepared in deionized water.

TABLE XIX

| Run | Deionized Water Polymerization Medium | | |
|---|---|---|---|
| | Wt % VP | Wt % Am | Wt % MMA |
| 1 | ca. 49.88 | ca. 49.88 | 0.25 |
| 2 | 49.75 | 49.75 | 0.50 |
| 3 | 49.5 | 49.5 | 1.00 |
| 4 | 49.0 | 49.0 | 2.00 |
| 5 | 48.5 | 48.5 | 3.00 |
| 6 | 47.5 | 47.5 | 5.00 |
| 7 | 46.5 | 46.5 | 7.00 |
| 8 | 45.0 | 45.0 | 10.00 |

*Initiator was 0.13 wt. percent AIBN based on total monomers charged

(B)

Synthetic Sea Water Polymerization Medium (Invention)

The preparative procedure was essentially the same as that described in (A) except for the use of synthetic seawater (SSW) as the polymerization medium. The composition and preparation of the synthetic seawater is described hereinabove.

For example, the following charge was placed in a 10 oz. crown top reactor bottle to prepare a 48.5:48.5:3.0 weight percent VP/Am/MMA terpolymer:
 9.7 g N-vinyl-2-pyrrolidone (VP)
 9.7 g Acrylamide (Am)
 0.6 g Methyl Methacrylate (MMA)
 0.025 g Azobisisobutyronitrile (AIBN, 0.125 wt.percent)
 200 g Synthetic Seawater (SSW)

Table XX (below) discloses a variety of VP/Am/MMA terpolymers prepared in synthetic seawater.

TABLE XX

| Synthetic Seawater Polymerization Medium (0.7 ionic strength) | | | | |
|---|---|---|---|---|
| Run No. | Wt % VP | Wt % Am | Wt % MMA | Wt % AIBN[a] |
| 9 | 49.5 | 49.5 | 1.0 | 0.125 |
| 10 | 47.5 | 47.5 | 5.0 | 0.125 |
| 11 | 49.5 | 49.5 | 1.0 | 0.250 |
| 12 | 48.5 | 48.5 | 3.0 | 0.250 |
| 13 | 48.0 | 48.0 | 4.0 | 0.250 |
| 14 | 47.5 | 47.5 | 5.0 | 0.250 |
| 15 | 47.0 | 47.0 | 6.0 | 0.250 |
| 16 | 49.5 | 49.5 | 1.0 | 0.50 |
| 17 | 48.5 | 48.5 | 3.0 | 0.50 |
| 18 | 48.0 | 48.0 | 4.0 | 0.50 |
| 19 | 47.5 | 47.5 | 5.0 | 0.50 |
| 20 | 47.0 | 47.0 | 6.0 | 0.50 |

[a] Azobisisobutyronitrile initiator (AIBN, wt percent based on total monomers charged).

(C)

Sodium Chloride Solution Polymerization Medium (Control)

(0.7 ionic strength)

The preparative procedure was essentially the same as that described in (A) except for the use of aqueous sodium chloride solution as the polymerization medium. The 1.5 liter batches of 0.7 ionic strength salt stock solution were prepared by dissolving 61.36 g NaCl in 1440 mL of deionized water.

For example, the following charge was placed in a one quart crown top reactor bottle to prepare a 48.5:48.5:3.0 weight percent VP/Am/MMA terpolymer:
 29.1 g N-vinyl-2-pyrrolidone (VP)
 29.1 g Acrylamide (Am)
 1.8 g Methyl Methacrylate (MMA)
 0.08 g Azobisisobutyronitrile (AIBN, 0.130 wt. percent)
 600 g Sodium Chloride Solution (0.7 ionic strength)

Table XXI (below) discloses a variety of VP/Am/MMA terpolymers prepared in 0.7 ionic strength aqueous sodium chloride solution.

Table XXII (below) discloses additional terpolymers prepared in 0.7 ionic strength aqueous sodium chloride solution.

TABLE XXI

| Aqueous NaCl Polymerization Medium (0.7 ionic strength) | | | |
|---|---|---|---|
| Run[a,b] | Wt % VP | Wt % Am | Wt % MMA |
| 21 | ca. 49.88 | ca. 49.88 | 0.25 |
| 22 | 49.75 | 49.75 | 0.50 |
| 23 | 49.5 | 49.5 | 1.00 |
| 24 | 49.0 | 49.0 | 2.00 |
| 25 | 48.5 | 48.5 | 3.00 |
| 26 | 47.5 | 47.5 | 5.00 |
| 27 | 46.5 | 46.5 | 7.00 |
| 28 | 45.0 | 45.0 | 10.00 |

TABLE XXI-continued

Aqueous NaCl Polymerization Medium (0.7 ionic strength)

| Run[a,b] | Wt % VP | Wt % Am | Wt % MMA |
|---|---|---|---|
| 29 | 49.5 | 49.5 | 1.00 |

[a]Initiator was 0.13 wt. percent AIBN based on total monomers charged (Runs 21-28).
[b]Initiator was 0.125 wt percent AIBN based on total monomers charged (Run 29).

TABLE XXII

Terpolymers Prepared in
Aqueous NaCl Solution (0.7 ionic strength)

| Run | Wt % VP | Wt % Am | Termonomers[a,c] |
|---|---|---|---|
| 41 | 49.5 | 49.5 | Methyl Acrylate (MA) |
| 42 | 49.5 | 49.5 | Butyl Acrylate (BA) |
| 43 | 49.5 | 49.5 | Hydroxyethyl Acrylate (HEA) |
| 44 | 49.5 | 49.5 | Lauryl Methacrylate (LMA) |
| 45 | 49.5 | 49.5 | Acrylonitrile (AN) |
| 46 | 49.5 | 49.5 | Vinyl Acetate (VA) |
| 47 | 49.5 | 49.5 | Styrene (STY) |
| 48 | 49.5 | 49.5 | 4-Vinyl Pyridine (4-VPy) |
| 49 | 49.5 | 49.5 | 5-Methyl-2-Vinyl Pyridine (MVPy) |
| 50 | 49.5 | 49.5 | Mixture (MMA + VA)[b] |

[a]The termonomer was present in 1.00 wt percent based on total weight of monomers charged.
[b]0.5 wt. percent methyl methacrylate + 0.5 wt percent vinyl acetate based on total weight of monomers charged
[c]0.130 wt. percent AIBN initiator

(D)

Tertiary-Butyl Alcohol Polymerization Medium
(Invention)

The preparative procedure was essentially the same as that described in (A) except for the use of tert-butyl alcohol as the polymerization medium and the use of tert-butyl peroxypivalate as the initiator. Terpolymer products were precipitated by dilution of the reaction mixture with hexane and removed by suction filtration.

In a typical run, e.g., the following charge was placed in a 10 oz crown top reactor bottle to prepare a 47.5:47.5:5.0 weight percent VP/Am/MMA terpolymer:

9.5 g N-vinyl-2-pyrrolidone (VP)
.9.5 g Acrylamide (Am)
1.0 g Methyl Methacrylate (MMA)
0.025 g Tert-butyl peroxypivalate (0.125 wt percent)
200 mL Tert-butyl alcohol At the end of a 27 hour reaction period, the reaction mixture was poured into stirring hexane to precipitate the terpolymer product. The product was isolated by suction filtration and dried in vacuo (20.45 g, ca. quantitative).

Tables XXIII and XXIV (below) disclose a variety of VP/Am/MMA terpolymers prepared in tert-butyl alcohol.

TABLE XXIII

Tertiary-Butyl Alcohol Polymerization Medium

| Run No. | Wt % VP | Wt % Am | Wt % MMA | Wt % I[a] |
|---|---|---|---|---|
| 30 | 47.5 | 47.5 | 5.0 | 0.125 |
| 31 | 45.0 | 45.0 | 10.0 | 0.125 |
| 32 | 47.5 | 47.5 | 5.0 | 0.250 |
| 33 | 45.0 | 45.0 | 10.0 | 0.250 |
| 34 | 47.5 | 47.5 | 5.0 | 0.50 |
| 35 | 45.0 | 45.0 | 10.0 | 0.50 |
| 36 | 65.0 | 30.0 | 5.0 | 0.50 |
| 37 | 65.0 | 25.0 | 10.0 | 0.50 |
| 38 | 47.5 | 47.5 | 5.0 | 0.50 |
| 39 | 30.0 | 65.0 | 5.0 | 0.50 |
| 40 | 25.0 | 65.0 | 10.0 | 0.50 |

[a]Initiator was t-butyl peroxypivalate (Wt percent based on total weight of charged monomers).

TABLE XXIV

Terpolymerization[a] Using Styrene, Vinyl Acetate And Lauryl Methacrylate Termonomers

| Run No. | Wt % VP | Wt % Am | Termonomer b,c,d | Wt % I[e] |
|---|---|---|---|---|
| 51 | 65.0 | 30.0 | 5.0 | 0.50 |
| 52 | 65.0 | 20.0 | 10.0 | 0.50 |
| 53 | 30.0 | 65.0 | 5.0 | 0.50 |
| 54 | 25.0 | 65.0 | 10.0 | 0.50 |
| 55 | 47.5 | 47.5 | 5.0 | 0.50 |
| 56 | 45.0 | 45.0 | 10.0 | 0.50 |
| 57 | 47.5 | 47.5 | 5.0 | 0.25 |
| 58 | 45.0 | 45.0 | 10.0 | 0.25 |
| 59 | 47.5 | 47.5 | 5.0 | 0.25 |
| 60 | 47.5 | 47.5 | 5.0 | 0.125 |
| 61 | 48.75 | 48.75 | 2.5 | 0.50 |

[a]Tert-butyl alcohol was the polymerization medium.
[b]Termonomer was vinyl acetate (Runs 51-58).
[c]Termonomer was styrene (Runs 59, 60).
[d]Termonomer was lauryl methacrylate(Runs 61-64).
[e]Wt. percent t-butyl peroxypivalate initiator (based on total monomers)

The following examples demonstrate the thermal stability of various terpolymer compositions (see Example XIV) in synthetic seawater at elevated temperatures. Solution Brookfield viscosities were measured in the thermal aging tests and retention of solution viscosity was taken as a manifestation of terpolymer stability under the test conditions. Selected data are tabulated hereinbelow.

EXAMPLE XV

Thermal Aging of Terpolymers

Test samples, e.g., of VP/Am/MMA terpolymer solutions were prepared by combining sufficient terpolymer with synthetic seawater (SSW; 0.7 ionic strength) to give a 0.5 wt. percent (5000 ppm) solution of the terpolymer (active basis). The test solution was purged of oxygen by inert gas entrainment before running the thermal aging tests. Aging tests were routinely carried out by incubating sealed samples at 200 F., 250 F. and 300 F. for specified time periods. After cooling the samples, Brookfield viscosities of the thermally aged samples were determined at 77 F. to determine viscosity retention of the solution after subjection to elevated temperatures in the presence of electrolytes. The results are shown in Table XXV.

All of the tests shown in Table XXV involved the use of terpolymers prepared in synthetic seawater with an initiator level of 0.5 wt percent AIBN (based on total monomers).

TABLE XXV

| Aging Period (Days) | 200 F. Aging Viscosity (cP) | 250 F. Aging Viscosity (cP) | 300 F. Aging Viscosity (cP) |
|---|---|---|---|
| Thermal Aging of 47.5/47.5/5.00 Weight Percent VP/Am/MMA Terpolymer | | | |
| 0 days | 7.5 | 7.5 | 7.5 |
| 22 days | 9.0 | 8.7 | 8.5 |
| 56 days | 9.7 | 7.7 | 5.6 |
| 112 days | 9.4 | 8.0 | 6.4 |
| 190 days | 9.3 | 8.3 | 4.5 |
| Thermal Aging of 48.5/48.5/3.0 Weight Percent VP/Am/MMA Terpolymer | | | |

TABLE XXV-continued

| Aging Period (Days) | 200 F. Aging Viscosity (cP) | 250 F. Aging Viscosity (cP) | 300 F. Aging Viscosity (cP) |
|---|---|---|---|
| 0 days | 9.0 | 9.0 | 9.0 |
| 12 days | 11.7 | 11.4 | 7.1 |
| 42 days | 12.5 | 11.0 | 5.1 |
| 68 days | 11.4 | 10.3 | 7.0 |
| 118 days | 12.4 | 10.2 | 7.5 |
| Thermal Aging of 49.5/49.5/1.00 Weight Percent VP/Am/MMA Terpolymer | | | |
| 0 days | 10.3 | 10.3 | 10.3 |
| 17 days | 14.1 | 12.6 | 7.1 |
| 57 days | 14.2 | 12.6 | 6.2 |
| 83 days | 14.0 | 12.0 | 7.9 |
| 133 days | 13.9 | 12.4 | 8.1 |

Referring to the results in Table XXV, it is evident that good retention of solution viscosity was noted in all three terpolymer compositions after aging at 200 F. and 250 F. Attention is called to the fact that the terpolymers containing 1 wt percent and 3 wt percent methyl methacrylate (MMA) retained a greater percentage of the initial solution viscosity in the 300 F. tests than did the terpolymer containing 5 wt. percent MMA, viz., 79 percent viscosity retention and about 83 percent viscosity retention compared to 60 percent viscosity retention.

EXAMPLE XVI

Thermal Aging of Terpolymers

All of the tests shown in Table XXVI involved the use of terpolymers prepared in synthetic seawater with an initiator level of 0.125 wt. percent AIBN (based on total monomers). Test samples were 0.5 weight percent terpolymer in synthetic seawater for viscosity measurements taken at 77 F. after aging at the indicated elevated temperature.

TABLE XXVI

| Aging Period (Days) | 200 F. Aging Viscosity (cP) | 250 F. Aging Viscosity (cP) | 300 F. Aging Viscosity (cP) |
|---|---|---|---|
| Thermal Aging of 47.5/47.5/5.0 Weight Percent VP/Am/MMA Terpolymer | | | |
| 0 | 12.1 | 12.1 | 12.1 |
| 13 | 15.6 | 15.6 | 12.0 |
| 41 | 17.1 | 11.3 | 6.5 |
| 101 | 16.9 | 13.5 | 6.7 |
| 147 | 9.7 | 13.2 | 7.7 |
| Thermal Aging of 48.5/48.5/3.0 Weight Percent VP/Am/MMA Terpolymer | | | |
| 0 | 13.8 | 13.8 | 13.8 |
| 18 | 17.6 | 16.7 | 9.9 |
| 46 | 19.6 | 16.3 | 9.0 |
| 105 | 19.6 | 15.1 | 9.3 |
| 148 | 19.0 | 15.8 | 8.2 |
| Thermal Aging of 49.5/49.5/1.00 weight percent VP/Am/MMA Terpolymer | | | |
| 0 | 14.2 | 14.2 | 14.2 |
| 15 | 20.0 | 17.5 | 4.6 |
| 47 | 17.3 | 17.5 | 12.4 |
| 106 | 21.2 | 18.5 | 7.8 |
| 149 | 16.5 | 14.4 — | 10.2 |

Referring to the results in Table XXVI, it is evident that the initial solution viscosity values for the three terpolymers (12.1; 13.8; 14.2) are significantly greater than the corresponding values in Table XXV (7.5; 9.0; 10.3). Presumably, this is due to the higher average molecular weights of the Table XXVI terpolymers, which can be attributed to lower levels of initiator, viz., 0.125 wt. percent AIBN compared to 0.50 wt. percent AIBN. It is evident that the solution sample containing 1 wt. percent methyl methacrylate terpolymer retained a greater percentage of the initial solution viscosity in the 300 F. tests than did the terpolymers containing 3 wt. percent and 5 wt. percent MMA, viz., about 72 percent viscosity retention compared to about 59 percent viscosity retention and about 65 percent viscosity retention. The viscosity of 9.7 obtained upon aging the 5 wt. percent MMA terpolymer for 147 days at 200 F. appears lower than would be expected, probably due to weighing error or other operator error.

In general, it is believed that the apparent fluctuations of solution viscosities noted throughout the thermal aging tests are related to the extent of the percent hydrolysis of pendant —$CONH_2$ groups, since it is well known that the viscosifying effectiveness of polyacrylamides passes through a maximum as a function of the degree of hydrolysis of amide moieties along the polymer backbone. The variously structured terpolymers could well vary in their inherent tendency to undergo hydrolysis of pendant amide groups along the polymer backbone.

EXAMPLE XVII

Terpolymer Cloud Point Temperatures

This example discloses cloud point determinations of terpolymer compositions prepared as hereinbefore described in Examples XV and XVI which had been aged in synthetic seawater at temperatures in the range of 200-300 F. Results are summarized in Table XXVII.

TABLE XXVII

| Cloud Point Determinations on VP/Am/MMA Terpolymer Prepared in Synthetic Seawater | | | |
|---|---|---|---|
| Thermal Aging | Cloud Points °F. (After Aging) | | |
| Days @ F. | 1% MMA | 3% MMA | 5% MMA |
| 157 @ 300 F.[a] | | | 275.6 |
| 160 @ 300 F. | 300.7 | 289 | |
| 182 @ 300 F. | 297.6 | | 282.0 |
| 186 @ 300 F. | | 293.6 | |
| 202 @ 300 F. | >298 | | |
| 214 @ 300 F. | | 295.6 | |
| 181 @ 250 F.[a] | 254.4 | | |
| 186 @ 250 F. | | 239.0 | |
| 202 @ 250 F. | 255.8 | | |
| 214 @ 250 F. | | 239.8 | |
| 181 @ 200 F.[a] | 253.5 | | |
| 202 @ 200 F. | 282.1 | | |
| 51 @ 300 F.[b] | | | 243.5 |
| 66 @ 300 F. | | 262.2 | |
| 76 @ 300 F. | | | 258.6 |
| 79 @ 300 F. | 285.6 | | |
| 84 @ 300 F. | 273.5 | | |
| 98 @ 300 F. | 288.8 | | |
| 113 @ 300 F. | 289.3 | | |
| 113 @ 250 F.[b] | 255.9 | | |
| 112 @ 200 F.[b] | >300 | | |

[a]Azobisisobutyronitrile initiator level was 0.125 wt. percent
[b]Azobisisobutyronitrile initiator level was 0.5 wt. percent Referring to the results in Table XXVII, it is evident that the terpolymers containing 1 wt. percent MMA and 3 wt. percent MMA exhibit somewhat higher cloud points under comparable conditions than terpolymers containing 5 wt. percent MMA. This observation was apparent for terpolymerization initiated by 0.125 wt. percent AIBN or 0.50 wt. percent AIBN.

EXAMPLE XVIII

Stability of Thermally Aged Terpolymers

This example demonstrates the thermal stability of terpolymer compositions containing varying amounts of methyl methacrylate (MMA), the balance being equal weights of acrylamide (Am) and N-vinyl-2-pyrrolidone (VP). Solution viscosities were determined at different temperatures by capillary viscometry as is well known in the art. In general, 0.25 weight percent solutions of the terpolymers were aged at 300 F. for seven days before viscosities were determined. Two terpolymers were studied: (1) a VP/Am/MMA polymer (49.5 wt% VP, 49.5 wt% Am, 1.0 wt% MMA) prepared in synthetic seawater with an AIBN level of 0.125 wt. percent based on total monomers charged, and (2) a VP/Am/MMA terpolymer (47.5 wt% VP, 47.5 wt% Am, 5.0 wt% MMA) prepared in synthetic seawater with an AIBN level of 0.13 wt percent. Results are summarized in Table XXVIII.

TABLE XXVIII

Capillary Viscometer Results on Aged VP/Am/MMA Terpolymers

| Approximate Temp. F.$^a$ | 1% MMA$^b$ | 5% MMA$^b$ |
|---|---|---|
| 105 | 4.00 | 3.27 |
| 130 | 3.02 | 2.32 |
| 155 | 2.01 | 1.69 |
| 185 | 1.34 | 1.19 |
| 205 | 0.92 | 0.85 |
| 230 | 0.61 | 0.61 |
| 255 | 0.42 | 0.43 |
| 280 | 0.31 | 0.34 |
| 305 | 0.25 | 0.26 |

$^a$Temperature of viscosity measurement.
$^b$Terpolymerization was carried out in synthetic seawater.

Referring to the results in Table XXVIII, it is evident that the MMA level can be as high as at least 5 weight percent without adversely affecting solution viscosity or thermal stability of the terpolymer systems. In the temperature range of 105 F. to 205 F., the viscosity of the terpolymer system containing 1 wt percent MMA was slightly higher than that of the 5 wt percent MMA system.

EXAMPLE XIX

Thermal Stability of Unaged Terpolymers

This example compares the thermal stability of 0.25 weight percent solutions of unaged VP/Am/MMA terpolymers (49.5/49.5/1.00 weight percent) as evidenced by solution viscosities determined by capillary viscometry. One of the terpolymers was prepared in deionized water whereas the other terpolymer was prepared in synthetic seawater. Results are summarized in Table XXIX.

TABLE XXIX

Solution Viscosities of VP/Am/MMA Terpolymers by Programmed Capillary Viscometry

| Approximate Temp. F.$^c$ | Viscosity (cP) | |
|---|---|---|
| | 1% MMA$^a$ | 1% MMA$^b$ |
| 105 | 3.65 | 2.62 |
| 130 | 2.81 | 1.95 |
| 155 | 1.99 | 1.48 |
| 185 | 1.48 | 1.07 |
| 205 | 1.10 | 0.93 |
| 230 | 0.92 | 0.76 |
| 255 | 0.69 | 0.61 |
| 280 | 0.57 | 0.50 |
| 305 | 0.46 | 0.44 |

$^a$Prepared in synthetic seawater
$^b$Prepared in deionized water
$^c$Temperature of viscosity measurement Referring to the results in Table XXIX, it is evident that the viscosities in the polymer system containing the terpolymer prepared in synthetic seawater are somewhat higher than the viscosities observed in the system containing the terpolymer prepared in deionized water.

EXAMPLE XX

Viscosities of Solutions Containing VP/Am/X Terpolymers by programmed Capillary Viscometry This example discloses temperature-programmed capillary viscometer results on 0.25 weight percent solutions of control terpolymers consisting of N-vinyl-2-pyrrolidone (VP) and acrylamide (Am) and a third termonomer X (1 wt percent) selected from the group of methyl acrylate (MA), butyl acrylate (BA), hydroxyethyl acrylate (HEA), lauryl methacrylate (LMA), acrylonitrile (AN), vinyl acetate (VA), styrene (STY), 4-vinylpyridine (4-VPy), 5-methyl-2-vinyl pyridine (MVPy) and mixtures thereof. Solutions were aged for 7 days at 300 F. before carrying out the capillary viscosity measurements. Results are summarized in Table XXX. The terpolymers were prepared in 0.7 ionic strength aqueous sodium chloride solution initiated by 0.25 wt percent AIBN (based on total monomers) . Although not prepared in polymerization media comprising mixed salts or synthetic sea water, as preferred for the inventive polymers, the properties of these terpolymers are expected to reflect the influence of the different termonomers used. The properties of terpolymers prepared in preferred media, e.g. SSW, should be similarly affected by the type and amount of termonomer used. Each terpolymer resulted from a reactor charge of 49.5 wt percent VP, 49.5 wt percent Am and 1.0 wt percent of the termonomer designated in Table XXX.

TABLE XXX

Solution Viscosities of Aged Terpolymers VP/Am/X*

| Approximate Temp. F$^k$ | Viscosity (cP) | | | | | | | | | |
|---|---|---|---|---|---|---|---|---|---|---|
| | (MA)$^a$ | (BA)$^b$ | (HEA)$^c$ | (LMA)$^d$ | (AN)$^e$ | (VA)$^f$ | (STY)$^g$ | (4-VPy)$^h$ | (MVPy)$^i$ | T$^j$ |
| 85 | 3.57 | 3.44 | 1.67 | 1.3 | 3.13 | 1.05 | 3.75 | 4.2 | 4.3 | 3.30 |
| 145 | 1.62 | 1.57 | 0.81 | 0.61 | 1.82 | 0.7 | 2.0 | 2.65 | 2.0 | 1.97 |
| 180 | 0.79 | 0.99 | 0.61 | 0.56 | 1.10 | 0.44 | 1.09 | 1.49 | 1.25 | 1.31 |
| 225 | 0.47 | 0.64 | 0.40 | 0.40 | 0.60 | 0.32 | 0.58 | 0.65 | 0.7 | 0.55 |
| 250 | 0.31 | 0.43 | 0.38 | 0.37 | 0.42 | 0.26 | 0.38 | 0.50 | 0.48 | 0.40 |
| 275 | 0.21 | 0.40 | 0.3 | 0.32 | 0.27 | 0.23 | 0.25 | 0.34 | 0.33 | 0.30 |

TABLE XXX-continued

Solution Viscosities of Aged Terpolymers VP/Am/X*

| Approximate Temp. F[k] | (MA)[a] | (BA)[b] | (HEA)[c] | (LMA)[d] | (AN)[e] | (VA)[f] | (STY)[g] | (4-VPy)[h] | (MVPy)[i] | T[j] |
|---|---|---|---|---|---|---|---|---|---|---|
| | | | | Viscosity (cP) | | | | | | |
| 300 | 0.37 | 0.60 | NM** | NM** | 0.26 | 0.22 | 0.19 | 0.24 | 0.21 | 0.26 |

*X represents termonomer as defined in footnotes a through j.
[a]MA represents methyl acrylate
[b]BA represents butyl acrylate
[c]HEA represents hydroxyethyl acrylate
[d]LMA represents lauryl methacrylate
[e]AN represents acrylonitrile
[f]VA represents vinyl acetate
[g]STY represents styrene
[h]4-VPy represents 4-vinylpyridine
[i]MVPy represents 5-methyl-2-vinyl pyridine
[j]T represents a 1:1 wt/wt mixture of methyl methacrylate (MMA) and vinyl acetate (VA)
[k]Temperature of viscosity measurement
**NM represents Not Measured Referring to the results in Table XXX, it is evident that the initial viscosities of the thermally aged system containing hydroxyethyl acrylate (HEA), lauryl methacrylate (LMA), and vinyl acetate (VA) termonomers were significantly lower than systems containing the other designated termonomers. Perhaps this indicates the greater inherent tendency of the pendant moieties in these three terpolymers to hydrolyze during the 7 day thermal aging at 300 F. before measuring solution viscosities by programmed capillary viscometry. All of the systems in Table XXX showed greatly reduced viscosities at elevated temperatures, particularly at temperatures above 180 F. However, these viscosities are still considerably greater than that of synthetic sea water at comparable temperatures. At temperatures up to 250 F., higher viscosities were exhibited by systems containing pyridine-derived termonomers such as 4-vinylpyridine (4VPy) and 5-methyl-2-vinylpyridine (MVPy).

This observation perhaps is related to the fact that the pyridine moiety is probably the least readily altered grouping under the test conditions. A similar rationale may account for the less dramatic effects in the terpolymer systems derived, respectively, from VP, Am and styrene; and VP, Am and acrylonitrile (AN). In general, the test conditions appear severe enough to cause significant hydrolysis of pendant ester moieties.

On the other hand, at about 300 F., higher viscosities were obtained for systems containing either methyl acrylate (MA) or butyl acrylate (BA) than for the systems containing pyridine-derived termonomers (4-VPy, MVPy). Calculations show that between 85 F. and 300 F., the terpolymer containing MA lost 89.6 percent of its viscosity and the BA terpolymer lost 82.6 percent of its viscosity, while the terpolymers containing 4-VPy and MVPy lost 94.3 and 95.1 percent, respectively, of their viscosities.

EXAMPLE XXI

Viscosities of Unaged Terpolymers

This example discloses viscosities of unaged 0.25 weight percent solutions containing VP/Am/MMA terpolymers. Terpolymers contained methyl methacrylate (MMA) at levels of 0.25 to 10 weight percent, with the balance of the terpolymer consisting of equal weights of units derived from N-vinyl-2-pyrrolidone (VP) and acrylamide (Am). Relative viscosities as well as Brookfield viscosities are presented for the series of control terpolymer compositions prepared in 0.7 ionic strength aqueous sodium chloride solution. Brookfield viscosities are given for similar control terpolymer compositions prepared in deionized water and selected inventive terpolymers prepared in synthetic seawater. Results are summarized in Table XXXI.

TABLE XXXI

Viscosities of Unaged Terpolymer Solutions

| Wt % MMA[a] | Deionized H₂O[b] Terpolymer Viscosity (cP) | 0.7 Ionic Strength[c] Terpolymer Viscosity (cP) | Synthetic Seawater[d] Terpolymer Viscosity (cP) | 0.7 Ionic Strength[c] Terpolymer Relative Viscosity[e] |
|---|---|---|---|---|
| 0.25 | 3.6 | 5.1 | NM[i] | 1.79 |
| 0.50 | 3.9 | 5.1 | NM[i] | 1.74 |
| 1.0 | 3.8 | 5.4 | 5.3 | 1.73 |
| 2.0 | 3.7 | 5.1 | NM | 1.67 |
| 3.0 | 3.6 | 4.5 | 5.1 | 1.56 |
| 5.0[f] | 3.6 | 4.6 | 5.0 | 1.57 |
| 7.0[g] | 3.4 | 4.7 | NM[i] | 1.63 |
| 10.0[h] | 3.0 | 4.4 | NM[i] | 1.48 |

[a]Balance of terpolymer comprised equal weight proportions of VP and Am units.
[b]Terpolymer was prepared in deionized water.
[c]Terpolymer was prepared in 0.7 ionic strength aqueous sodium chloride solution.
[d]Terpolymer was prepared in synthetic seawater.
[e]Relative viscosity is calculated by dividing the time required for a solution to pass through a capillary viscometer by the time required for the solvent to pass through the same capillary viscometer.
[f]Sample contained haze or water insoluble material.
[g]Sample more hazy than that referenced in footnote e; contained a considerable amount of water insoluble material.
[h]Sample contained a white precipitate.
[i]Not measured.

Referring to the results in Table XXXI, it is evident that the viscosities of the control terpolymers prepared in the 0.7 ionic strength aqueous sodium chloride solution and the inventive terpolymers prepared in synthetic seawater were somewhat higher than the measurements for the control terpolymers prepared in deionized water. It is noteworthy that the terpolymer compositions containing less than 1 weight percent methyl methacrylate (MMA) imparted significant viscosities to water solutions of electrolytes. As noted in footnotes f, g, and h of Table XXXI, attention is called to the fact that terpolymer compositions containing more than about 5 weight percent methyl methacrylate (MMA) exhibited greatly reduced water solubilities.

EXAMPLE XXII

Radiation Polymerization in SOW

A series of VP/Am copolymers was prepared in substitute ocean water at about 80 F. (27° C.) under an argon atmosphere by irradiation with gamma rays from a cobalt 60 source having a maximum dose rate of about 5 MRad/hour. Three of the samples were 10 weight percent each Am and VP and 80 weight percent SSW (50/50 VP/Am). The remaining 20 samples were each 12 weight percent Am, 18 weight percent VP and 70 weight percent SOW. The substitute ocean water employed was made using the sea salt described in Table I at a concentration of about 4.2 weight percent, with a calculated ionic strength of about 0.8.

Each sample solution was contained in a closable polyethylene bag, the sample was degassed by bubbling argon through it to displace the air and the bag was closed. Each bag was placed into an open top paste-board box for convenience during the irradiation process and for later processing. To insure more even penetration of the gamma rays into the sample each sample was irradiated for about half of the total exposure time on each side by turning the sample 180° midway through the process. Each comonomer-SOW solution was converted into a viscous mass of water soluble copolymer (gel log) by the irradiation unless specified otherwise.

Relative viscosities of each sample were determined at 25° C. in a No. 1 Ubbelohde viscometer as 0.25 weight percent copolymer in SSW.

Inherent viscosities were determined from relative viscosities by employing the conventional relationship:

$$\text{inherent viscosity} = \frac{\ln(\text{relative viscosity})}{\text{concentration (g/dL)}}$$

K values of each sample were calculated as described in Example VIII from the relative solution viscosities. Since all viscosities herein were measured for solutions of 0.25 weight percent copolymers (equivalent to 0.25 gram/deciliter), to compare the K values computed therefrom with other K values it may be desirable to compensate for copolymer concentration. That is, as seen by the curves in FIG. 8, at concentrations of less than 0.25 g/dL the K values for the same copolymers could be expected to be higher, while at higher concentrations the K values should be lower. To estimate such K values, the values obtained at a concentration of 0.25 g/dL could be extrapolated using the slopes of the existing curves for similar copolymers.

The relative weights of the monomers and SOW employed, the total dose given each sample and corresponding dose rate employed, the percent conversion obtained, the Brookfield, inherent and relative viscosities of each copolymer prepared and the calculated K values are given in Table XXXII. Conversion of monomers to copolymers were determined in each run by either NMR and/or gravimetric practices as known in the art. Conversions ranged from 90 to 100 percent.

TABLE XXXII

| Sample No[a] | Weight Percent | | | Total Dose kRad | Dose Rate kRad/hr | Percent Conversion | Viscosities | | Calculated K Value |
|---|---|---|---|---|---|---|---|---|---|
| | AM | VP | SOW | | | | Relative | Inherent dL/g | |
| 1 | 10 | 10 | 80 | 16.0 | 18.9 | 90 | 2.31 | 3.35 | 135.9 |
| 2 | 10 | 10 | 80 | 48.0 | 18.9 | 95 | 3.40 | 4.94 | 166.6 |
| 3 | 10 | 10 | 80 | 48.0 | 33.1 | 97 | 3.22 | 4.68 | 162.6 |
| 4[b] | 12 | 18 | 70 | 107.6 | 47.7 | 96 | — | — | — |
| 5 | 12 | 18 | 70 | 48.0 | 33.0 | 90 | 3.61 | 5.13 | 170.9 |
| 6 | 12 | 18 | 70 | 48.0 | 63.8 | 96 | 3.51 | 5.02 | 168.9 |
| 7[b] | 12 | 18 | 70 | 144.0 | 63.8 | 100 | — | — | — |
| 8 | 12 | 18 | 70 | 50.0 | 958 | 90 | 3.01 | 4.41 | 157.5 |
| 9 | 12 | 18 | 70 | 50.0 | 4730 | 99 | 2.48 | 3.63 | 142.0 |
| 10 | 12 | 18 | 70 | 100.0 | 600 | 95 | 3.41 | 4.91 | 166.8 |
| 11[b] | 12 | 18 | 70 | 200.0 | 600 | 95 | — | — | — |
| 12[c] | 12 | 18 | 70 | 100.0 | 600 | 95 | 3.91 | 5.45 | 176.5 |
| 13[d][b] | 12 | 18 | 70 | 200.0 | 600 | 96 | — | — | — |

Notes:
[a]Volume size for samples 1 to 3 is 1 liter, for remainder is 2 liters.
[b]Crosslinked, sample did not completely dissolve.
[c]Initial temperature before irradiation about 480 F. (9 C.)
[d]Initial temperature before irradiation about 52 F. (110 C.)
[e]A dash signifies no determination made.

The results in Table XXXII indicate the molecular weights of the various copolymers prepared by gamma irradiation in SOW, as reflected by the inherent viscosity data, are related to concentration of the monomers, total dose given the system, the dose rate used and polymerization temperature. For the 50/50 VP/Am copolymers prepared at a total monomer concentration of 20 weight percent, the low inherent viscosity of 3.35 dL/g and K value of about 136 obtained with a total dose of 16 kRad and a dose rate of about 19 kRad/hr for sample 1 show substantially lower viscosity compared to samples 2 and 3. However, sample 2 shows an inherent viscosity of 4.94 dL/g and K value of about 167. The dose rate was the same as for example 1 but the total dose was tripled to 48 kRad. On the other hand, the inherent viscosity of 4.68 dL/g and K value of about 163 obtained with sample 3 shows that maintaining a medium total dose of about 48 kRad coupled with a higher dose rate of about 33 kRad/hr has yielded a slightly less desirable copolymer (lower viscosity) for EOR than that of sample 2.

Similarly, inspecting the conditions used and results obtained for samples 4 to 13, the 60/40 VP/Am copolymers, a similar trend is noted. For example, sample 5 shows that a medium dose rate of about 33 kRad/hr coupled with a medium total dose of 48 kRad yields a copolymer having an inherent viscosity of about 5.13 dL/g and K value of about 171. The total monomer concentration in preparing samples 4 to 13 was 30 weight percent. This concentration and/or difference in VP/Am weight ratio has apparently shifted the most desirable dose rate from about 19 kRad/hr for sample 2 to about 33 kRad/hr for sample 5.

In comparing inherent viscosities and K values of sample 6 (5.02 dL/g and 169), sample 8 (4.41 dL/g and 158) and sample 9 (3.63 dL/g and 142) with those of sample 5 (5.13 dL/g and 171), it is noted that all samples received a medium total dose of 48 to 50 kRad. However, increasing the dose rate from a medium value of about 33 kRad/hr to higher values ranging from about 64 to 4700 kRad/hr resulted in the formation of copolymers having decreasing inherent viscosities, i.e. the higher the dose rate under these conditions, the lower the polymer viscosity. The irradiation applied in the preparation of samples 4 and 7 was excessive and crosslinking was noted, e.g. insoluble or nearly insoluble polymers were made.

The effects of total dose at a high dose rate of 600 kRad/hr and polymerization temperature are shown in the results obtained for samples 10–13. The inherent viscosity of 4.91 dL/g and K value of about 167 obtained for sample 10, at total dose of 100 kRad and polymerization temperature of about 80 F., is somewhat lower than the inherent viscosity of 5.45 dL/g and K value of about 176 obtained for sample 12 at a total dose of 100 kRad and polymerization temperature of about 48 F. This suggests that the molecular weight of the copolymers can be increased by decreasing the polymerization temperature to a temperature below ambient, provided that freezing of the system is avoided. The temperature can be lowered prior to, during or after irradiation. This temperature will vary, depending upon the concentration of monomers and the nature of the polymerization medium. For the monomer concentrations and polymerization medium employed in this Example, a minimum temperature of about 20 F. can be employed. The results obtained for samples 11 and 13 indicate that the total dose of 200 kRad was excessive under the conditions employed. Thus, some crosslinking (gellation) occurred and the polymer samples did not dissolve enough to obtain meaningful viscosity values and K values.

In this Example, the results show that the copolymer having the highest inherent viscosity (5.45 dL/g) was made at 52 F. by irradiating the monomer solution to obtain a total dose of 100 kRad by employing a dose rate of 600 kRad/hr. This copolymer would be expected to provide acceptable performance in EOR. In addition, copolymers having somewhat lower inherent viscosities, e.g. 5.13 dL/g and 5.02 dL/g, were made by employing total doses and dose rates of 48 kRad and 33 kRad/hr and 48 kRad and about 64 kRad/hr. These copolymers would also be expected to perform creditably in EOR. Manipulation of total dose, dose rate, temperature and other variables can be practiced as needed to obtain polymers having the desired properties for the end uses contemplated. Polymerization is most desirably carried out in the absence of molecular oxygen. Similar selected doses/dose rates or conditions can be used for preparing these polymers in the tertiary alkanol media referred to elsewhere herein.

EXAMPLE XXIII

VP-Am Copolymers as Flocculants

Several invention copolymers and several commercially available polymers as controls were tested for efficacy as flocculating agents in Caney River (Oklahoma) water containing 250 ppm added bentonite clay of 325 mesh particle size. The river water had an initial turbidity of about 87 nephelos units. The procedures of ASTM-D 2035-80 and ASTM Standards cited therein were followed.

The inventive copolymers consisting of VP/Am weight ratios of 40/60, 30/70 and 20/80 were prepared in SSW at 49 C. in the presence of 0.5 weight percent AIBN based on the weight of the monomers. A portion of each copolymer was subsequently diluted with SSW to form a 1 weight percent solution and the Brookfield viscosities of the solutions were determined at 25 C. at 6 rpm.

Sample 1, 40/60 VP/Am, had a Brookfield viscosity of about 73 cP as determined with a U.L. spindle.

Sample 2, 30/70 VP/Am, had a Brookfield viscosity of about 157 cP as determined with a No. 1 spindle.

Sample 3, 20/80 VP/Am, had a Brookfield viscosity of about 232 cP determined with a No. 1 spindle.

In the procedure followed, each 1500 mL jar, containing 1000 mL of the water-clay mixture and 0.5 ppm of the test polymer based on the contents of the jar, was stirred for 1 minute at a flash mix speed of 105 rpm. The speed was reduced to 20 rpm and stirring continued for 20 minutes. The stirrer was withdrawn and results then determined in accordance with the ASTM procedure except for color of the water which was not recorded.

The results are set forth in Table XXXIII.

TABLE XXXIII

| Remarks | VP/Am Copolymers As Flocculating Agents | | | | | | Controls[a] | |
|---|---|---|---|---|---|---|---|---|
| | Invention | | | | | | | |
| Run No. | 1 | 2 | 3 | 4 | 5 | 6 | 7[b] | 8[c] |
| Sample Description | 40/60 VP/Am | | 30/70 VP/Am | | 20/80 VP/Am | | 1125L | 1180 |
| Initial sample pH | 7.11 | 7.11 | 7.11 | 7.11 | 7.11 | 7.06 | 7.06 | 7.06 |
| Initial turbidity, nephelos units | 87 | 87 | 87 | 87 | 87 | 87 | 86 | 86 |
| Test temp. °C. | 27.2 | 27.2 | 27.2 | 27.2 | 27.2 | 27.2 | 23.8 | 23.8 |
| Time, first floc, min. | 0.5 | 0.5 | 0.5 | 0.5 | 0.5 | 0.5 | 0.1 | 0.5 |
| Floc size | medium fine | medium fine | medium fine | medium fine | medium fine | medium fine | coarse | medium fine |
| Settling rate. min. | 5.5 | 5.5 | 5.5 | 5.5 | 5.5 | 5.5 | 0.2 | 4.0 |
| Turbidity, 15 min, settle; nephelos | 2.9 | 3.0 | 3.5 | 3.8 | 3.4 | 3.2 | 3.8 | 1.5 |
| Final sample pH | 7.15 | 7.14 | 7.21 | 7.20 | 7.27 | 7.31 | 7.69 | 6.83 |

[a]Results are averages of 2 runs
[b]Betz Poly-Floc ® 1125L, Betz Laboratories, Inc., Trevose, PA
[c]Betz Poly-Floc ® 1180

The results obtained with the inventive copolymers are comparable to those obtained with commercial flocculant, Betz Poly-Floc ® 1180. Although the tests were conducted in river water containing an unknown concentration of dissolved salts (The water is considered to be hard water based on its reaction with soap), it is expected that the inventive copolymers will serve as effective flocculating agents for processes involving the clarification of water containing suspended matter. Specific applications might be in clarification of brackish water, removal of fines in mineral processing i.e., phosphate mining, uranium or copper mining, or removal of clay from potash ores suspended in concentrated brines.

EXAMPLE XXIV

Comparative Properties of Polymers Prepared by Radiation Polymerization in SOW and H₂O A series of VP/Am copolymers was prepared in substitute ocean water at about 80 F. (27° C.) under an argon atmosphere by irradiation with gamma rays from a cobalt 60 source employing a dose rate of about 2530–2600 kRad/hour. These samples were each 18 weight percent VP, 12 weight percent Am and 70 weight percent H₂O (control) or SOW (invention) (60/40 VP/Am). The substitute ocean water employed was made using the sea salt described in Table 1 at a concentration of about 4.2 weight percent, with a calculated ionic strength of about 0.8.

Each sample solution was contained in a closable polyethylene bag, the sample was degassed by bubbling argon through it to displace the air and the bag was closed. Each bag was placed into an open top paste board box for convenience during the irradiation process and for later processing. To insure more even penetration of the gamma rays into the sample each sample was irradiated for about half of the total exposure time on each side by turning the sample 180° midway through the process. Each comonomer-SOW solution was converted into a viscous mass of water soluble copolymer (gel log) by the irradiation.

The Brookfield viscosity of each sample diluted in 0.7 Ionic Strength SSW (as described earlier herein) was determined at 25° C. at 6 rpm using a #1 spindle. The diluted sample was prepared by dissolving 16.50 g gel in 483.5 g SSW, equivalent to about 1.0 weight percent copolymer.

Relative viscosities of each sample were determined at 25° C. in a No. 1 Ubbelohde viscometer as 0.1 and 0.25 weight percent copolymer in SSW.

Inherent viscosities were determined from relative viscosities by employing the conventional relationship:

$$\text{inherent viscosity} = \frac{\ln (\text{relative viscosity})}{\text{concentration (g/dL)}}$$

K values of each sample were calculated as described in Example VIII from the relative solution viscosities. Since the relative viscosities herein were measured for solutions of 0.1 and 0.25 weight percent copolymers (equivalent to 0.1 or 0.25 gram/deciliter), to compare the K values computed therefrom with other K values it may be desirable to compensate for copolymer concentration. That is, as seen by the curves in FIG. 8, at concentrations of less than 0.25 g/dL the K values for the same copolymers could be expected to be higher, while at higher concentrations the K values should be lower. To estimate such K values, the values obtained at concentration of 0.1 or 0.25 g/dL could be extrapolated using the slopes of the existing curves for similar copolymers.

The relative weights of the monomers and SOW polymerization medium employed, the total dose given each sample and corresponding dose rate employed, the percent conversion obtained, the concentrations used for testing the Brookfield, calculated inherent and relative viscosities of each copolymer prepared and the calculated K values are given in Table XXXIV. Conversion of monomers to copolymers was determined in each run by gravimetric practices as known in the art. Conversions ranged from 95 to 100 percent.

TABLE XXXIV

| | | | | | | | | | Viscosities | | |
|---|---|---|---|---|---|---|---|---|---|---|---|
| Sample No[a] | Invention/ Control | Weight Percent | | | Total Dose kRad | Dose Rate kRad/hr | Percent Conversion | Concentration. Wt. Percent | Brookfield cP | Relative | Inherent dL/g | Calculated K Value |
| | | PV | Am | Medium[b] | | | | | | | | |
| 1 | I[d] | 18 | 12 | 70(SOW) | 100 | 2600 | 95 | 0.25 | —[c] | 3.18 | 4.63 | 161.7 |
| 2 | I | 18 | 12 | 70(SOW) | 100 | 2530 | 99.7 | 1.0 | 48 | — | — | — |
| 2 | I | 18 | 12 | 70(SOW) | 100 | 2530 | 99.7 | 0.1 | — | 1.71 | 5.19 | 171.8 |
| 2 | I | 18 | 12 | 70(SOW) | 100 | 2530 | 99.7 | 0.25 | — | 3.24 | 4.69 | 163.1 |
| 3 | C[e] | 18 | 12 | 70(H₂O) | 100 | 2530 | 100 | 1.0 | 24 | — | — | — |
| 3 | C | 18 | 12 | 70(H₂O) | 100 | 2530 | 100 | 0.1 | — | 1.60 | 4.67 | 160.3 |
| 3 | C | 18 | 12 | 70(H₂O) | 100 | 2530 | 100 | 0.25 | — | 2.88 | 4.13 | 154.1 |

Notes:
[a]Volume size for samples 1 to 3 was 1 liter.
[b]Substitute Ocean Water (SOW) or distilled water (H₂O), as indicated.
[c]A dash signifies no determination made.
[d]Invention polymer.
[e]Control polymer.

Samples 1 and 2 of inventive polymers were prepared in different batches with the same monomer proportions and reaction conditions, except for a slightly different radiation dose rate. The values obtained for relative and inherent viscosities at concentrations of 0.25 weight percent correlate closely. Comparing sample 2 (prepared in SOW) to control polymer sample 3 (prepared in H₂O), at a concentration of 1.0 weight percent, a Brookfield viscosity twice as high was obtained for sample 2. At a concentration of 0.1 weight percent, the relative viscosity was about 7 percent higher and the inherent viscosity was about 10 percent higher for inventive polymer sample 2, prepared in SOW. Similarly, when tested at concentrations of 0.25 weight percent, the sample 2 solution gave a relative viscosity about 13 percent higher and an inherent viscosity about 14 percent higher than those obtained from sample 3, prepared in H₂O.

The K values for the inventive polymer sample 2 (SOW) solution were about 11 units higher than those for sample 3 (H₂O) solution when tested at 0.1 weight percent concentration, and about 9 units higher when tested at 0.25 weight percent. This further indicates the superiority of the polymers prepared in accordance with the invention (in SOW) compared with those prepared in H₂O (control). The greater numerical difference in K values observed at the lower concentration is consistent with the variation in K value with concentration, noted in Example VIII. The K values obtained for sample 3 at concentrations of 0.1 and 0.25 weight percent can be plotted on a graph such as FIG. 8 to form a line approximately parallel to the lower curve for 50:50 VP/Am copolymers prepared in H₂O. By extrapolating this line to a concentration of 1.0 weight percent (approximately equivalent to 1.0 grams/deciliter), a K value of about 135–140 can be estimated, which is typical of superior polymers of the prior art. However, by plotting K values for sample 2 and extrapolating in the same manner, an estimated K value of at least about 145–150 is obtained.

Thus, the use of a polymerization medium containing electrolytes, preferably a mixture of electrolytes as in the SOW or SSW described herein, in preparing the polymers of this invention by radiation polymerization improves their viscosity properties, analogous to the results described in the previous examples for chemical initiation. Furthermore, other properties comprising cloud point and the resistance to loss of viscosity in hostile environments (high temperature, salinity and/or hardness) would also be improved, as shown in the previous examples when such polymerization media were used with chemical initiators. Thus, the use of radiation with polymerization media comprising mixed electrolytes, such as a synthetic sea water, is a preferred method of preparing the polymers of this invention because it is believed, based partly upon the work carried out thus far, that polymers produced according to the present invention using radiation initiation will produce polymers having a higher viscosity compared to chemical initiated polymers of the invention.

While this invention has been described in detail for the purpose of illustration, it is not to be construed as limited thereby, but is intended to cover all the changes and modifications within the spirit and scope thereof.

I claim:

1. A method comprising polymerizing an N-vinyl lactam by free radical initiation employing an aqueous polymerization medium comprising at least one alkali metal salt electrolyte and at least one alkaline earth metal salt electrolyte in a concentration sufficient to give an Ionic Strength of 0.4 to 0.8 and wherein divalent cations constitute 10 to 50 weight percent of total cations, and wherein the resulting polymer has a K value of 150 or greater.

2. A method in accordance with claim 1 wherein said N-vinyl lactam is copolymerized with an unsaturated amide to give a copolymer containing 10–90 weight percent of said N-vinyl lactam and 90–10 weight percent of said unsaturated amide.

3. A method in accordance with claim 2 wherein said N-vinyl lactam and said unsaturated amide are copolymerized with about 10 weight percent or less, based on total weight of monomers, of at least one termonomer.

4. A method in accordance with claim 3 wherein said at least one termonomer is selected from the group consisting of hydrophobic compounds, vinyl pyridines, ethylenically-unsaturated nitriles and hydroxyalkyl esters of ethylenically unsaturated carboxylic acids, and combinations of any two or more thereof.

5. A method in accordance with claim 4 wherein said at least one termonomer is selected from the group consisting of monovinyl aromatic hydrocarbons having from 8 to about 12 carbon atoms, vinyl esters of saturated carboxylic acids having from 3 to about 6 total carbon atoms, alkyl and hydroxyalkyl esters of ethylenically-unsaturated carboxylic acids having from 4 to about 22 carbon atoms, vinyl pyridines, and ethylenically-unsaturated nitriles having from 3 to about 5 total carbon atoms.

6. A method in accordance with claim 1 wherein said N-vinyl lactam has the formula

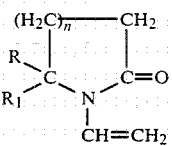

wherein R and R₁ are selected independently from the group consisting of hydrogen, methyl and ethyl and n is an integer of from 1 to 3.

7. A method in accordance with claim 2 wherein said N-vinyl lactam has the formula

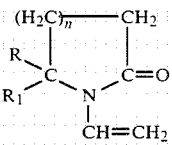

wherein R and R₁ are selected independently from the group consisting of hydrogen, methyl and ethyl and n is an integer of from 1 to 3 and said unsaturated amide has the formula

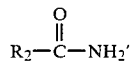

wherein R₂ is selected from the group consisting of ethenyl (vinyl), isopropenyl, 1-butenyl, isobutenyl (2-methyl-1-propenyl), 1-isopentenyl (3-methyl-1-butenyl), 1-pentenyl, and 1-methyl-1-butenyl.

8. A method in accordance with claim 7 wherein said N-vinyl lactam is N-vinyl-2-pyrrolidone and said unsaturated amide is acrylamide.

9. A method in accordance with claim 2 wherein said N-vinyl lactam is N-vinyl-2-pyrrolidone and said unsaturated amide is acrylamide.

10. A method in accordance with claim 2 wherein said copolymer contains an amount in the range of from about 25 to about 75 weight percent of said N-vinyl lactam, the remainder being said unsaturated amide.

11. A method in accordance with claim 2 wherein said copolymer contains an amount in the range of from about 40 to about 70 weight percent of said N-vinyl lactam, the remainder being said unsaturated amide.

12. A method in accordance with claim 2 wherein said copolymer contains an amount in the range of from about 50 to about 65 weight percent of said N-vinyl lactam, the remainder being said unsaturated amide.

13. A method in accordance with claim 3, wherein said monomers are combined in the following proportions based on weight of total monomers:

(a) said N-vinyl lactam in the range of from about 25 to about 75 weight percent,
(b) said unsaturated amide, in the range of from about 75 to 25 weight percent, and
(c) said at least one termonomer, in the range of from about 1 to about 10 weight percent.

14. A method in accordance with claim 13, wherein said at least one termonomer is in the range of from about 2 to about 8 weight percent.

15. A method in accordance with claim 14, wherein said at least one termonomer is in the range of from about 3 to about 5 weight percent.

16. A method in accordance with claim 15, wherein said N-vinyl lactam is from about 50 to about 65 weight percent and said unsaturated amide is from about 45 to about 30 weight percent.

17. A method in accordance with claim 1 wherein said free radical initiation is carried out using a chemical free radical initiator.

18. A method in accordance with claim 17 wherein said free radical initiator is selected from the group consisting of organic azo compounds and organic peroxides.

19. A method in accordance with claim 18 wherein said initiator is selected from the group consisting of 2,2-azobisisobutyronitrile, 2-t-butylazo-2-cyanopropane, 2-t-butylazo-2-cyanobutane, 2-t-butylazo-1-cyanocyclohexane, 4,4'-azobis(4-cyanovaleric acid), 4-t-butylazo-4-cyanovaleric acid, 2-t-butylazo-2-cyano-4-methoxy-4-methylpentane, 2-t-butylazo-2-cyano-4-methylpentane and t-butyl peroxypivalate.

20. A method in accordance with claim 2 wherein said free radical initiation is carried out using a chemical free radical initiator.

21. A method in accordance with claim 20, wherein said free radical initiator is selected from the group consisting of organic azo compounds and organic peroxides.

22. A method in accordance with claim 21, wherein said initiator is selected from the group consisting of 2,2-azobisisobutyronitrile, 2-t-butylazo-2-cyanopropane, 2-t-butylazo-2-cyanobutane, 2-t-butylazo-1-cyanocyclohexane, 4,4'-azobis(4-cyanovaleric acid), 4-t-butylazo-4-cyanovaleric acid, 2-t-butylazo-2-cyano-4-methoxy-4-methylpentane, 2-t-butylazo-2-cyano-4-methylpentane and t-butyl peroxypivalate.

23. A method in accordance with claim 1, wherein said dissolved electrolytes produce an Ionic Strength in the range from about 0.6 to about 0.8, with Ionic Strength given by the formula $$I.S. = \tfrac{1}{2}\Sigma C_1 Z_1^2 + C_2 Z_2^2 + \ldots C_n Z_n^2,$$

where $C_1$, $C_2$, etc. each represent the molar concentration of a different ion in the polymerization media $Z_1$, $Z_2$, etc. are the charges of the respective ions, both positive and negative, and n equals the number of different ions in the polymerization medium.

24. A method in accordance with claim 1 wherein the amount of said N-vinyl lactam in said aqueous polymerization medium comprises from about 5 to about 50 weight percent of the mixture of said N-vinyl lactam and said aqueous polymerization medium.

25. A method in accordance with claim 1 wherein the amount of said N-vinyl lactam in said aqueous polymerization medium comprises from about 10 to about 40 weight percent of the mixture of said N-vinyl lactam and said aqueous polymerization medium.

26. A method in accordance with claim 1 wherein the amount of said N-vinyl lactam in said aqueous polymerization medium comprises from about 15 to about 35 weight percent of the mixture of said N-vinyl lactam and said aqueous polymerization medium.

27. A method in accordance with claim 1 wherein said aqueous polymerization medium comprises synthetic sea water.

28. A method in accordance with claim 27, wherein said aqueous polymerization medium has an Ionic Strength of in the range from about 0.6 to 0.8, with Ionic Strength given by the formula $$I.S. = \tfrac{1}{2}\Sigma C_1 Z_1^2 + C_2 Z_2^2 + \ldots C_n Z_n^2,$$

where $C_1$, $C_2$, etc. each represent the molar concentration of a different ion in the polymerization media, $Z_1$, $Z_2$, etc. are the charges of the respective ions, both positive and negative, and n equals the number of different ions in the polymerization medium.

29. A method in accordance with claim 1 wherein said aqueous polymerization medium comprises an aqueous liquid selected from the group consisting of water from a subterranean formation and natural sea water.

30. A method in accordance with claim 1 wherein said free radical initiation is at least partially carried out by the introduction of electromagnetic or nuclear radiation.

31. A method in accordance with claim 30 wherein said radiation is selected from the group consisting of gamma radiation, X-rays, ultraviolet light and beams of charged or uncharged atomic particles.

32. A method in accordance with claim 31 wherein gamma radiation is provided from sources selected from the group consisting of Cobalt 60, Cesium 137, and Iridium 192.

33. A method in accordance with claim 30, wherein at least a final portion of polymerization is initiated by a chemical initiator.

34. A method comprising polymerizing a monomer mixture comprising N-vinyl-2-pyrrolidone and acrylamide by free radical initiation which is at least partially carried out by the introduction of electromagnetic or nuclear radiation in the presence of an aqueous polymerization medium comprising at least one alkali metal salt electrolyte and at least one alkaline earth metal salt electrolyte in a concentration sufficient to give an Ionic Strength of 0.4 to 0.8 and wherein the resulting polymer has a K value of 150 or greater, to give a copolymer containing 10–90 weight percent polymerized N-vinyl-2-pyrrolidone and 90–10 weight percent polymerized acrylamide 35. A method in accordance with claim 34 wherein said radiation is gamma radiation.

36. A method in accordance with claim 34 wherein oxygen is essentially excluded from said polymerization medium.

37. A method comprising polymerizing N-vinyl-2-pyrrolidone and acrylamide in an aqueous polymerization medium comprising at least one alkali metal salt and at least one alkaline earth metal salt electrolyte at a concentration of total dissolved solids of from 30 to 43 g/kg of said aqueous medium, divalent cations constituting 16 to 50 weight percent of the total cations, and wherein the resulting copolymer contains 10–90 weight percent of said N-vinyl-2-pyrrolidone and 90–10 weight percent of said acrylamide, and wherein the resulting polymer has a K value of 150 or greater.

38. A method in accordance with claim 1 wherein said aqueous polymerization medium comprises natural sea water.

39. A method comprising polymerizing an N-vinyl lactam in a medium consisting of tertiary butanol by free radical initiation.

40. A method in accordance with claim 39 wherein said N-vinyl lactam is copolymerized with an unsaturated amide to give a copolymer containing 10–90 weight percent polymerized n-vinyl-2-pyrrolidone and 90–10 weight percent polymerized acrylamide.

41. A method in accordance with claim 40 wherein said N-vinyl lactam and said unsaturated amide are polymerized in the presence of about 10 weight percent or less, based on total weight of monomers, of at least one termonomer.

42. A method in accordance with claim 41 wherein said at least one termonomer is selected from the group consisting of hydrophobic compounds, vinyl pyridines and hydroxyalkyl esters of ethylenically unsaturated carboxylic acids, ethylenically-unsaturated nitriles, and combinations of any two or more thereof.

43. A method in accordance with claim 39 wherein the resulting polymer has a K value of 150 to 250.

44. A method in accordance with claim 43, wherein said at least one tertiary alkanol is t-butyl alcohol.

45. A method in accordance with claim 39 wherein said free radical initiation is carried out using a chemical free radical initiator.

46. A method in accordance with claim 45 wherein said free radical initiator is selected from the group consisting of organic azo compounds and organic peroxides.

47. A method in accordance with claim 46 wherein said initiator is selected from the group consisting of 2,2-azobisisobutyronitrile, 2-t-butylazo-2-cyanopropane, 2-t-butylazo-2-cyanobutane, 2-t-butylazo-1-cyanocyclohexane, 4,4'-azobis(4-cyanovaleric acid), 4-t-butylazo-4-cyanovaleric acid, 2-t-butylazo-2-cyano-4-methoxy-4-methylpentane, 2-t-butylazo-2-cyano-4-methylpentane and t-butyl peroxypivalate.

48. A method in accordance with claim 39 wherein said N-vinyl lactam is present as an amount of in the range from about 5 to about 50 weight percent of the mixture of said N-vinyl lactam and said polymerization medium.

49. A method in accordance with claim 39 wherein said N-vinyl lactam is present as an amount of in the range from about 15 to about 35 weight percent of the mixture of said N-vinyl lactam and said polymerization medium.

50. A method in accordance with claim 39 wherein said N-vinyl lactam is present as an amount of in the range from about 20 to about 30 weight percent of the mixture of said N-vinyl lactam and said polymerization medium.

51. A method in accordance with claim 39 wherein said free radical initiation is at least partially carried out by the introduction of electromagnetic or nuclear radiation.

52. A method in accordance with claim 51, wherein gamma irradiation is provided from sources selected from the group consisting of Cobalt 60, Cesium 137, and Iridium 192.

53. A method in accordance with claim 52, wherein at least a final portion of polymerization is initiated by a chemical initiator.

* * * * *